United States Patent [19]

Braytenbah et al.

[11] 4,090,065
[45] May 16, 1978

[54] SYSTEM AND METHOD FOR OPERATING A STEAM TURBINE WITH PROTECTION PROVISIONS FOR A VALVE POSITIONING CONTINGENCY

[75] Inventors: Andrew Braytenbah, Pennsauken, N.J.; Leaman Podolsky, Wilmington, Del.

[73] Assignee: Westinghouse Electric Corp., Pittsburgh, Pa.

[21] Appl. No.: 404,057

[22] Filed: Oct. 5, 1973

Related U.S. Application Data

[63] Continuation of Ser. No. 247,853, Apr. 26, 1972, abandoned.

[51] Int. Cl.² ............... G05B 15/00; F01D 17/02
[52] U.S. Cl. ............... 364/494; 290/40 R; 415/15; 60/645; 364/300; 364/110
[58] Field of Search .......... 235/151.21, 151.34, 235/151.3, 151; 415/1, 13, 15, 17; 60/39.28 R, 73, 105, 645, 646; 340/172.5; 290/2, 40, 40.2, 40 R; 444/1

[56] References Cited

U.S. PATENT DOCUMENTS

| | | | |
|---|---|---|---|
| 3,552,872 | 1/1971 | Giras et al. | 415/17 |
| 3,555,251 | 1/1971 | Shavit | 235/151 |
| 3,561,216 | 2/1971 | Moore, Jr. | 60/73 |
| 3,564,273 | 2/1971 | Cockrell | 415/17 X |
| 3,588,265 | 6/1971 | Berry | 415/17 X |

OTHER PUBLICATIONS

Application of the Prodac 50 System to Direct Digital Control, J. C. Belz, G. J. Kirk & P. S. Radcliffe, IEEE Intl. Conv. Rec. Part 3, 1965, pp. 102–122.
Monitoring and Automatic Control in Steam Power Stations by Process Computer, E. Doetsch & G. Hirschberg, Siemens Review XXXV(1968) No. 12, pp. 471–476.

Primary Examiner—Edward J. Wise
Attorney, Agent, or Firm—E. F. Possessky

[57] ABSTRACT

A steam turbine is provided with an automatic digital computer controller and a backup analog controller which are interfaced with an electrohydraulic position control for the turbine throttles and governor valves. Valve position signals are generated by transducers and applied to the valve position control along with position setpoint signals from the computer or the backup controller for the purpose of generating valve control signals which drive the valves until the position setpoints are satisfied. The position signals are also applied to the computer where they are compared to the computer valve position setpoints. The automatic controller and the analog backup controller each have a speed/load control which generates the valve position setpoints in accordance with a speed or load reference, and the backup control tracks the computer setpoints during automatic control. The backup control position setpoint signals are also applied to the computer during automatic control there they are also compared to the computer valve position setpoints. If any comparison results in a difference in excess of a predetermined deadband valve, the computer generates a contingency signal to indicate a valve not functioning or backup not tracking.

19 Claims, 33 Drawing Figures

SYSTEM AND METHOD FOR OPERATING A STEAM TURBINE WITH PROTECTION PROVISIONS FOR A VALVE POSITIONING CONTINGENCY

This is a continuation, of applicaton Ser. No. 247,853 filed Apr. 26, 1972, now abandoned.

CROSS-REFERENCE TO RELATED APPLICATIONS

1. Ser. No. 722,779, entitled "Improved System and Method for Operating a Steam Turbine and an Electric Power Generating Plant" filed by Theodore C. Giras and Manfred Birnbaum on Apr. 4, 1968, assigned to the present assignee, and continued as Ser. No. 124,993 on Mar. 16, 1971, and Ser. No. 319,155, on Dec. 29, 1972, now U.S. Pat. No. 3,800,103.

2. Ser. No. 408,962, entitled "System and Method for Starting, Synchronizing and Operating a Steam Turbine with Digital Computer Control" filed as a continuation of Ser. No. 247,877, abandoned, which had been filed by Theodore C. Giras and Robert Uram on Apr. 26, 1972, assigned to the present assignee: and hereby incorporated by reference; other related cases are set forth in Ser. No. 408,962.

BACKGROUND OF THE INVENTION

The present invention relates to electric power generation and more particularly to systems and methods for operating the inlet valves of steam turbines in such plants with improved reliability and better protection.

In the operation of electric power plant steam turbines such as large steam turbines which have multiple throttle and multiple governor inlet valves, the availability of the turbine to drive its generator for electric power production and the accuracy of turbine operation during turbine availability depend in part on the proper functioning of the steam valves and their controls. Throttle valve tests have been employed for periodic checking of throttle valve performance during turbine load operation when the throttle valves are normally wide open. Since large turbines are operated in the load mode most of the time, adjustments in governor valve positions for load changes have served as a check on governor valve operation without special testing. More continuous valve performance evaluation is desirable in order to provide better protection against turbine operating bumps which may occur during valve changes or valve control changes because of faulty valve operation or control and further to provide better plant availability and reliability as a result of the detecting of faulty conditions at a time when protective action can be taken without seriously affecting the plant operation.

SUMMARY OF THE INVENTION

A steam turbine includes a plurality of turbine sections to which steam is supplied by a plurality of inlet valves, and an automatic control and a backup control are provided for positioning the valves for speed and load control purposes. Means are provided for generating signals representative of valve positions and for applying the position signals to the automatic control. Position setpoint signals generated by the backup control are also preferably applied to the automatic control. During automatic control, the backup control tracks the automatic control and means are provided for comparing preferably both the valve position and the backup position setpoints to valve position setpoints generated by the automatic control. Means are provided for generating a contingency signal if an excessive difference is detected by any comparison.

DESCRIPTION OF THE PREFERRED EMBODIMENT

POWER PLANT

Figure 1:
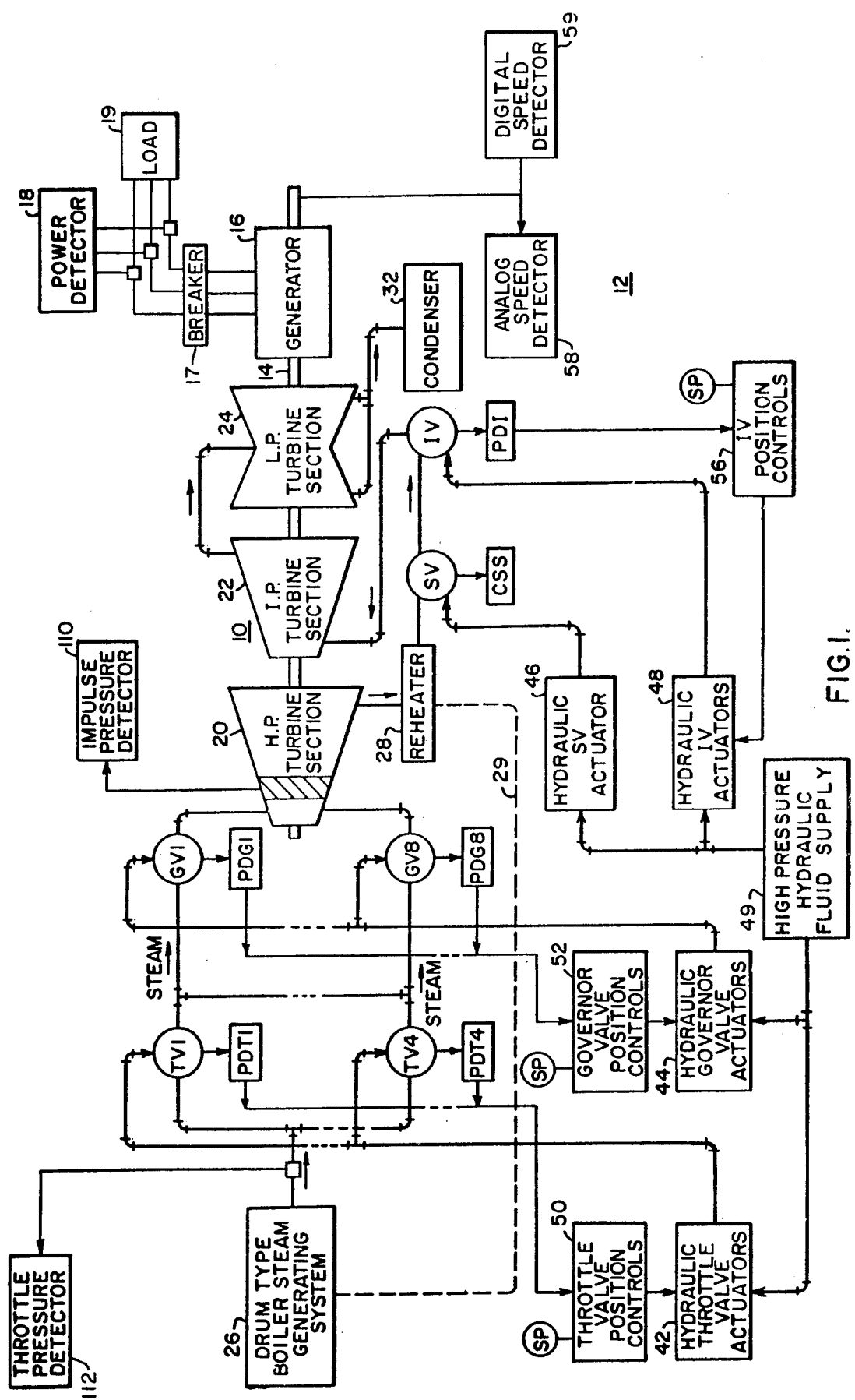
FIG. 1 shows a schematic diagram on an electric power plant including a large steam turbine and a fossil fuel fired drum type boiler and control devices which are all operable in accordance with the principles of the invention.
Figure 2:
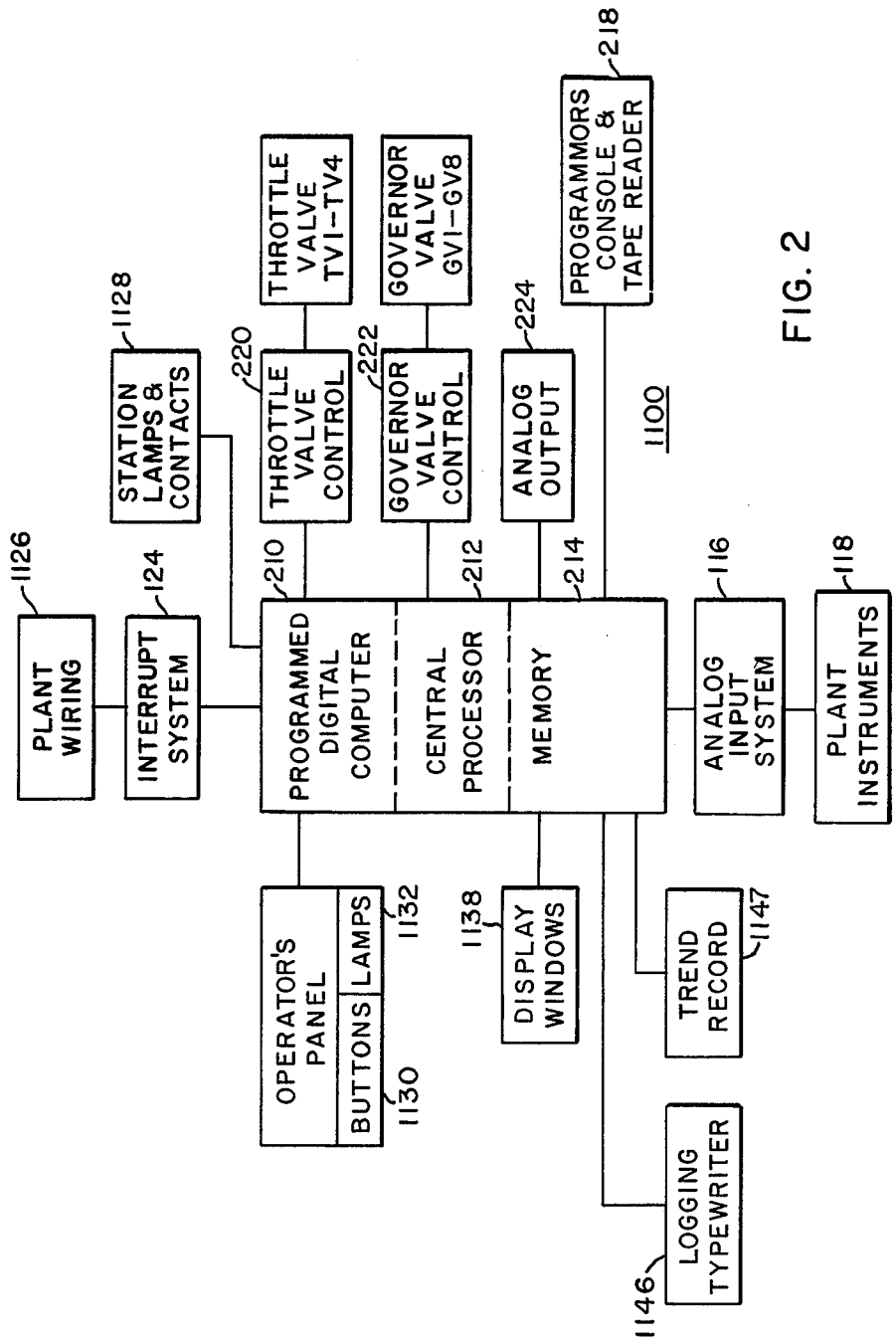
FIG. 2 shows a schematic diagram on a programmed digital computer control system operable with a steam turbine and its associated devices shown in FIG. 1 in accordance with the principles of the invention.

More specifically, there is shown in FIG. 1 a large single reheat steam turbine constructed in a well known manner and operated and controlled in an electric power plant 12 in accordance with the principles of the invention. As will become more evident through this description, other types of steam turbines can also be controlled in accordance with the principles of the invention and particularly in accordance with the broader aspects of the invention. The generalized electric power plant shown in FIG. 1 and the more general aspects of the computer control system to be described in connection with FIG. 2 are like those disclosed in the aforementioned Giras and Birnbaum patent application Ser. No. 319,115. As already indicated, the present application is directed to general improvements in turbine operation and control as well as more specific improvements related to digital computer operation and control of turbines.

The turbine 10 is provided with a single output shaft 14 which drives a conventional large alternating current generator 16 to produce three-phase electric power (or any other phase electric power) as measured by a conventional power detector 18 which measures the rate of flow of electric energy. Typically, the generator 16 is connected through one or more breakers 17 per phase to a large electric power network and when so connected causes the turbo-generator arrangement to operate at synchronous speed under steady state conditions. Under transient electric load change conditions, system frequency may be affected and conforming turbo-generator speed changes would result. At synchronism, power contribution of the generator 16 to the network is normally determined by the turbine steam flow which in this instance is supplied to the turbine 10 at substantially constant throttle pressure.

In this case, the turbine 10 is of the multistage axial flow type and includes a high pressure section 20, an intermediate pressure section 22, and a low pressure section 24. Each of these turbine sections may include a plurality of expansion stages provided by stationary vanes and an interacting bladed rotor connected to the shaft 14. In other applications, turbines operating in accordance with the present invention may have other forms with more or fewer sections tandemly connected to one shaft or compoundly coupled to more than one shaft.

The constant throttle pressure steam for driving the turbine 10 is developed by a steam generating system 26 which is provided in the form of a conventional drum type boiler operated by fossil fuel such as pulverized coal or natural gas. From a generalized standpoint, the present invention can also be applied to steam turbines associated with other types of steam generating systems such as nuclear reactor or once through boiler systems.

The turbine 10 in this instance is of the plural inlet front end type, and steam flow is accordingly directed to the turbine steam chest (not specifically indicated) through four throttle inlet valves TV1–TV4. Generally, the plural inlet type and other front end turbine types such as the single ended type or the end bar lift type may involve different numbers and/or arrangements of valves.

Steam is directed from the admission steam chest to the first high pressure section expansion stage through eight governor inlet valves GV1–GV8 which are arranged to supply steam to inlets arcuately spaced about the turbine high pressure casing to constitute a somewhat typical governor valving arrangement for large fossil fuel turbines. Nuclear turbines might on the other hand typically utilize only four governor valves.

During start-up, the governor valves GV1–GV8 are typically all fully opened and steam flow control is provided by a full arc throttle valve operation. At some point in the start-up process, transfer is made from full arc throttle valve control to full arc governor valve control because of throttling energy losses and/or throttling control capability. Upon transfer the throttle valves TV1–TV4 are fully opened, and the governor valves GV1–Gv8 are normally operated in the single valve mode. Subsequently, the governor valves may be individually operated in a predetermined sequence usually directed to achieving thermal balance on the rotor and reduced rotor blade stressing while producing the desired turbine speed and/or load operating level. For example, in a typical governor valve control mode, governor valves GV5–GV8 may be initially closed as the governor valves GV1–GV4 are jointly operated from time to time to define positions producing the desired corresponding total steam flows. After the governor valves GV1–GV4 have reached the end of their control region, i.e., upon being fully opened, or at some overlap point prior to reaching their fully opened position, the remaining governor valves GV5–GV8 are sequentially placed in operation in numerical order to produce continued steam flow control at higher speed flow levels. This governor valve sequence of operation based on the assumption that the governor valve controlled inlets are arcuately spaced about the 360° periphery of the turbine high pressure casing and that they are numbered consecutively around the periphery so that the inlets corresponding to the governor valves GV1 and GV8 are arcuately adjacent to each other.

After the steam has crossed past the first stage impulse blading to the first stage reaction blading of the high pressure section, it is directed to a reheater system 28 which is associated with a boiler or steam generating system 26. In practice, the reheater system 28 may typically include a pair of parallel connected reheaters coupled to the boiler 26 in heat transfer relation as indicated by the reference character 29 and associated with opposite sides of the turbine casing.

With a raised enthalpy level, the reheated steam flows from the reheater system 28 through the intermediate pressure turbine section 22 and the low pressure turbine section 24. From the latter, the vitiated steam is exhausted to a condenser 32 from which water flow is directed (not indicated) back to the boiler 26.

Respective hydraulically operated throttle valve actuators indicated by the reference character 42 are provided for the four throttle valves TV1-TV4. Similarly, respective hydraulically operated governor valve actuators indicated by the reference character 44 are provided for the eight governor valves GV1-GV8. Hydraulically operated actuators indicated by the reference characters 46 and 48 are provided for the reheat stop and interceptor valves SV and IV. A computer monitored high pressure fluid supply 50 provides the controlling fluid for actuator operation of the valves TV1-TV4, GV1-GV8, SV and IV. A computer supervised lubricating oil system (not shown) is separately provided for turbine plant lubricating requirements.

The respective actuators 42, 44, 46 and 48 are of conventional construction, and the inlet valve actuators 42 and 44 are operated by respective stabilizing position controls indicated by the reference characters 50 and 52. If desired, the interceptor valve actuators 48 can also be operated by a position control 56 although such control is not employed in the present detailed embodiment of the invention. Each position control includes a conventional analog controller (not shown in FIG. 1) which drives a suitably known actuator servo valve (not indicated) in the well known manner. The reheat stop valve actuators 46 are fully open unless the conventional trip system or other operating means causes them to close and stops the reheat steam flow.

Since the turbine power is proportional to steam flow under the assumed control condition of substantially constant throttle pressure, steam valve positions are controlled to produce control over steam flow as an intermediate variable and over turbine speed and/or load as an end control variable or variables. Actuator operation provides the steam valve positioning, and respective valve position detectors PDT1-PDT4, PDG1-PDG8 and PDI are provided to generate respective valve position feedback signals for developing position error signals to be applied to the respective position controls 50, 52 and 56. One or more contact sensors CSS provides status data for the stop valving SV. The position detectors are provided in suitable conventional form, for example, they may make conventional use of linear variable differential transformer operation in generating negative position feedback signals for algebraic summing with respect to position setpoint signals SP in developing the respective input error signals. Position controlled operation of the interceptor valving IV would typically be provided only under a reheat steam flow cutback requirement.

A speed detector 58 is provided for determining the turbine shaft speed for speed control and for frequency participation control purposes. The speed detector 58 can for example be in the form of a reluctance pickup (not shown) magnetically coupled to a notched wheel (not shown) on the turbo-generator shaft 14. In the detailed embodiment subsequently described herein, a plurality of sensors are employed for speed detection. Analog and/or pulse signals produced by the speed detector 58, the electric power detector 18, the pressure detectors 38 and 40, the valve position detectors PDT1-PDT4, PDG1-PDG8 and PDI, the status contact or contacts CSS, and other sensors (not shown) and status contacts (not shown) are employed in programmed computer operation of the turbine 10 for various purposes including controlling turbine performance on an on-line real time basis and further including monitoring, sequencing, supervising, alarming, displaying and logging.

B. DEH - COMPUTER CONTROL SYSTEM

As generally illustrated in FIG. 2, a Digital Electro-Hydraulic control system (DEH) 1100 includes a programmed digital computer 210 to operate the turbine 10 and the plant 12 with improved performance and operating characteristics. The computer 210 can include conventional hardware including a central processor 212 and a memory 214. The digital computer 210 and its associated input/output interfacing equipment is a suitable digital computer system such as that sold by Westinghouse Electric Corporation under the trade name of P2000. In cases when the steam generating system 26 as well as the turbine 10 are placed under computer control, use can be made of one or more P2000 computers or alternatively a larger computer system such as that sold by Xerox Data Systems and known as the Sigma 5. Separate computers, such as P2000 computers, can be employed for the respective steam generation and turbine control functions in the controlled plant unit and interaction is achieved by interconnecting the separate computers together through data links or other means.

The digital computer used in the DEH control system 1100 is a P2000 computer which is designed for real time process control applications. The P2000 typically uses a 16 bit word length with 2's complement, a single address and fixed word length operated in a parallel mode. All the basic DEH system functions are performed with a 16,000 word (16K), 3 microsecond magnetic core memory. The integral magnetic core memory can be expanded to 65,000 words (65K).

The equipment interfacing with the computer 210 includes a contact interrupt system 124 which scans contacts representing the status of various plant and equipment conditions in plant wiring 1126. The status contacts might typically be contacts of mercury wetted relays (not shown) which operate by energization circuits (not shown) capable of sensing the predetermined conditions associated with the various system devices. Data from status contacts is used in interlock logic functioning and control for other programs, protection analog system functioning, programmed monitoring and logging and demand logging, etc.

Operator's panel buttons 1130 transmit digital information to the computer 2010. The operator's panel buttons 1130 can set a load reference, a pulse pressure, megawatt output, speed, etc.

In addition, interfacing with plant instrumentation 1118 is provided by an analog input system 1116. The analog input system 1116 samples analog signals at a predetermined rate from predetermined input channels and converts the signals sampled to digital values for entry into the computer 210. The analog signals sensed in the plant instrumentation 1118 represent parameters including the impulse chamber pressure, the megawatt power, the valve positions of the throttle valves TV1 through TV4 and the governor valves GV1 through GV8 and the interceptor valve IV, throttle pressure, steam flow, various steam temperatures, miscellaneous equipment operating temperature, generator hydrogen cooling pressure and temperature, etc. A detailed list of all parameters is provided in appendix 1. Such parameters include process parameters which are sensed or controlled in the process (turbine or plant) and other variables which are defined for use in the programmed computer operation. Interfacing from external systems such as an automatic dispatch system is controlled through the operator's panel buttons 1130.

A conventional programmer's console and tape reader 218 is provided for various purposes including program entry into the central processor 212 and the memory 214 thereof. A logging typewriter 1146 is provided for logging printouts of various monitored parameters as well as alarms generated by an automatic turbine startup system (ATS) which includes program system blocks 1140, 1142, 1144 (FIG. 6) in the DEH control system 1100. A trend recorder 1147 continuously records predetermined parameters of the system. An interrupt system 124 is provided for controlling the input and output transfer of information between the digital computer 210 and the input/output equipment. The digital computer 210 acts on interrupt from the interrupt system 124 in accordance with an executive program. Interrupt signals from the interrupt system 124 stop the digital computer 210 by interrupting a program in operation. The interrupt signals are serviced immediately.

Output interfacing is provided by contacts 1128 for the computer 210. The contacts 1128 operate status display lamps, and they operate in conjunction with a conventional analog/output system and a valve position control output system comprising a throttle valve control system 220 and a governor valve control system 222. A manual control system is coupled to the valve position control output system 220 and is operable therewith to provide manual turbine control during computer shut-down. The throttle and governor valve control systems 220 and 222 correspond to the valve position controls 50 and 52 and the actuators 42 and 44 in FIG. 1. Generally, the manual control system is similar to those disclosed in prior U.S. Pat. No. 3,552,872 by T. Giras et al and U.S. Pat. No. 3,741,246 by A. Braytenbah, both assigned to the present assignee.

Digital output data from the computer 210 is first converted to analog signals in the analog output system 224 and then transmitted to the valve control system 220 and 222. Analog signals are also applied to auxiliary devices and systems, not shown, and interceptor valve systems, not shown.

C. SUBSYSTEMS EXTERNAL TO THE DEH COMPUTER

Figure 3A:
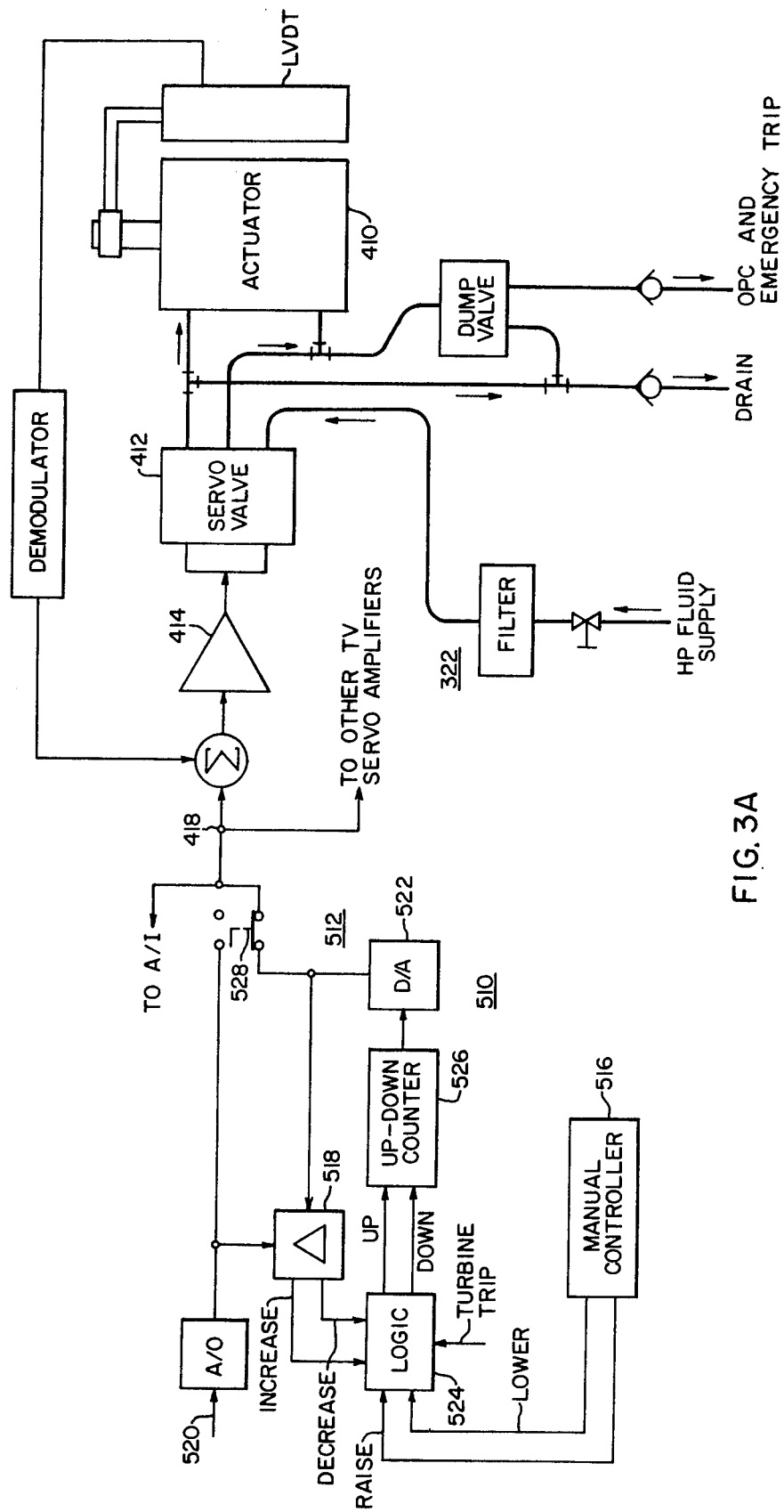
FIGS. 3A, 3B and 3C show a schematic diagram of a hybrid interface between a manual backup system and the digital compuuter connected with the servo system controlling the valve actuators.
Figure 3B:
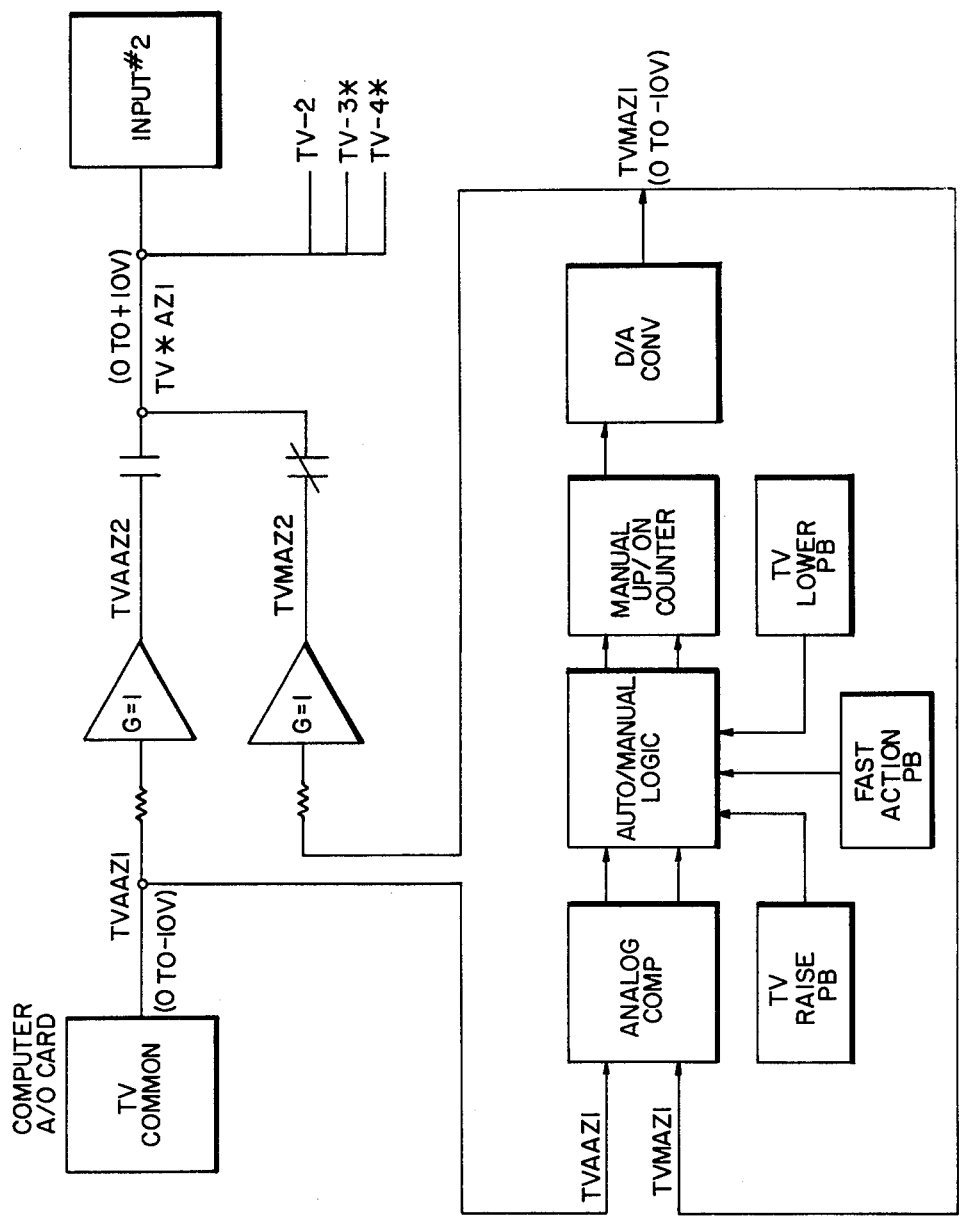
Figure 3C:
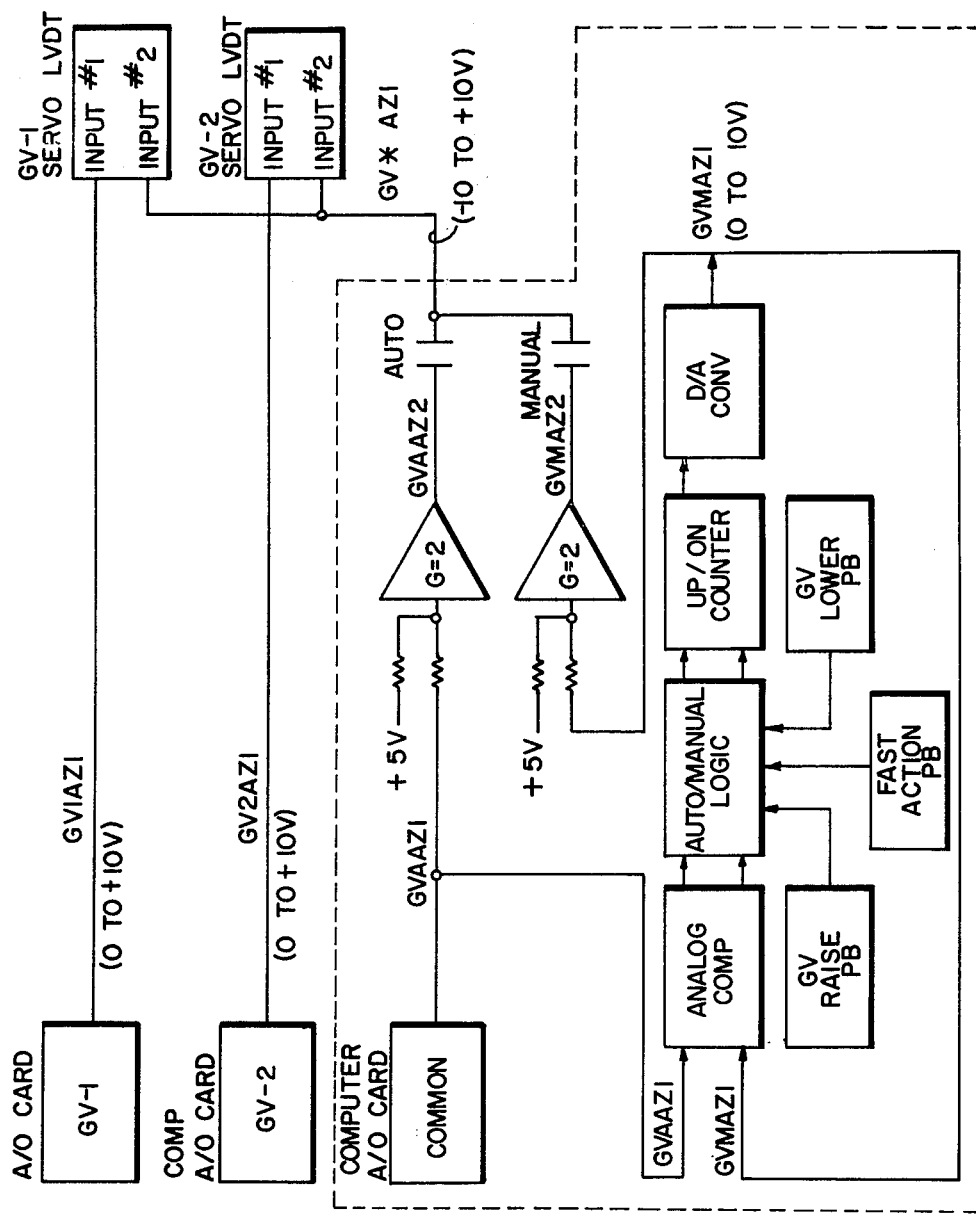

Making reference now to FIGS. 3A-3C a hardwired digital/analog system forms a part of the DEH control system 1100 (FIG. 2). Structurally, it embraces elements which are included in the blocks 50, 52, 42 and 44 of FIG. 1 as well as additional elements. A hybrid interface 510 is included as a part of the hardwired system. The hybrid interface 510 is connected to actuator system servo-amplifiers 414 for the various steam valves which in turn are connected to a manual controller 516, an overspeed protection controller, not shown, and redundant DC power supplies, not shown.

A controller shown in FIG. 3A is employed for throttle valve TV1-TV4 control in the TV control system 50 of FIG. 1. The governor valves GV1-GV8 are controlled in an analogous fashion by the GV control system 52.

While the steam turbine is controlled by the digital computer 210, the hardwired system 511 tracks single valve analog outputs 520 from the digital computer 210. A comparator 518 compares a signal from a digital-to-analog converter 552 of the manual system with the signal 520 from the digital computer 210. A signal from the comparator 518 controls a logic system 524 such that the logic system 524 runs an up-down counter 526 to the point where the output of the converter 522 is equal to the output signal 520 from the digital computer 210. Should the hardwired system 511 fail to track the signal 520 from the digital computer 210 a monitor light will flash on the operator's panel.

When the DEH control system reverts to the control of the backup manual controller 516 as a result of an operator selection or due to a contingency condition, such as loss of power on the automatic digital computer 210, or a stoppage of a function in the digital computer 210, or a loss of a speed channel in the wide range speed control all as described in greater detail infra, the input of the valve actuation system 322 is switched by switches 528 from the automatic controllers in the blocks 50, 52 (FIG. 1) or 220, 222 (FIG. 2) to the control of the manual controller 516. Bumpless transfer is thereby accomplished between the digital computer 210 and the manual controller 516.

Similarly, tracking is provided in the computer 210 for switching bumplessly from manual to automatic turbine control. As previously indicated, the presently disclosed hybrid structural arrangement of software and hardware elements is the preferred arrangement for the provision of improved turbine and plant operation and control with backup capability. However, other hybrid arrangements can be implemented within the field of application of the invention.

D. DEH PROGRAM SYSTEM

DEH Program System Organization, DEH Control Loops And Control Task Program

Figure 4:
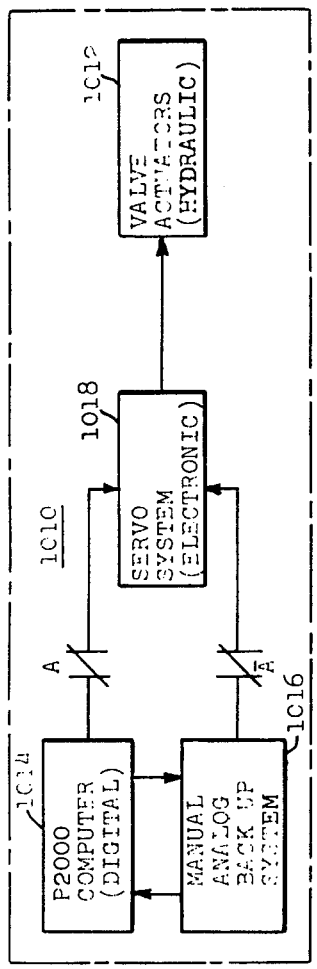
FIG. 4 shows a simplified block diagram of the digital Electro Hydraulic Control System in accordance with the principle of the invention.

With reference now to FIG. 4, an overall generalized control system of this invention is shown in block diagram form. The digital electrohydraulic (DEH) control system 1100 operates valve actuators 1012 for the turbine 10. The digital electrohydraulic control system 1100 comprises a digital computer 1014, corresponding to the digital computer 210 in FIG. 2 and it is interconnected with a hardwired analog backup control system 1016. The digital computer 1014 and the backup control system 1016 are connected to an electronic servo system 1018 corresponding to blocks 220 and 222, in FIG. 2. The digital computer control system 1014 and the analog backup system 1016 track each other during turbine operations in the event it becomes necessary or desirable to make a bumpless transfer of control from a digital computer controlled automatic mode of operation to a manual analog backup mode or from the manual mode to the digital automatic mode.

In order to provide plant and turbine monitor and control functions and to provide operator interface functions, the DEH computer 1014 is programmed with a system of task and task support programs. The program system is organized efficiently and economically to achieve the end operating functions. Control functions are achieved by control loops which structurally include both hardware and software elements, with the software elements being included in the computer program system. Elements of the program system are considered herein to a level of detail sufficient to reach an understanding of the invention. More functional detail on various programs is presented in Appendix 2. Further, a detailed listing of a DEH system program substantially conforming to the description presented herein is presented in Appendix 3 in symbolic and machine language. Most of the listing is compiled by a P2000 compiler from instructions written in Fortran IV. A detailed dictionary of system parameters is presented in Appendix 1, and a detailed computer input/output signal list is presented in Appendix 4. Appendix 5 mainly provides additional hardware information related to the hardwired system previously considered as part of the DEH control system.

As previously discussed, a primary function of the digital electrohydraulic (DEH) system 1100 is to automatically position the turbine throttle valves TV1 through TV4 and the governor valves GV1 through GV8 at all times to maintain turbine speed and/or load. A special periodically executed program designated the CONTROL task is utilized by the P2000 computer along with other programs to be described in greater detail subsequently herein.

Figure 5:
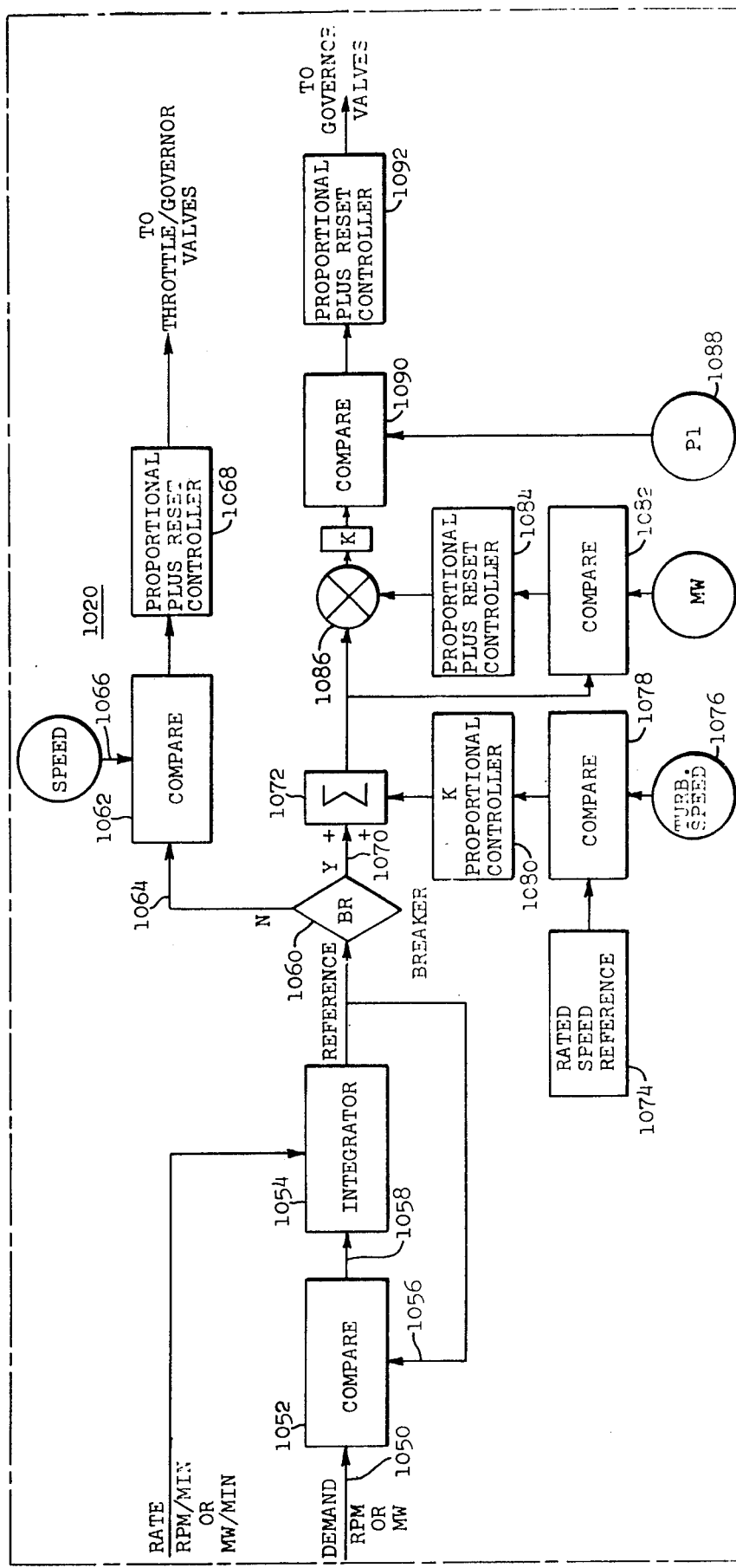
FIG. 5 shows a block diagram of a control program used in accordance with the principles of the invention.

With reference now to FIG. 5, a functional control loop diagram in its preferred form includes the CONTROL task or program 1020 which is executed in the computer 1010. Inputs representing demand and rate provide the desired turbine operating setpoints. The demand is typically either the target speed in specified revolutions per minute of the turbine systems during startup or shutdown operations or the target load in megawatts of electrical output to be produced by the generating system 16 during load operations. The demand enters the block diagram configuration of FIG. 5 at the input 1050 of a compare block 1052.

The rate input either in specified RPM per minute or specified megawatts per minute, depending upon which input is to be used in the demand function, is applied to an integrator block 1054. The rate inputs in RPM and megawatts of loading per minute are established to limit the buildup of stresses in the rotor of the turbine-generator 10. An error output of the compare block 1052 is applied to the integrator block 1054. In generating the error output the demand value is compared with a reference corresponding to the present turbine operating setpoint in the compare block 1052. The reference value is representative of the setpoint RPM applied to the turbine system or the setpoint generator megawatts output, depending upon whether the turbine generating system is in the speed mode of operation or the load mode of operation. The error output is applied to the integrator 1054 so that a negative error drives the integrator 1054 in one sense and a positive error drives it in the opposite sense. The polarity error normally drives the integrator 1054 until the reference and the demand are equal or if desired until they bear some other predetermined relationship with each other. The rate input to the integrator 1054 varies the rate of integration, i.e. the rate at which the reference or the turbine operating set-point moves toward the entered demand.

Demand and rate input signals can be entered by a human operator from a keyboard. Inputs for rate and demand can also be generated or selected by automatic synchronizing equipment, by automatic dispatching system equipment external to the computer, by another computer automatic turbine startup program or by a boiler control system. The inputs for demand and rate in automatic synchronizing and boiler control modes are preferably discrete pulses. However, time control pulse widths or continuous analog input signals may also be utilized. In th automatic startup mode, the turbine acceleration is controlled as a function of detected turbine operating conditions, including rotor thermal stress. Similarly, loading rate can be controlled as a function of detected turbine operating conditions.

The output from the integrator 1054 is applied to a breaker decision block 1060. The breaker decision block 1060 checks the state of the main generator circuit breaker 17 and whether speed control or load control is to be used. The breaker block 1060 them makes a decision as to the use of the reference value. The decision made by the breaker block 1060 is placed at the earliest possible point in the control task 1020 thereby reducing computational time and subsequently the duty cycle required by the control task 1020. If the main generator circuit breaker 17 is open whereby the turbine system is in wide range speed control the reference is applied to the compare block 1062 and compared with the actual turbine generator speed in a feedback type control loop. A speed error value from the compare block 1062 is fed to a proportional plus reset controller block 1068, to be described in greater detail later herein. The proportional plus reset controller 1068 provides an integrating function in the control task 1060 which reduces the speed error signal to zero. In the prior art, speed control systems limited to proportional controllers are unable to reduce a speed error signal to zero. During manual operation an offset in the required setpoint is no longer required in order to maintain the turbine speed at a predetermined value. Great accuracy and precision of turbine speed whereby the turbine speed is held within one RPM over tens of minutes is also accomplished. The accuracy of speed is so high that the turbine 10 can be manually synchronized to the power line without an external synchronizer typically required. An output from the proportional plus reset controller block 1068 is then processed for external actuation and positioning of the appropriate throttle and/or governor valves.

If the main generator circuit breaker 17 is closed, the CONTROL task 1020 advances from the breaker block 1060 to a summer 1072 where the REFERENCE acts as a feedforward setpoint in a combined feedforward-feedback load control system. If the main generator circuit breaker 17 is closed, the turbine generator system 10 is being loaded by the electrical network connected thereto.

In the control task 1020 of the DEH system 1100 utilizes the summer 1072 to compare the reference value with the output of speed loop 1310 in order to keep the speed correction independent of load. A multiplier function has a sensitivity to varying load which is objectionable in the speed loop 1310.

During the load mode of operation the DEMAND represents the specified loading in MW of the generator 16 which is to be held at a predetermined value by the DEH system 1100. However, the actual load will be modified by any deviations in system frequency in accordance with a predetermined regulation value. To provide for frequency participation, a rated speed value in box 1074 is compared in box 1078 with a "two signal" speed value represented by box 1076. The two signal speed system provides high turbine operating reliability to be described infra herein. An output from the compare function 1078 is fed through a function 1080 which is similar to a proportional controller which converts the speed error value in accordance with the regulation value. The speed error from the proportional controller 1080 is combined with the feedforward megawatt reference, i.e., the speed error and the megawatt reference are summed in summation function or box 1072 to generate a combined speed compensated reference signal.

The speed compensated load reference is compared with actual megawatts in a compare box or function 1082. The resultant error is then run through a proportional plus reset controller represented by program box 1084 to generate a feedback megawatt trim.

The feedforward speed compensated reference is trimmed by the megawatt feedback error multiplicatively to correct load mismatch, i.e. they are multiplied together in the feedforward turbine reference path by multiplication function 1086. Multiplication is utilized as a safety feature such that if one signal e.g. MW should fail a large value would not result which could cause an overspeed condition but instead the DEH system 1100 would switch to a manual mode. The resulting speed compensated and megawatt trimmed reference serves as an impulse pressure setpoint in an impulse pressure controller and it is compared with a feedback impulse chamber pressure representation from input 1088. The difference between the feedforward reference and the impulse pressure is developed by a comparator function 1090, and the error output therefrom functions in a feedback impulse pressure control loop. Thus, the impulse pressure error is applied to a proportional plus reset controller function 1092.

During load control the megawatt loop comprising in part blocks 1082 and 1084 may be switched out of service leaving the speed loop 1310 and an impulse pressure loop operative in the DEH system 1100.

Impulse pressure responds very quickly to changes of load and steam flow and therefore provides a signal with minimum lag which smooths the output response of the turbine generator 10 because the lag dynamics and subsequent transient response is minimized. The impulse pressure input may be switched in and out from the compare function 1090. An alternative embodiment embracing feedforward control with impulse pressure feedback trim is applicable.

Between block 1092 and the governor valves GV1-GV8 a valve characterization function for the purpose of linearizing the response of the valve is interposed. The value characterization function described in detail in Appendix III infra herein is utilized in both automatic modes and manual modes of operation of the DEH system 1100. The output of the proportional plus reset controller function 1092 is then ultimately coupled to the governor valves GV1-GV8 through electrohydraulic position control loops implemented by equipment considered elsewhere herein. The proportional plus reset controller output 1092 causes positioning of the governor valves GV1-GV8 in load control to achieve the desired megawatt demand while compensation is made for speed, megawatt and impulse pressure deviations from desired setpoints.

Figure 6:
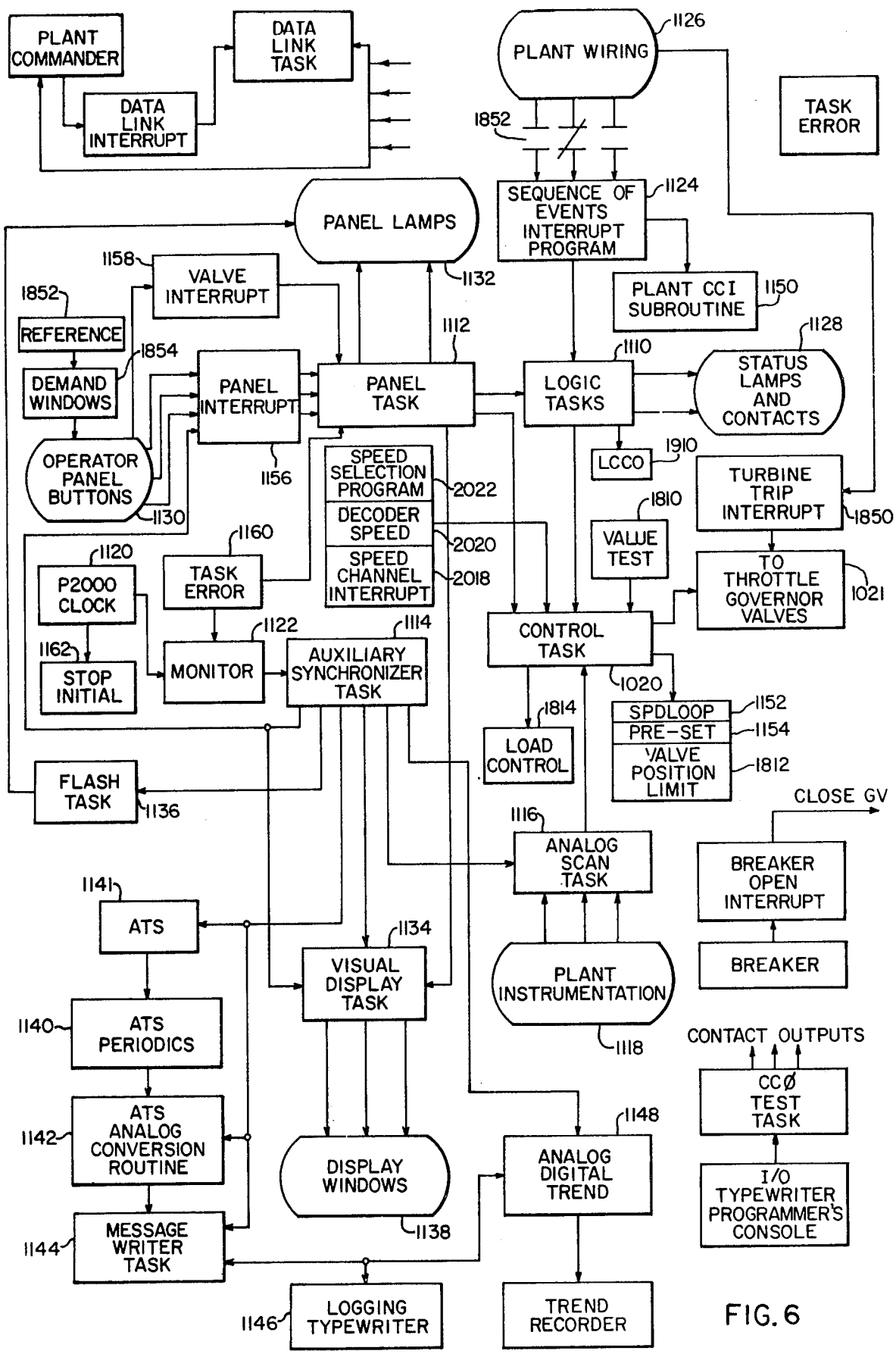
FIG. 6 shows a block diagram of the programs and subroutines of the digital Electro Hydraulic and the automatic turbine startup and monitoring program in accordance with the principles of the invention.

Making reference to FIG. 6, the control program 1020 is shown with interconnections to other programs in the program system employed in the Digital Electro Hydraulic (DEH) system 1100. The periodically executed program 1020 receives data from a logic task 1110 where mode and other decisions which affect the control program are made, a panel task 1112 where operator inputs may be determined to affect the control program, an auxiliary synchronizer program 1114 and an analog scan program 1116 which processes input process data. The analog scan task 1116 receives data from plant instrumentation 1118 external to the computer as considered elsewhere herein, in the form of pressures, temperatures, speeds, etc. and converts such data to proper form for use by other programs. Generally, the auxiliary synchronizer program 1114 measures time for certain important events and it periodically bids or runs the control and other programs. An extremely accurate clock function 1120 operates through a monitor program 1122 to run the auxiliary synchronizer program 1114.

The monitor program or executive package 1122 also provides for controlling certain input/output operations of the computer and, more generally, it schedules the use of the computer to the various programs in accordance with assigned priorities. For more detail on the P2000 computer system and its executive package, reference is made to Appendix 4. In the appendix description, the executive package is described as including analog scan and contact closure input routines, whereas these routines are considered as programs external to the executive package in this part of the disclosure.

The logic task 1110 is fed from outputs of a contact interrupt or sequence of events program 1124 which monitors contact variables in the power plant 1126. The contact parameters include those which represent breaker state, turbine auto stop, tripped/latched state interrogation data states, etc. Within the executive program 1111 bids from the interrupt program 1124 are requested with and queued for execution by the executive program 1111. The control program 1110 also receives data from the panel task 1112 and transmits data to status lamps and output contacts 1128. The panel task 1112 receives data instruction based on supervision signals from the operator panel buttons 1130 and transmits data to panel lamps 1132 and to the control program 1020. The auxiliary synchronizer program 1114 synchronizes through the executive program 1111 the bidding of the control program 1020, the analog scan program 1116, a visual display task 1134 and a flash task 1136. The visual display task transmits data to display windows 1138. The details of the various programs will be presented in more explicit form infra, as varying parts of the entire DEH control system 1100 for controlling the turbine system 10.

The control program 1020 receives numerical quantities representing process variables from the analog scan task program 1116. As already generally considered, the control program 1020 utilizes the values of the various feedback variables including turbine speed, impulse pressure and megawatt output in order to calculate the position of the throttle valves TV1-TV4 and governor valves GV1-GV8 in the turbine system 10, thereby controlling the megawatt load and the speed of the turbine 10.

To interface the control and logic programs efficiently, a special interrupt program 1124 is used in used in conjunction with the logic task 1110. The logic task 1110 computes all logical states, to be discussed in more detail infra, according to predetermined conditions and transmits this data to the control program 1020 where this information is utilized in determining the positioning control action for valves TV1-TV4, the throttle and the governor valves GV1-GV8. The logic task 1110 also controls the state of various lamps and relay type contact outputs in a predetermined manner.

Another important part of the DEH system is the OPERATOR'S PANEL program. The operator communicates through the panel with the DEH control programs by means of various buttons which have assigned functions. When any button is pressed, a special interrupt is generated; this interrupt triggers a PANEL INTERRUPT program which decodes the button pressed, and then bids the PANEL task. The PANEL program processes the button and takes the proper action, which usually means manipulating some panel lamps, as well as passing on the button information to both the LOGIC and the CONTROL tasks.

The Operator's Panel also has two sets of display windows which allow display of all turbine program parameters, variables, and constants. A visual display task presents this information in the windows at the request of the operator through various dedicated display buttons and a numerical keyboard. The visual display values are periodically updated in the windows as the quantity changes.

Certain important turbine operating conditions are communicated to the DEH operator by way of flashing lamps on the panel. Therefore a special FLASH program is part of the DEH system. Its function is to monitor and detect such contingency conditions, and flash the appropriate lamp to alert the operator to the state.

An operator supervises the DEH system 1100 and the turbine 10 by pressing various pushbutton switches on an operator's panel 1130 thereby entering various control or monitoring actions or various values for system parameters into the computer for processing by the panel task 1112. The flash task 1136 monitors various conditions within the DEH system 1100 and the turbine 10 thereby alerting the operator by flashing appropriate lamps to be described infra.

TASK PRIORITY ASSIGNMENTS

Figure 8:
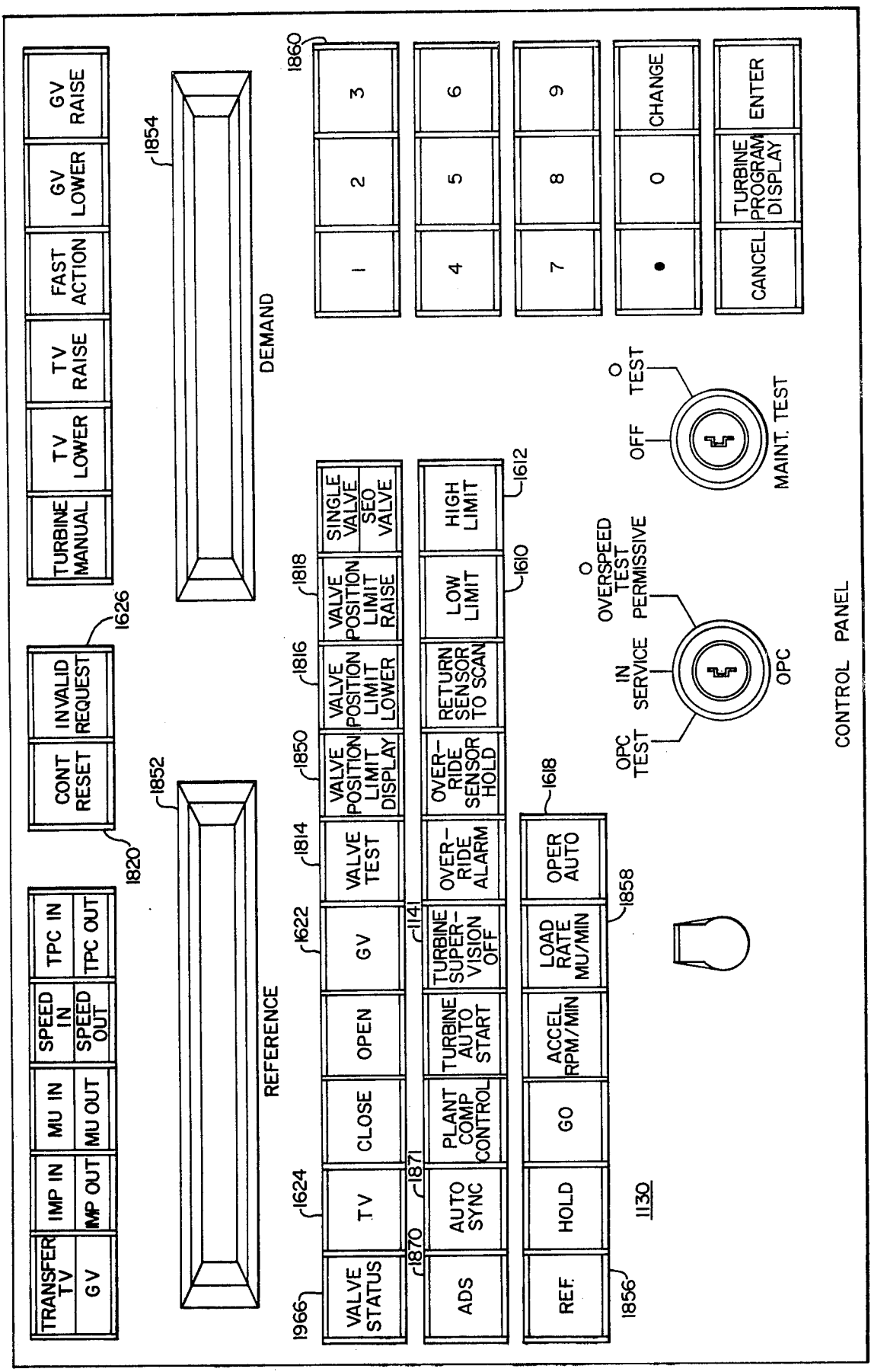
FIG. 8 shows a view of a part of the operator's control panel which is operable in accordance with the principles of the invention.
Figure 9:
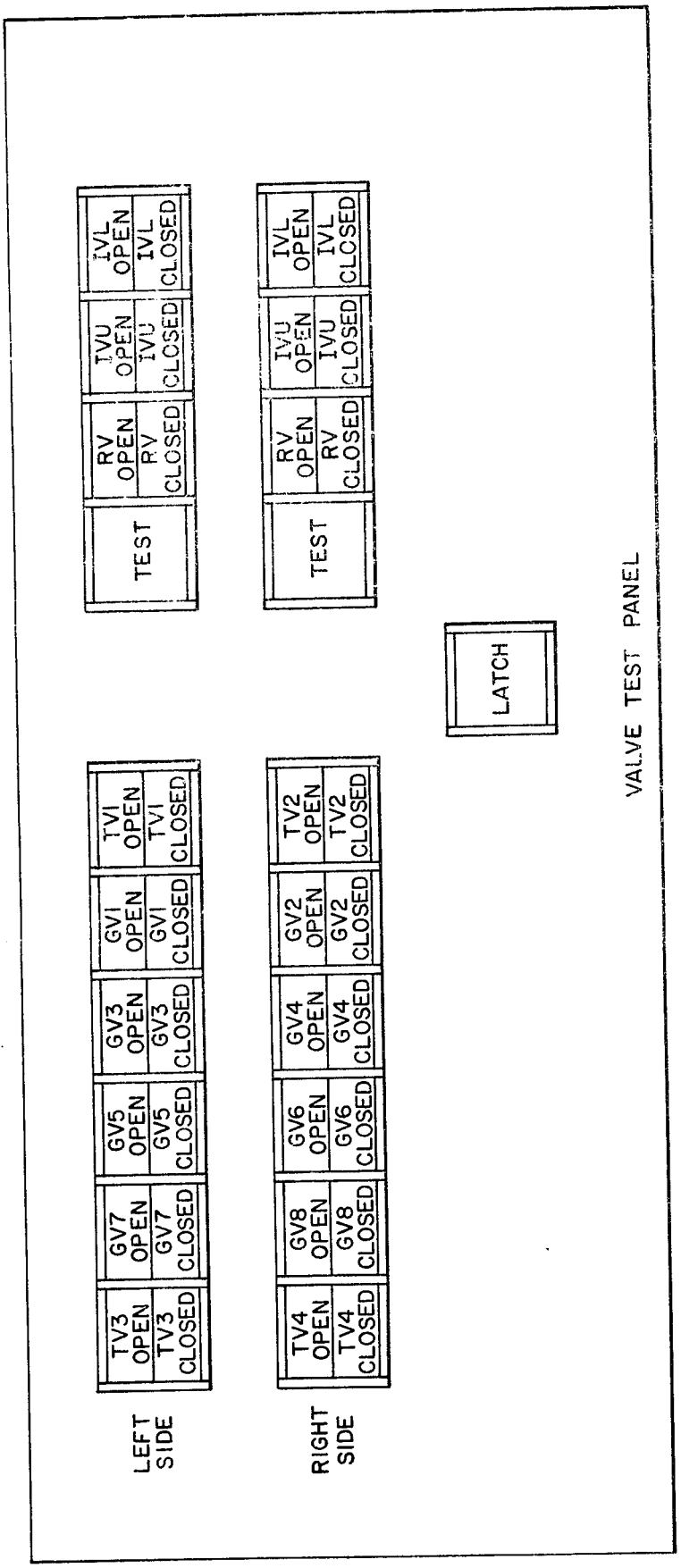
FIG. 9 shows a view of a portion of the operator's control panel which is operable in accordance with the principles of the invention.

With reference now to FIG. 9, a table of program priority assignments is shown as employed in the executive monitor. A program with the highest priority is run first under executive control if two or more programs are ready to run. The stop/initializer program function has top priority and is run on startup of the computer or after the computer has been shut down momentarily and is being restarted. The control program 1020 is next in order of priority. The operator's panel program 1130, which generates control data, follows the control task 1020 in priority. The analog scan program 1116 also provides information to the control task 1020 and operates at a level of priority below that of the operator's panel 1130. The automatic turbine starting (ATS) periodic program 1140 is next in the priority list. ATS stands for automatic turbine startup and monitoring program, and is shown as a major task program 1140 of FIG. 8 for the operation of the DEH system 1100. The ATS-periodic program 1140 monitors the various temperatures, pressures, breaker states, rotational velocity, etc. during start-up and during load operation of the turbine system.

The logic task 1110, which generates control and operating mode data, follows in order of operating priority. The visual display task program 1134 follows the logic task program 1110 and makes use of outputs from the latter. A data link program for transmitting data from the DEH system to an external computer follows. An ATS-analog conversion task program 1142 for converting the parameters provided by the ATS-periodic program 1142 to usable computer data follows in order of priority. The flash task program 1136 is next, and it is followed by a programmer's console program which is used for maintenance testing and initial loading of data tapes. The next program is an ATS-message writer 1144 which provides for printout of information from the ATS analog conversion program 1142 on a suitable typewriter 1146. The next program in the priority list is an analog/digital trend which monitors parameters in the turbine system 10 and prints or plots them out for operator perusal. The remaining two programs are for debugging and special applications.

In the preferred embodiment, the stop/initialize program is given the highest priority in the table of FIG. 9 because certain initializing functions must be completed before the DEH system 1100 can run. The auxiliary synchronizer program 1114 provides timing for all programs other than the stop/initialize program while the DEH system 1100 is running. Therefore, the auxiliary synchronizer task program 1400 has the second order of priority of the programs listed. The control program 1020 follows at the third descending order of priority since the governor valves GV1 through GV8 and the throttle valves TV1 through TV4 must be controlled at all times while the DEH system 1100 is in operation.

The operator's panel program 1130 is given the next order of priority in order to enable an operator to exercise direct and instantaneous control of the DEH system 1100. The analog scan program 1116 provides input data for the control program 1020 and, therefore, is subordinate only to the initialize function, synchronizer function, control and operator function.

In the preferred embodiment the ATS-periodic program 1140 is next in order of priority. During automatic turbine startup, the scanning of inputs by the ATS-periodic program 1140 is almost on the same order of priority as the inputs to the DEH system 1100. However, the ATS program 1140 in alternative embodiments, could be reduced in its priority, without any considerable adverse effect, because of the relatively limited duty cycle problems in the ATS system.

The logic task 1110 which control the operations of some of the functions of the control task program 1020 is next in order of priority. The visual display task 1134 follows in order of priority in order to provide an operator with a visual indication of the operation of the DEH program 1100. The visual display program 1134 is placed in the relatively low eighth descending order of priority since the physical response of an operator is limited in speed to to 0.2 to 0.5 sec. as to a visual signal. The rest of the programs are in essentially descending order of importance in the preferred embodiment. In alternative embodiments of the inventions, alternate priority assignments can be employed for the described or similar programs, but the general priority listing described is preferred for the various reasons presented.

Figure 13:
FIG. 13 is a simplified block diagram of a portion of the logic function which is operable in accordance with the principles of the invention.

A series of interrupt programs which interrupt the action of the computer and function outside the task priority assignments to process interrupts is shown in FIG. 13. One such program in FIG. 8 is the sequence events or contact interrupt program 1124 which suspends the operation of the computer for a very short period of time to process an interrupt. Between the operator panel buttons 1130 and the panel task program 1112 a panel interrupt program 1156 is utilized for signalling any changes in the operator's panel buttons 1130. A valve interrupt program 1158 is connected directly between the operator's panel buttons 1130 and the panel task program 1112 for operation during a valve test or in case of valve contingency situations to be discussed infra. The various interrupt programs will be discussed in greater detail infra.

Figure 7:
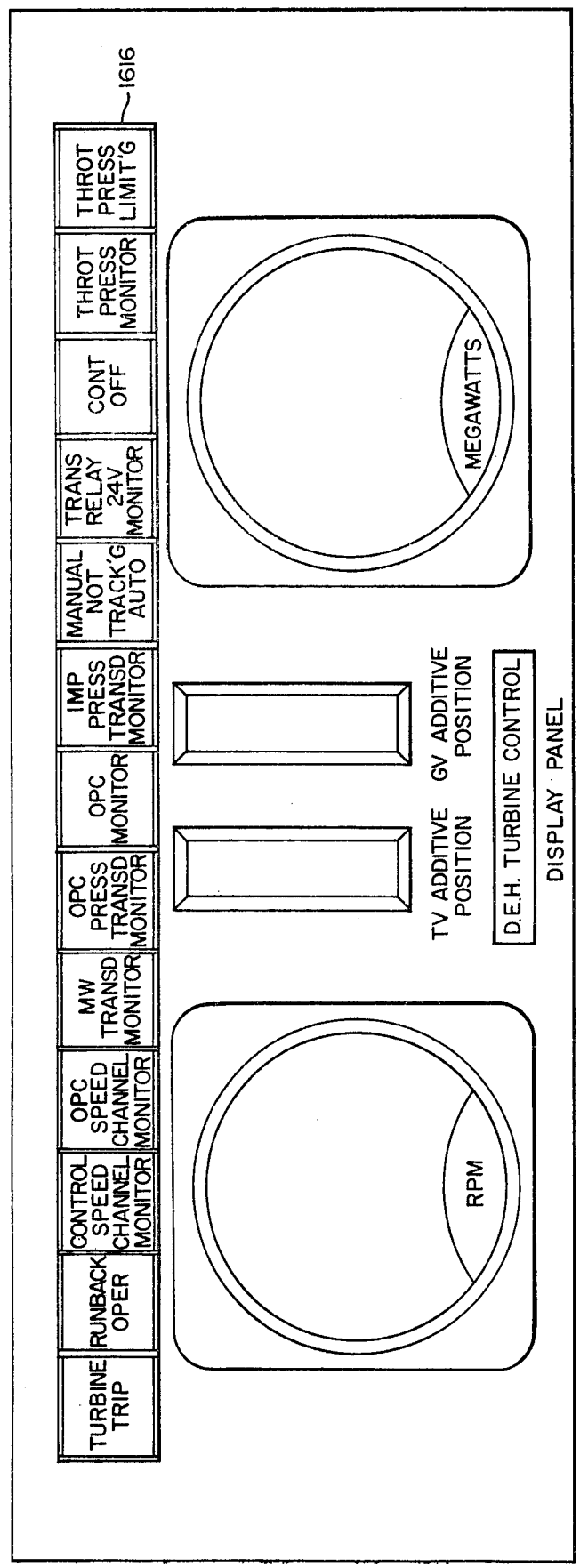
FIG. 7 shows a view of a part of an operator's control panel which is operable in accordance with the principles of the invention.

Proportional plus reset controller subroutine 1068 is called by the control task program 1020 of FIG. 7 as previously described when the turbine control system is in the speed mode of control and also, for computer use efficiency, when the turbine 10 is in the load mode of control with the megawatt and impulse pressure feedback loops in service. Utilizing the proportional plus reset function 1068 during speed control provides very accurate control of the angular velocity of the turbine system.

In addition to previously described functions, the auxiliary synchronizer program 1114 is connected to and triggers the ATS periodic program 1140, the ATS analog conversion routine 1142 and the message writer 1144. The ATS program 1140 monitors a series of temperature, vibration, pressures, speed, etc. in the turbine system and also contains a routine for automatically starting the turbine system 10. The ATS analog conversion routine 1142 converts the digital computer signals from the ATS periodic program 1140 to analog or digital or hybrid form which can be typed out through the message writer task 1144 to the logging typewriter 1146 or a similar recorder.

The auxiliary synchronizer program 1114 also controls an analog/digital trend program 1148. The analog digital trend program 1148 records a set of variables in addition to the variables of the ATS periodic program 1140.

Ancillary to a series of other programs is a plant CCI subroutine 1150 where CCI stands for contact closure inputs. The plant CCI subroutine 1150 responds to changes in the state of the plant contacts as transmitted over the plant wiring 1126. Generally, the plant contacts are monitored by the CCI subroutine 1150 only when a change in contact state is detected. This scheme conserves computer duty cycle as compared to periodic CCI monitoring. However, as subsequently described herein, other triggers including operator demand can be employed for a CCI scan.

The control task 1020 calls ancillary thereto a speed loop task 1152 and a preset or proportional plus reset controller program 1154. Ancillary to the executive monitoring program 1122 is a task error program 1160. In conjunction with the clock program 1120 a stop/initialize program 1162 is used. There are various other functions in FIG. 8 which will be described in greater detail infra.

PRESET SUBROUTINE PROGRAM

Figure 11:
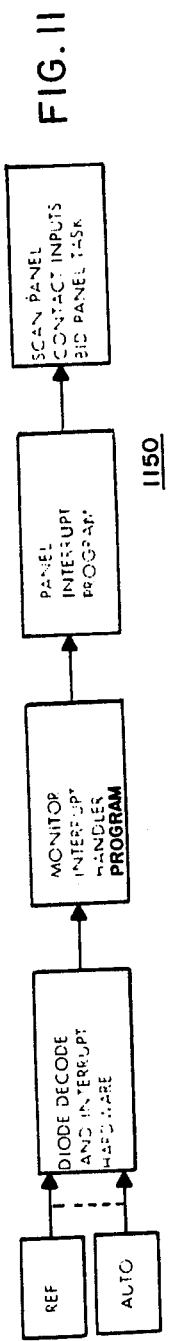
FIG. 11 is a block diagram of a panel interrupt program which is operable in accordance with the principles of the invention.

Making reference now to FIG. 11, a functional diagram of the proportional plus reset controller task program 1068 of FIG. 7 is shown in greater detail. The proportional plus reset controller subroutine 1068 is called by the control program 1020 of FIG. 7 when the DEH turbine control system 1100 is in the speed mode of control and also when the DEH turbine control system 1100 is in the load mode of control with the megawatt and impulse pressure feedback loops in service. As already indicated utilizing a proportional plus reset function during speed control provides very accurate control of the angular velocity of the turbine system.

The proportional plus reset controller 1068 provides an output which is composed of the sum of two parts. One part of the output is proportional to an input and the other part is an integral of the input. Therefore, instantaneous response is available as well as the capability of zero input error. A setpoint or dynamic reference from a demand source is applied to an input 1210 of a difference function 1212. The difference function 1212 compares the input and the actual controlled process value. An output from the difference function 1212 is fed to a gain function 1216 and to an input of an integrator or integrating function 1218. An output from the integrator 1218 is limited by the program as represented by the reset windup prevention function 1220. In an analog system, reset windup is the saturation of the integrating amplifier and therefore the locking out of that amplifier until the integrating capacitor connected thereto is discharged. In a software system, reset windup is prevented more easily because of the inherent digital nature of the computer which allows for a limitation of any digital number at a predetermined value.

Outputs from the gain function 1216 and the integrator 1218 and the reset windup prevention function 1220 are summed in a summing function 1222. An output from the summing function 1222 is limited by another function 1224 thereby limiting an output therefrom to a useful output range which is fed to a process function 1226.

Figure 12:
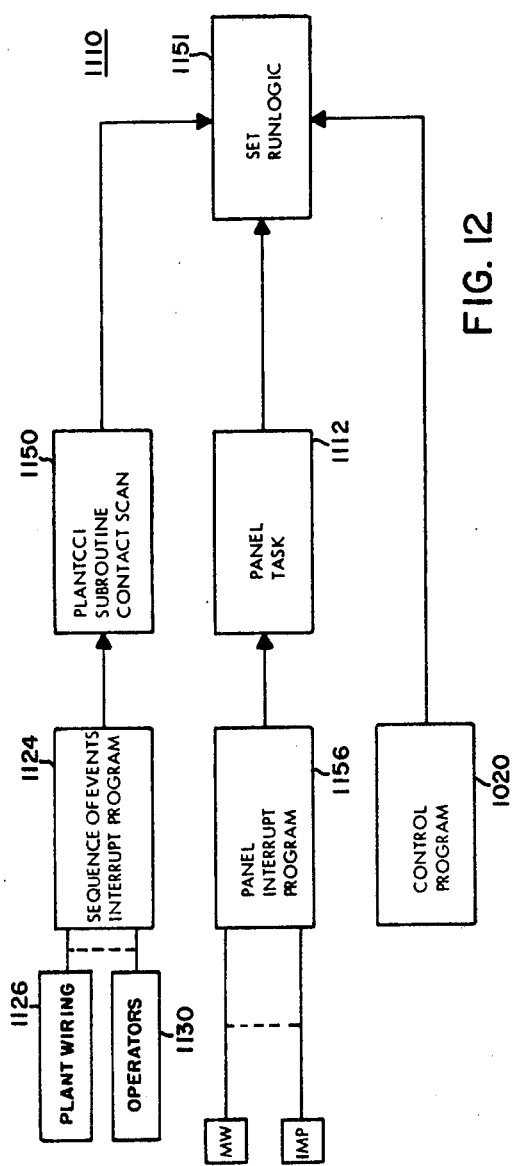
FIG. 12 is a block diagram of conditions which cause initiation of a logic program which is operable in accordance with the principles of the invention.

Making reference now to FIG. 12, a pictorial representation of a flow chart for the proportional plus reset controller program is shown. In the preferred embodiment the Preset program is designed such that a call from the control program 1030 provides a list of variables necessary to evaluate the controller 1068 output. The structure of the subroutine is indicated by the Fortran statement given below.

SUBROUTINE PRESET (ERR, ERRX, G, TR, HL, XLL, RES, PRES)

The variables in the above equation are defined as follows:

| FORTRAN Variables | English Language Equivalents |
|---|---|
| ERR | The current input |
| ERRX | The last input |
| G | The controller proportional gain |
| TR | The controller reset time |
| HL | The controller high limit |
| XLL | The controller low limit |
| RES | The controller integral output |
| PRES | The controller total output. |

Again making reference to FIG. 12, where a flow chart diagram of the operation of the Preset subroutine 1068 is shown and standard FORTRAN notation is used. The Preset subroutine 1068 first evaluates the integral part of the controller output according to equation:

$$Y(N) = Y(N-1) + \frac{DT}{2*TR} \cdot [X(N) + X(N-1)].$$

The subroutine 1068 next saves the current input ERR in storage location ERRX 1250 for the following call to the subroutine 1068. The controller integral output RES 1252 is then checked against the high limit 1254 and the low limit 1256 to prevent reset/windup. The proportional part of the output is computed and added to the integral part of the output integrator 1218 to form the total output PRES 1258. PRES 1258 is checked against high limit 1260 and low limit 1262 after which the proportional plus reset controller subroutine 1068 returns to the control task 1020.

As previously considered, the proportional plus reset controller subroutine 1068 is used by the control task program 1020 during three different phases of operation of the turbine system. During startup of the turbine system 10, the proportional plus reset controller subroutine program 1068 is used as a speed controller in order to regulate and hold the speed of the turbine 10 at a predetermined value or at a predetermined acceleration rate. Because of the integral function of the proportional plus reset controller subroutine program 1068 the speed of the turbine system 10 can be held to within 1 rpm. Also, in order for an operator to keep the speed of the turbine system 10 at a predetermined value, an error offset input signal typical of a purely proportional system is not required. Therefore, the reference and the controlled variable, both turbine speed in this case, will be equal. The proportional plus reset controller subroutine program 1068 is also used in the megawatt controller feedback loop and the impulse chamber pressure controller feedback loop.

RESET INTEGRATOR ALGORITHM

To perform the mathematical function of integration in a digital computer it is desirable to use numerical techniques to approximate the exact value of the integral. In the preferred embodiment, the algorithm uses the trapezoidal rule for integration and it is simple in format, requires little computer storage and is executed very rapidly. The algorithm uses one value of input past history to achieve a high degree of accuracy.

The following algorithm is used in the computer:

$$Y(N) = Y(N-1) + \frac{DT}{2*TR} [X(N) + X(N-1)].$$

Definition of the terms in Equation (2) follows:
- (N) - The current instant of real time
- (N-1) - The last instant of real time.
- DT - The sampling interval, or the time duration between evaluations of the integration algorithm. In the DEH Control System this is normally 1 sec.
- TR - The controller reset time in sec.
- X(N) - The current value of the input.
- X(N-1) - The last value of the input.
- Y(N) - The current value of the output.
- Y(N-1) - The last value of the output.

SPEED LOOP SUBROUTINE

Making reference now to FIG. 13, a speed loop program 1310 which functionally is part of the arrangement shown in FIG. 7 is shown in greater detail. The speed loop (SPDLOOP) program 1310 computes data required in the functioning of the speed feedback loop comprising as shown in FIG. 7 the rated speed reference 1074, the actual turbine speed 1076, the compare function 1078, the proportional controller 1080 and the summing function 1072. The speed loop subroutine 1310 is called upon to perform speed control loop functions by the control program 1020. In FIG. 13, the functioning of the proportional controller 1080 is shown in detail. The error output from the compare function 1078 is fed through a deadband function 1312. A proportionality constant (GR1) 1314 and a high limit function (HLF) 1316 are included in the computation.

The speed loop (SPDLOOP) subroutine is called during operation of the speed control mode and the load control mode. Subroutine form reduces the requirement for memory 214 storage space thereby reducing the expense of the digital computer 210 required for operation of the DEH system 1100.

The deadband function 1312 provides for stopping any small noise variations in the speed error generated by the compare function 1078 from changing the speed of the turbine system 10. Systems without a deadband continuously respond to small variations which are random in nature resulting in undue stress in the turbine 10 and unnecessary, time and duty cycle consuming operation of the control system. A continuous hunting about the rated speed due to the gain of the system would occur without the deadband 1312. GR1, the speed regulation gain 1314, is set to yield rated megawatt output power speed correction for a predetermined turbine speed error. The high limit function 1316, HLS, provides for a maximum speed correction factor.

The turbine speed 1076 is derived from three transducers. The turbine digital speed transducer arrangement is that disclosed in greater element and system implementation detail in the aforementioned Reuther Westinghouse Case No. 41,775. Briefly, in the preferred embodiment for determining the speed of the turbine, the system comprises three independent speed signals. These speed signals consist of a very accurate digital signal generated by special electronic circuitry from a magnetic pickup, an accurate analog signal generated by a second independent magnetic pickup, and a supervisory analog instrument signal from a third independent pickup. The DEH system compares these signals and through logical decisions selects the proper signal to use for speed control or speed compensated load control. This selection process switches the signal used by the DEH control system 1100 from the digital channel signal to the accurate analog channel signal or vice versa under predetermined dynamic conditions. The speed sensing system is described in greater detail infra. In order to hold the governor valves at a fixed position during this speed signal switching the control program 1020 uses the speed loop subroutine 1310 and performs a computation to maintain a bumpless speed signal transfer, to be discussed in greater detail infra.

Figure 14:
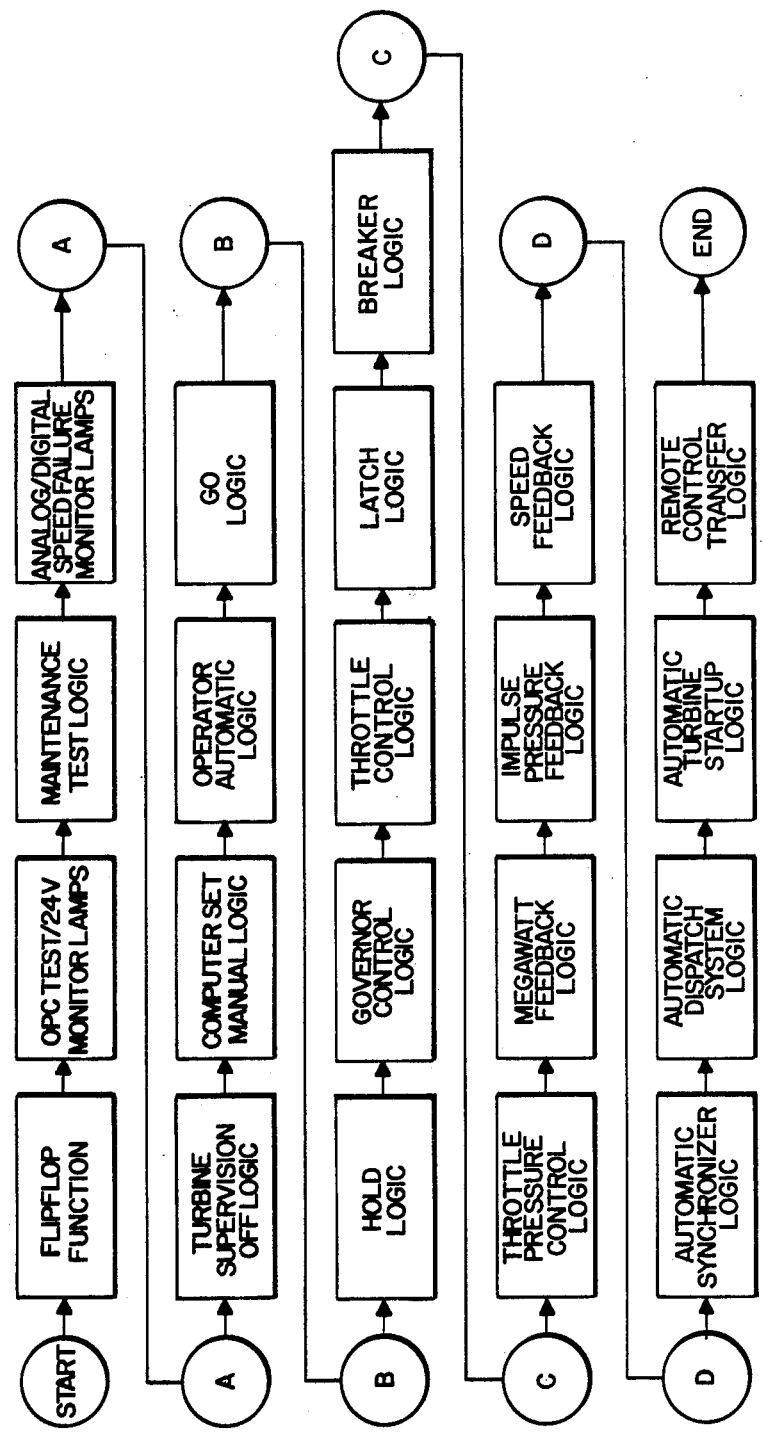
FIG. 14 is a block diagram of the logic program which is operable in accordance with the principles of the invention.

Making reference to FIG. 14, the speed loop (SPDLOOP) subroutine flow chart 1310 is shown in greater detail. Two FORTRAN statements signify the operations of the speed loop subroutine program flow chart 1310. These statements are:

CALL SPDLOOP
REF1 = REFDMD + X

Variables in the flow chart 1310 are defined as follows:

| FORTRAN Variables | English Language Equivalent |
|---|---|
| WR | The turbine rated speed reference |
| WS | The turbine speed |
| TEMP | Temporary Storage Location variable |
| SPDB | The speed deadband |
| GR1 | The speed regulation gain |
| X | Speed value |
| HLF | The high limit function |

PLANT CONTACT CLOSURE INPUT (PLANTCCI) SUBROUTINE PROGRAM

Figure 15:
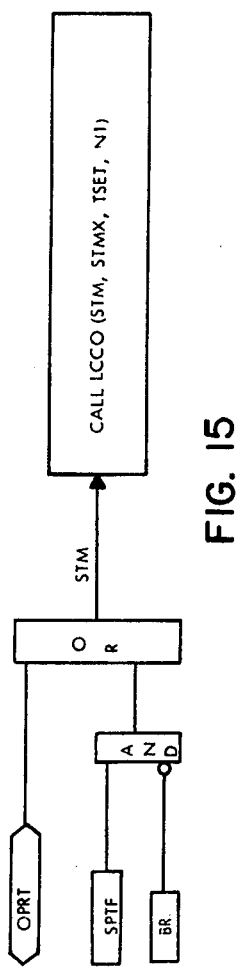
FIG. 15 is a flow chart of a transfer to manual operation subroutine which is operable in accordance with the principles of the invention.

A plant contact closure input subroutine 1150 as shown in FIG. 8, scans all the contact inputs tied to the computer through the plant wiring 1126 and sets logic data images of these in designated areas within the memory 214 of the computer 210. The CCI scan occurs on demand such as by the Sequence of Events program. The details of the plant contact closure input subroutine 1150 is presented in greater detail in the computer readout of the entire DEH program in Appendix 3. A block diagram of the various functions of the plant contact closure input subroutine 1150 is shown in FIG. 15. The plant contact closure input subroutine 1150 is also utilized when power to the computer 210 is turned on or when the computer buttons reset-run-reset are pressed on a maintenance panel 1410. Under these circumstances, a special monitor power-on routine program 1412 is called upon. This program executes the computer STOP/INITIALIZE task program 1414 described previously, which in turn calls the plant contact closure input subroutine 1150 for performance of the initializing procedure.

The operator can also call the plant contact closure input subroutine 1150 through the auxiliary synchronizer program 1114, if desired, whereby a periodic scan of the entire computer CCI system is implemented for checking the state of any one or group of relays in the CCI system.

AUTOMATIC TURBINE START-UP PROGRAM FOR FOSSIL UNITS

A digital computer is a powerful tool for achieving a better and more efficient control of a turbo-generator unit. To take advantage of the computer's ability to scan, memorize, calculate, make decisions and take executive actions, the computer program should go further than the operating instructions, normally provided with each turbine, by scanning additional parameters if necessary, determining the trends in the parameter changes and performing computations beyond the capacity and duties of a human operator.

The general objective of the starting and load changing recommendations is the protection of the turbine parts against thermal-fatigue cracking caused by internal temperature variations. In the large turbines of present design the critical element is the H.P. rotor due to its relatively large diameters and high number of temperature variations at the first stage zone produced during startups and load changes. The operating procedures provided with each turbine, in the form of charts, assume that the machine is normally passing from one steady state to another, during a transient period, and the transition between the two selected states should be performed in a determined time to keep the thermal stresses below the allowable limit.

With the help of the computer, the thermal stresses in the rotor can be calculated minute by minute based on the actual temperature at the first stage provided by a thermocouple. The assumption that the turbine was in a steady state condition is no longer necessary. Once the thermal stress (or strain) is calculated, it can be compared with the allowable value, and the difference used as the index of the permissible first stage temperature variation, translated in the computer program as a variation of speed or load or rate of speed or load change.

Using the memory of the computer, values of some parameters can be stored for use in the estimation of their future values or rate of change, which in turn are used to take corrective measures before alarm or trip points are reached. Such is the case with metal temperature differentials and differential expansions.

Bearing vibration is another of the parameters for which the computer capacity is used in making logical decisions. Each bearing is under close supervision and when one of the vibrations reaches an alarm limit, its behavior is studied and a decision is made according to the estimated future value of the vibrations, and whether it is an increasing, steady or decreasing function. A priority system is also inserted due to the possibility that two or more bearings may be in a different stage of alarm.

Under the approach used in the program, the rotor stress (or strain) calculations, sub-program P#01, and its decision-making counterpart, sub-program P#04, are the main controlling sections. They will allow the unit to roll with relatively high acceleration until the anticipated value of strain or other controlling parameters predict that limiting values are to be reached in the near future. Then a lower rate is selected and, if the condition persists, a speed hold is generated.

The following describes the Automatic Turbine Start-Up Program (ATS) in the DEH-P2000 Controller. The ATS program employs general concepts including the rotor stress control concepts described in the aforementioned Berry patent. In providing automatic control and monitoring, the ATS provides improvements over the Berry patent and earlier control systems in which digital computers have been used to provide supervisory startup control over analog EH controls.

The ATS Program is stored and executed in the same Central Processing Unit (CPU) as the basic DEH Programs. Both Programs work directly together by means of shared core locations. They also share the same input/output hard-and software, which is needed to communicate with the outside world, i.e., to read and operate contacts. The ATS Program is capable of rolling the turbine from turning gear to synchronous speed. It will check the pre-roll conditions, determine if a soak period is required, transfer from throttle valve (TV) to governor valve (GV), check the presynchronizing conditions and allow the automatic synchronizer to put the unit on line or otherwise allow synchronization to occur, i.e. under accurate speed loop control.

Durng the operation of the turbine, whether during the acceleration period or under load, the computer will monitor the various parameters of the turbine, compare their values which limit values and print messages to inform the operator about the conditions of the machine to guide him in the operation of the unit.

The modes of operation are ATS Control and ATS supervision. If both the "turbine auto-start" and the "turbine supervision off" pushbuttons are not back-lighted the ATS Program is in ATS Supervision and messages are printed out. Pressing the "turbine auto start" button brings the ATS Program into ATS control. Pressing the "turbine supervision off" button stops the messages from being printed out while the ATS Programs are still running. If the "turbine supervision off" button is pushed the second time, all current alarm messages and all subsequent messages are printed.

In ATS Control, the computer will control the unit from turning gear to synchronization and application of initial load.

The computer performs the following evaluations and control actions:

a. Every minute prior to rolling off turning gear, the program checks and compares with allowable limits, the following parameters: Throttle temperature, differential expansions, metal temperature differentials, vacuum, exhaust temperatures, eccentricity, bearing metal temperatures, drain valve positions.
b. Requests a change in throttle steam conditions to match impulse chamber steam temperature to metal temperature within $-100°$ & $+200°$ F
c. Allows the turbine to roll off turning gear.
d. Sets the target speed and selects the acceleration in the DEH controller.
e. Determines the heat soak time at 2200 RPM and counts it down.
f. Accelerates the turbine to 3300 RPM at controlled rates.
g. Commands the DEH controller to transfer from throttle to governor control.
h. Accelerates the turbine to synchronous speed.
i. Allows the Automatic Synchronizer and DEH Controller to put the turbine on the line and apply minimum load.
j. Calls for a "Load hold" at initial load if required by the thermal conditions of the turbine.

Under ATS Supervision, the function of the computer is limited to monitoring the various parameters and generating appropriate messages to assist the operator in the control of the turbine. The strain calculation is continuously performed to advise the operator about the thermal condition of the rotor. It is the operator's responsibility to match steam and metal temperatures, set demands, select rates of speed and load changes, determine the heat soak requirements and take all the necessary sequential steps to bring the turbine up to speed and load it.

All programs are called periodically and will run to completion depending on conditions set by a higher priority program when there is any Program P15 determines the appropriate action to be performed in a sequential operational order. Programs P01 through P14 check the turbine and generator parameters. They compute rotor temperatures and strain at impulse chamber zone; they calculate anticipated metal temperature differentials and differential expansions. Depending on the mode of operation these programs set or advise to set new DEH demands or holds.

PROGRAM LIST

P01 — Determination of rotor thermal conditions.
P02 — Periodic computation and supervision of anticipated steam chest wall, bolt flange temperature differentials and differential expansion.
P03 — Supervision of turning gear operation.
P04 — Control of rotor stress at first stage.
P05 — Supervision of eccentricity and vibration.
P06 — Turbine metal temperature supervision.
P07 — Control of EH speed reference.
P08 — Supervision of bearing temperatures.
P09 — Supervision of generator.
P10 — Supervision of gland seal, turbine exhaust and condenser and vacuum conditions.
P11 — Supervision of drain valves and computation of anticipated differential expansion.
P12 — Supervision of LP exhaust temperatures.
P13 — Sensor failure action.
P14 — Computation and timing of heat soak time.
P15 — Acceleration sequence.

AUXILIARY SYNCHRONIZER PROGRAM

Figure 16:
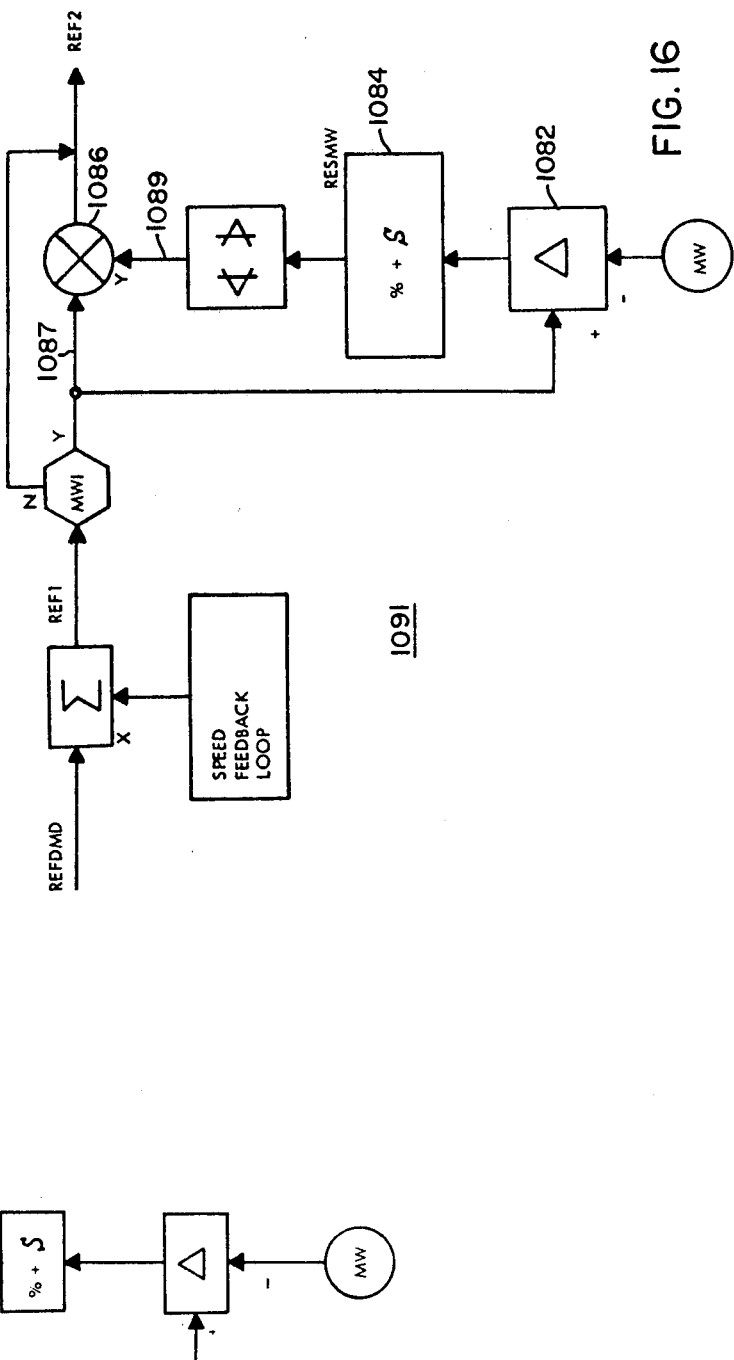
FIG. 16 is a block diagram of a megawatt feedback loop subroutine which is operable in accordance with the principles of the invention.

With reference to FIG. 16, the block diagram shows an overall scheme for the auxiliary synchronizer program 1510. The auxiliary synchronizer program 1510 has two functions. It performs accurate counting to determine the time duration of important events to be described in more detail and it synchronizes the bidding for execution of all periodic programs in the digital electrohydraulic system 1100 on a predetermined schedule. The auxiliary synchronizer program 1510 utilizes a power line frequency 1512 of 60 hertz for timing the various tasks.

OPERATOR'S PANEL AND FLASH PROGRAM

Figure 17:
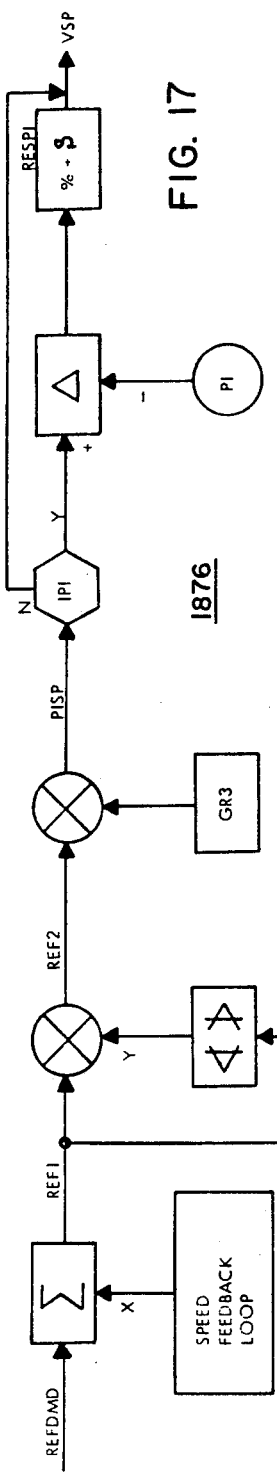
FIG. 17 is a block diagram of an impulse pressure loop with megawatt loop in service which is operable in accordance with the principles of the invention.
Figure 18:
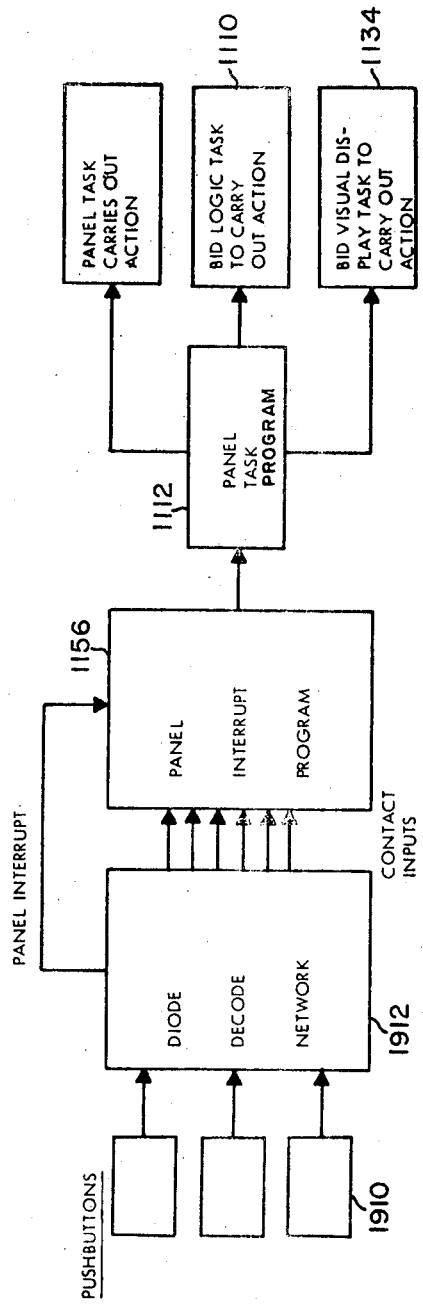
FIG. 18 is a block diagram showing a panel task interaction function which is operable in accordance with the principles of the invention.
Figure 19:
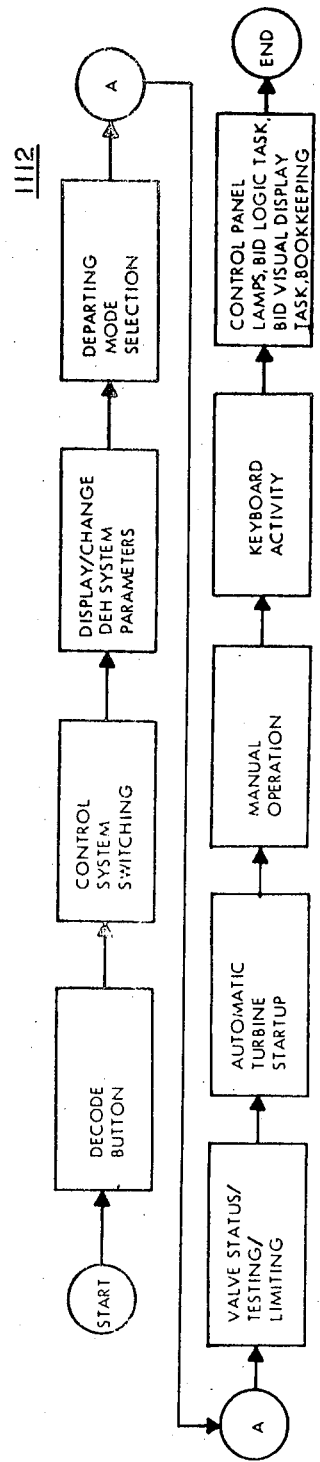
FIG. 19 is a block diagram of a panel program which is operable in accordance with the principles of the invention.

Referring now to FIGS. 17, 18 and 19, the control panel 1130 for the digital electrohydraulic system 1100 is shown in detail. Specified functions have control panel buttons which flash in order to attract the attention of an operator. The FLASH task has two functions: it flashes appropriate lights to alert the operator to various important conditions in the DEH system, and it sets contact outputs to pass these same conditions to the Analog Backup and Boiler Control Systems. The FLASH task is on priority level 5 and is bid by the AUX SYNC task every ½ sec. Buttons reference low limit 1610, reference high limit 1612, valve position limit 1614, throttle pressure limit 1616, DEH 1100 ready for automatic or operator auto 1618, valve status contingency 1620, governor valve contingency 1622, throttle valve contingency 1624, and invalid request 1626 flash if any of the contingency limits or functions assigned to these operations is not in a proper predetermined state or value.

Figure 10:
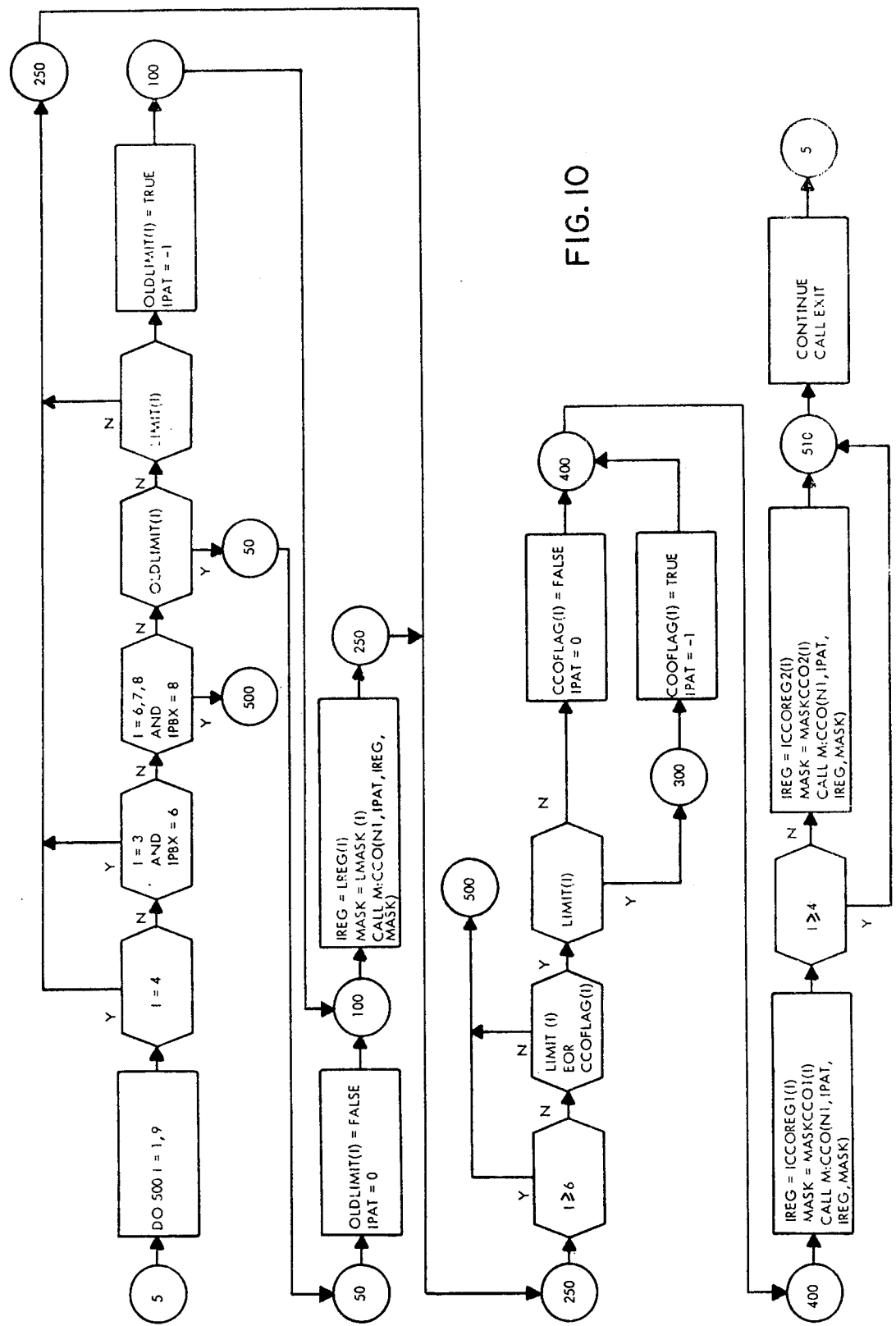
FIG. 10 shows a flow chart of a flash task which is operable in accordance with the principles of the invention.

FIG. 10 shows a detailed flow chart of the flash task 1136. The flash task is included in FIG. 6 as the flash task block 1136.

The concept behind the FLASH task is that flashing will attract the operator's attention much more quickly than simply maintaining a steady on condition. Most of the flashing lights indicate contingency conditions; a few indicate such things as invalid keyboard entries or that the DEH system is ready to go on automatic control. The flashing frequency is set at ½ sec on and ½ sec off as long as the condition exists. At the termination of the flashing condition, the corresponding lights and contacts are turned off.

A total of nine conditions are continually monitored for flashing by the FLASH task. These are listed below with a brief description of each.

1. Reference Low Limit — The turbine load reference is being limited by the low load limit.
2. Reference High Limit — The turbine load reference is being limited by the high load limit.
3. Valve Position Limit — The turbine governor valve output is being limited by the valve position limit.
4. Throttle Pressure Limit — The turbine load reference is being run back because throttle pressure is below set point. No light is flashed in this case but a contact output is set during the throttle pressure limiting.
5. DEH Ready for Automatic — The DEH control system has tracked the manual backup system and is ready to go on automatic control.
6. Valve Status Contingency — While on automatic control, the DEH system has detected a valve LVDT position not in agreement with its corresponding analog output.
7. Governor Valve Contingency — A governor valve LVDT position is not in agreement with its analog output.
8. Throttle Valve Contingency — A throttle valve LVDT position is not in agreement with its analog output.
9. Invalid Request — An invalid keyboard entry has been made.

In order to determine whether to flash a light or to suppress flashing, the FLASH task maintains two arrays in core memory. One of these is called LIMIT and contains the current value of the nine limiting or flashing conditions listed above, as they are set by various other DEH programs. The second array is called OLDLIMIT and is an image of the immediate past value of the LIMIT array. These two arrays are examined every ½ sec by the FLASH task according to the following table of combinations:

| FLASH TASK LAMP COMBINATIONS | | |
|---|---|---|
| LIMIT | OLDLIMIT | Action |
| 0 | 0 | Do Nothing |
| 0 | 1 | Turn Light Off |
| 1 | 0 | Turn Light On |
| 1 | 1 | Turn Light Off |

After the proper action is taken by the FLASH task, the OLDLIMIT array is then updated to agree with the current LIMIT array for the next pass through the task ½ sec later.

A third array called CCOFLAG is also maintained by the FLASH task in order to set contact outputs when a limiting condition exists. The contact outputs are not set and reset regularly (as are the flashing lights) but rather the contacts are set and remain on as long as the flashing condition exists. When the flashing condition ceases the contacts are reset. A table of combinations illustrating this action follows:

| FLASH TASK CONTACT COMBINATIONS | | |
|---|---|---|
| LIMIT | CCOFLAG | Action |
| 0 | 0 | Do Nothing |
| 0 | 1 | Reset Contact |
| 1 | 0 | Set Contact |
| 1 | 1 | Do Nothing |

It should be noted that only the first five flash conditions listed above have contact outputs associated with them; the remaining four simply flash Operator's Panel lights.

The control of the operation of the DEH control system 1100 is greatly facilitated for the operator by the novel layout of the operator's panel 1130, the flashing and warning capabilities thereof, and the interface provided with the turbine control and monitor functions through the pushbutton switches. In addition, simulated turbine operation is provided by the DEH system for operator training or other purposes through the operation of the appropriate panel switches during turbine down time. Further, it is noteworthy that manual and automatic operator controls are at the same panel location for good operator interface under all operating conditions. More detail on the functioning of the panel pushbuttons is presented in Appendix 2 and elsewhere in the description of the DEH programs herein.

In addition the layout of the panel 1130 of FIGS. 7, 8 and 9 is unique and very efficient from operation and operator interface considerations. The control of the DEH system 1100 by the buttons of the panel 1130 and the software programs thereto provides improved operation of the computer 210 and turbine generator 10.

Software details of the panel 1130 interface are available in the appendices 3, 4, 5 and 6.

PANEL INTERRUPT PROGRAM

A block diagram of the panel interrupt program 1156 is shown in FIG. 11.

The PANEL INTERRUPT program responds to Operator's Panel pushbutton requests by decoding the pushbutton identification and bidding the PANEL task to carry out the appropriate response. The PANEL INTERRUPT program is initiated by the Monitor interrupt handler.

The DEH turbine control system is designed to provide maximum flexibility to plant personnel in performing their function of operating the turbine. This flexibility is evidenced by an Operator's Panel with an array of pushbuttons arranged in functional groups, and an internal software organization which responds immediately to pushbutton requests by the operator. The heart of this instant response is the interrupt capability of the DEH control system.

Pressing any panel pushbutton activates a diode-decoding network which identifies the pushbutton, sets a group of six contacts to an appropriate coded pattern, and generates an interrupt to the computer. The Monitor interrupt handler responds within microseconds and runs the PANEL INTERRUPT program, which does a demand contact input scan of the special panel pushbutton contacts and bids the PANEL task to carry out the function requested by the operator.

LOGIC TASK

The LOGIC task determines the operational status of the DEH turbine control system from information provided by the plant, the operator, and other DEH programs.

Referring now to FIG. 12 a block diagram representing the operation of the logic task 1110 is shown. A contact input from the plant wiring 1126 triggers the sequence of events or interrupt program 1124 which calls upon the plant contact closure input subroutine 1150 which in turn requests that the logic program 1110 be executed by the setting of a flag called RUNLOGIC 1151 in the logic program 1110. The logic program 1110 is also run by the panel interrupt program 1156 which calls upon the panel task program 1112 to run the logic program 1110 in response to panel button operations.

The control task program 1020 in performing its various computations and decisions will sometimes request the logic program 1110 to run in order to update conditions in the control system. In FIG. 13, the functioning of the logic program 1110 is shown. FIG. 14 shows a more explicit block diagram of the logic program 1110.

The mechanism for actual execution of the LOGIC program is provided by the AUX SYNC task, which runs every 1/10 sec and carries out the scheduled and demand bidding of various tasks in the DEH system. AUX SYNC checks the state of the RUNLOGIC flag and, if it is set, bids the LOGIC task immediately. Thus, the maximum response time for LOGIC requests is 1/10 sec; on the average the response will be much faster than this.

In order to allow immediate rerunning of the LOGIC task should system conditions require, the LOGIC program first resets RUNLOGIC. Thus any other program may then set RUNLOGIC and request a bid which will be carried out by the AUX SYNC program within 1/10 sec. There are two major results of the LOGIC task: the computation of all logic states necessary for proper operation of the DEH system, and the processing of all status and monitor lamp contact outputs to inform the plant control system and operating personnel of the state of the DEH system.

The logic program 1110 controls a series of tests which determine the readiness and operability of the DEH system 1100. One of these tests is that for the overspeed protection controller which is part of the analog backup portion of the hardwired system 1016 shown in FIG. 4. Generally, the logic program 1110 is structured from a plurality of subroutines which provide the varying logic functions for other programs in the DEH program system, and the various logic subroutines are all sequentially executed each time the logic program is run.

When the DEH system is in automatic control, it is possible for certain conditions to occur which require transfer to manual operator control. One of these is the case in which the maintenance test switch is moved to the test position. Even though a wired connection places the control in manual operation, the DEH LOGIC program sets a contact output requesting transfer to manual as a backup. The second situation occurs when the turbine is on automatic speed control and all speed input signals fail, as determined by the speed selection program in the CONTROL task. This speed channel failure will also require transfer to manual operation by a contact output from this LOGIC task.

COMPUTER SET MANUAL LOGIC

FIG. 15 shows a flow chart of a transfer to manual operation subroutine.

STM is the logical variable to switch to turbine manual control, and is set by the maintenance test contact input (OPRT) or the speed channel failure variable (SPFT) while on speed control (i.e. the main breaker (BR) is not set). A call to the LCCO subroutine is then made.

MEGAWATT FEEDBACK LOGIC

Megawatt feedback is one of the two major loops used on turbine load control to maintain the governor valves at the correct position. The other feedback is impulse pressure; between these two loops it is possible to adapt the computer outputs to account for valve non-linearities and to assure that the magawatt setting in the reference window is actually being supplied by the turbine/generator.

The megawatt feedback logic places the magawatt loop in service on request from an operator's panel pushbutton, providing all permissive conditions are satisfied, and removes the loop from service from the operator's panel pushbutton or when any condition exists which requires removing the megawatt feedback. Placing the loop in service or removing it is done bumplessly, so that the governor valves remain at the same position. In addition, the REFERENCE and DEMAND values are automatically adjusted to agree with the new state of the DEH control system.

Referring to FIG. 46, a block diagram of the megawatt feedback loop is shown in greater detail than in FIG. 7. It should be noted that the speed compensated reference 1087, at the input of multiplication function 1086, is multiplied by the megawatt compensation 1089. The multiplication of the signals instead of a differencing provides an additional safety feature since the loss of either of the signals 1087 or 1089 will produce a zero output rather than a runaway condition.

IMPULSE PRESSURE FEEDBACK LOGIC

Impulse pressure feedback is the other of the two major loops used in the turbine load control to maintain the governor valves at the correct position. The impulse pressure feedback logic places the impulse pressure feedback loop in service on request from an operator's panel pushbutton, providing all permissive conditions are satisfied, and removes the loop from service on request from the operator or when any condition exists which requires removing impulse pressure feedback. Placing the loop in service or removing it is done automatically and bumplessly, so that the governor valves remain at the same position.

The impulse pressure feedback logic is shown in greater detail in FIG. 17. With a digital computer, bumpless transfer is achieved without the use of elaborate external circuitry because of the digital computational nature of the machine. A value can be computed instantaneously and inserted in the integrator 1218 of the proportional plus reset controller subroutine 1068. In the preferred embodiment of the Digital Electro-Hydraulic control system 1100, the proportional plus reset controller 1168 is utilized by the following functions: the megawatt feedback loop 1091, the impulse pressure feedback loop 1816 and the speed feedback loop made up of the rated speed reference 1074, the compare function 1076 and the actual turbine speed function 1076.

PANEL TASK

The DEH Operator's Panel is the focal point of turbine operation; it has been designed to make use of the latest digital techniques to provide maximum operational capability. The Operator's Panel provides the primary method of communicating information and control action between the operator and the DEH Control System. This is accomplished through a group of pushbuttons and a keyboard (which together initiate a number of diverse actions), and two digital displays (which provide the operator with visual indication of internal DEH system numerical values).

When pressed, any of the buttons on the Operator's Panel provide momentary action during which a normally-open contact is connected to an electronic diode matrix. Operation of a button energizes a common computer interrupt for the Operator's Panel and applies voltage to a unique combination of 6 contact inputs assigned as a pushbutton decoder. The diode matrix may be used to identify up to 60 pushbuttons. When a button is pressed, the associated interrupt is read within 64 μ sec, and the corresponding contact inputs scanned and stored in computer memory as a bit pattern for further processing.

Each of the buttons on the panel are backlighted. When a button is pressed and appropriate logical conditions exist, the lamp is turned on to acknowledge to the operator that the action he initiated has been carried out. Should the proper logical conditions not be set, the lamp is not turned on. This informs the operator that the action he requested cannot be carried out.

A few of the buttons are of the digital push-push type which when pushed once initiate an action, and when pushed again suppress that action. Some of these buttons also contain a split lens which indicates one action in the upper half of the lamp and another (usually opposite) action in the lower lens. In addition, certain button backlights are flashed under particular operating circumstances and conditions.

The buttons and keys on the Operator's Panel may be grouped in broad functional groups according to the type of action associated with each set of buttons. A brief description of these groups follows:

1. CONTROL SYSTEM SWITCHING — These buttons alter the configuration of the DEH Control System by switching in or out certain control functions. Examples are throttle pressure control and impulse pressure control.
2. DISPLAY/CHANGE DEH SYSTEM PARAMETERS — These buttons allow the operator to visually display and change important parameters which affect the operation of the DEH system. Examples are the speed and load demand, high and low load limits, speed and load rate settings, and control system tuning parameters.
3. OPERATING MODE SELECTION — This group of buttons provides the operator with the ability to select the turbine operating mode. Examples are permitting an Automatic Synchronizer or an Automatic Dispatch System to set the turbine reference, or selecting local operator automatic control of the turbine (which includes hold/go action).
4. VALVE STATUS/TESTING/LIMITING — This group of buttons allows valve status information display, throttle/governor valve testing, and valve position limit adjustment.
5. AUTOMATIC TURBINE STARTUP — This group of buttons is used in conjunction with a special DEH program which continuously monitors important turbine variables, and which also may start up and accelerate the turbine during wide-range speed control.
6. MANUAL OPERATION — These buttons allow the operator to manually control the position of the turbine valves from the Operator's Panel. The DEH PANEL task has no direct connection with this group of buttons.
7. KEYBOARD ACTIVITY — These buttons and keys allow numerical data to be input to the DEH system. Such information may include requests for numerical values via the display windows, or may adjust system parameters for optimum performance.

The panel task 1112 responds to the buttons pressed on the operator's panel 1130 by an operator of the DEH control system 1100. The control panel 1130 is shown in FIGS. 7 and 8. Referring now to FIG. 18, the interactions of the panel task 1112 are shown in greater detail. Pushbuttons 1110 are decoded in a diode decoding network 1912 which generates contact inputs to activate the panel interrupt program 1156. The panel interrupt program scans the contact inputs and bids the panel task 1112 whereby the the pressed button is decoded and either the panel task 1112 carries out the desired action or the logic task 1110 is bid or the visual display task 1134 is called to carry out the desired command.

CONTROL PROGRAM

Automatic control of turbine speed and load requires a complex, interacting feedback control system capable of compensating for dynamic conditions in the power system, the boiler and the turbine-generator. Impulse chamber pressure and shaft speed from the turbine, megawatts from the generator, and throttle pressure from the boiler are used in the controlled operation of the turbine.

In addition to the primary control features discussed above, the DEH system also contains provisions for high and low load limits, valve position limit, and throttle pressure limit; each of these can be adjusted from the Operator's Panel. A number of auxiliary functions are also available which improve the overall turbine performance and the capabilities of the DEH system. Brief descriptions of these follow:

1. Valve position limit adjustment from the Operator's Panel.
2. Valve testing from the Operator's Panel.
3. Speed signal selection from alternate independent sources.
4. Automatic instantaneous, and bumpless operating-mode selection from the Operator's Panel.
5. A continuous valve position monitor and contingency-alert function for the operator during automatic control.
6. A digital simulation and training feature which allows use of the Operator's Panel and most of the DEH system at any time on manual control, without affecting the turbine output or valve position. This powerful aid is used for operator and engineer training, simulation studies, control system tuning or adjustment, and for demonstration purposes.

In order to achieve these objectives, the CONTROL task is provided with analog inputs representing the various important quantities to be controlled, and also is supplied with contact inputs and system logical states.

Figure 20:
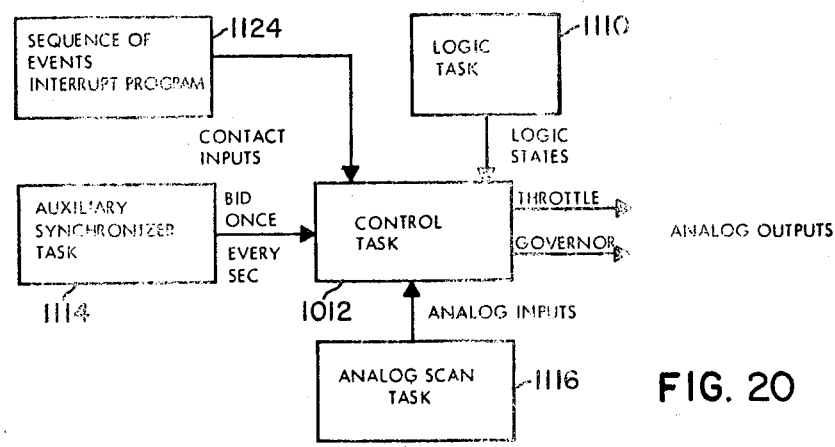
FIG. 20 is a block diagram showing a control task interface which is operable in accordance with the principles of the invention.

The control program 1012 and related programs are shown in greater detail in FIG. 20. In the computer program system, the control program 1012 is interconnected with the analog scan program 1116, the auxiliary sync program 1114, the sequence of events interrupt program 1124 and the logic task 1110. FIG. 55 shows a block diagram of the control program 1012. The control program 1012 accepts data from the analog scan program 1116, the sequence of events interrupt program 1124 and is controlled in certain respects by the logic program 1110 and the auxiliary synchronizing program 1114. The control program 1012, upon receiving appropriate inputs, computes the throttle valve TV1–TV4 and the governor valve GV1–GV8 outputs needed to satisfy speed or load demand.

The control program 1012 of the DEH control system 1100 functions, in the preferred embodiment, under three modes of DEH system control. The modes are manual, where the valves GV1-GV8 and TV1-TV4 are positioned manually through the hardwired control system and the DEH control computer tracks in preparation for an automatic mode of control. The second mode of control is the operator automatic mode, where the valves GV1-GV8 and TV1-TV4 are positioned automatically by the DEH computer in response to a demand signal entered from the keyboard 1130, of FIG. 8. The third mode of control is remote automatic mode, where the valves GV1-GV8 and TV1-TV4 are positioned automatically as in the operator automatic mode but use the automatic turbine startup program 1141 or an automatic synchronizer or an automatic dispatch system for setting the demand value.

VALVE POSITION LIMIT FUNCTION SUBROUTINE

Figure 22:
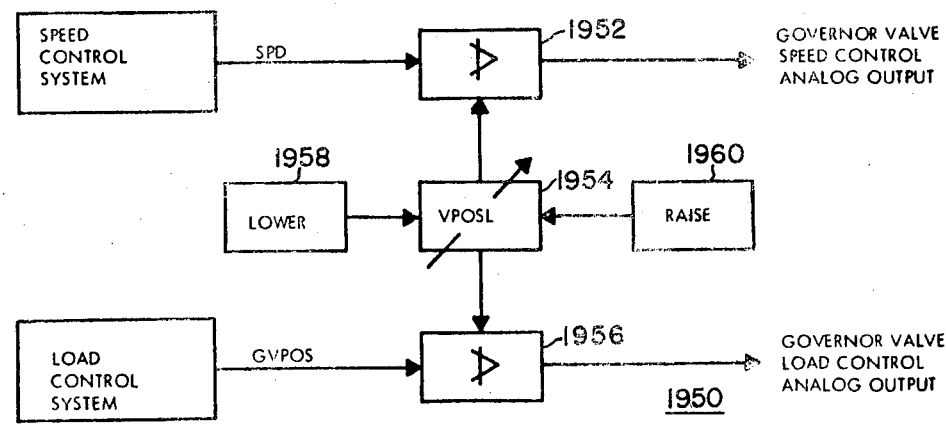
FIG. 22 is a block diagram showing a valve position limit function which is operable in accordance with the principles of the invention.
Figure 21:
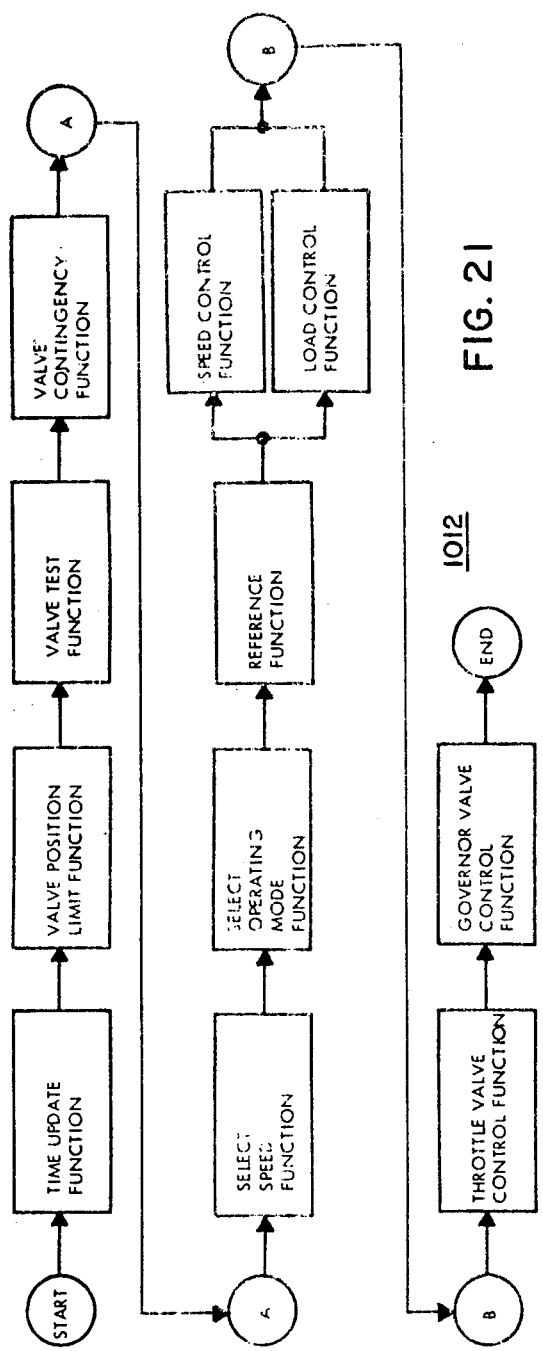
FIG. 21 is a block diagram showing a control program which is operable in accordance with the principles of the invention.
Figure 23:
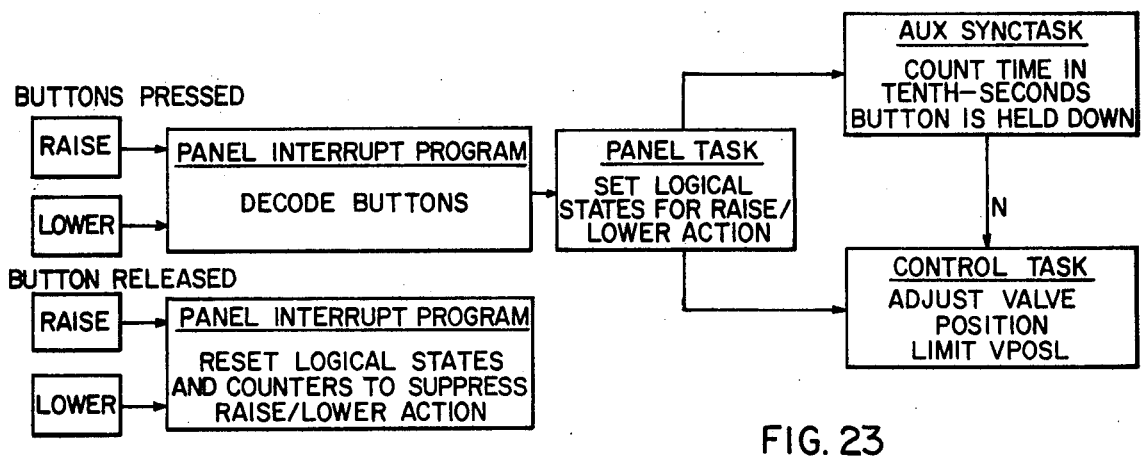
FIG. 23 is a block diagram showing a valve position limit adjustment function which is operable in accordance with the principles of the invention.

Referring now to FIGS. 22 and 23, a block diagram of the valve position limit function subroutine 1950 is shown in detail. A speed control signal is limited by limit function 1952 which is controlled by the valve position limit function 1954 (VPOSL); similarly the governor valve speed signal (GVPOS) signal is limited by limiting function 1956. The valve position limit function 1954 may be raised by a raise function 1960 and lowered by a lower function 1958.

VALVE CONTINGENCY FUNCTION

Figure 24:
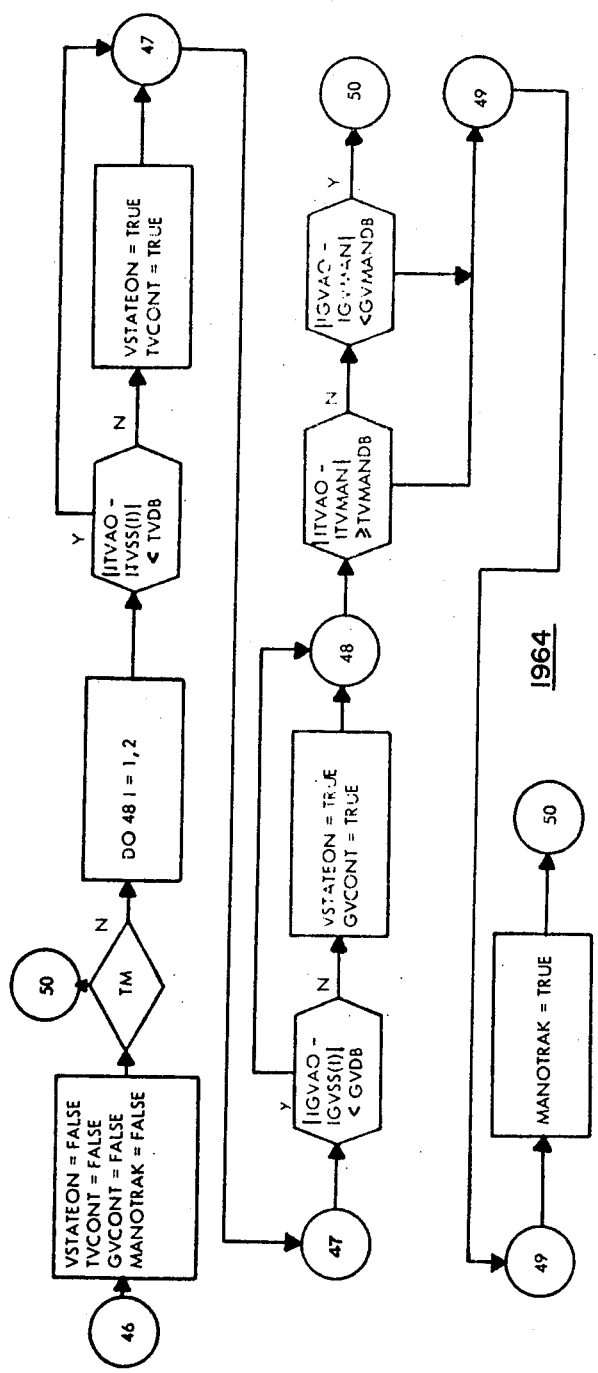
FIG. 24 is a flow chart showing a valve contingency program which is operable in accordance with the principles of the invention.

A valve contingency function 1964 is shown in the flow chart of FIG. 24. In the automatic control mode, the valve contingency function subroutine 1964 continuously checks for discrepancies between the positions of the governor valves GV1 to GV8 called for by the DEH controller system 1100 and the actual valve positions sensed by a linear variable differential transformer LVDT of FIG. 4. If the discrepancy between the sensed and actual positions exceeds a predetermined value set on the keyboard 1860 of the operator's panel 1130, shown in FIG. 8, a valve status lamp 1966 warns the operator of the discrepancy situation.

The valve contingency subroutine 1964 interfaces with the process and the operator through the analog scan program 1116 and the operator's panel 1130 of FIG. 6.

SELECT OPERATING MODE FUNCTION

Input demand values of speed, load, rate of change of speed, and rate of change of load are fed to the DEH control system 1100 from various sources and transferred bumplessly from one source to another. Each of these sources has its own independent mode of operation and provides a demand or rate signal to the control program 1020. The control task 1020 responds to the input demand signals and generates outputs which ultimately move the throttle valves TV1 through TV4 and/or the governor valves GV1 through GV8.

With the breaker 17 open and the turbine 10 in speed control, the following modes of operation may be selected:

1. Automatic synchronizer mode — pulse type contact input for adjusting the turbine speed reference and speed demand and moving the turbine 10 to synchronizing speed and phase.
2. Automatic turbine startup program mode — provides turbine speed demand and rate.
3. Operator automatic mode — speed, demand and rate of change of speed entered from the keyboard 1860 on the operator's panel 1130 shown in FIG. 8.
4. Maintenance test mode — speed demand and rate of change of speed are entered by an operator from the keyboard 1860 on the operator's control panel 1130 of FIG. 8 while the DEH system 1100 is being used as a simulator or trainer.
5. Manual tracking mode — the speed demand and rate of change of speed are internally computed by the DEH system 1100 and set to track the manual analog back-up system 1016 as shown in FIG. 4 in preparation for a bumpless transfer to the operator automatic mode of control.

With the breaker 17 closed and the turbine 10 in the level mode control, the following modes of operation may be selected:

1. Throttle pressure limiting mode — a contingent mode in which the turbine load reference is run back or decreased at a predetermined rate to a predetermined minimum value as long as a predetermined condition exists.
2. Run-back mode — a contingency mode in which the load reference is run back or decreased at a predetermined rate as long as a predetermined condition exists.
3. Automatic dispatch system mode — pulse type contact inputs are supplied from an automatic dispatch system to adjust turbine load reference and demand when the automatic dispatch system button 1870 on the operator's panel 1130 is depressed.
4. Operator automatic mode — the load demand and the load rate are entered from the keyboard 1830 on the control panel 1130 in FIG. 8.
5. Maintenance test mode — load demand and load rate are entered from the keyboard 1860 of the control panel 1130 in FIG. 8 while the DEH system 1100 is being used as a simulator or trainer.
6. Manual tracking mode — the load demand and rate are internally computed by the DEH system 1100 and set to track the manual analog back-up system 1016 preparatory to a bumpless transfer to the operator automatic mode of control.

The select operating mode function responds immediately to turbine demand and rate inputs from the appropriate source as described above. This program determines which operating mode is currently in control by performing various logical and numerical decisions, and then retrieves from selected storage locations the correct values for demand and rate. These are then passed on to the succeeding DEH control programs for further processing and ultimate positioning of the valves. The select operating mode function also accommodates switching between operating modes, accepting new inputs and adapting the DEH system to the new state in a bumpless transfer of control.

Various contact inputs are required for raise and lower pulses, manual operation, maintenance test, and so forth; these are handled by the SEQUENCE OF EVENTS interrupt program and the PLANTCCI subroutine, which performs a contact input scan. In addition, certain panel pushbuttons affect the operating mode selection; these are handled by the PANEL INTERRUPT program and the PANEL task, which decode and classify the pushbuttons pressed. The LOGIC task then checks all permissive conditions and current control system status, and computes the appropriate logical states for interpretation by the CONTROL task and the SELECT OPERATING MODE program.

Figure 25:
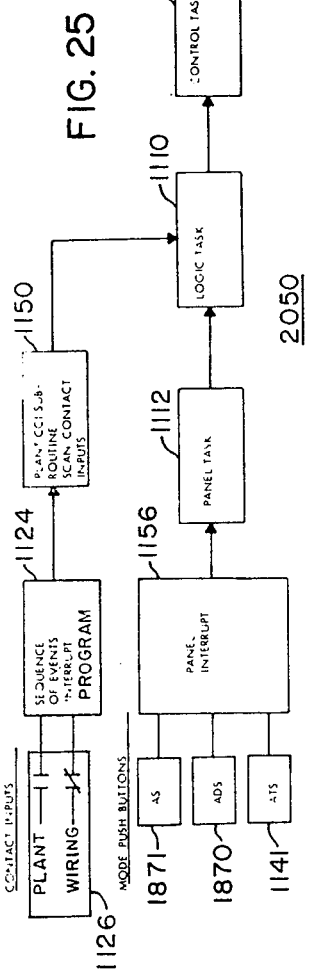
FIG. 25 shows a block diagram of an operating mode selection function which is operable in accordance with the principles of the invention.

Referring now to FIG. 25, a block diagram is shown illustrating the select operating mode function 2050. Contact inputs from plant wiring 1126 activate the sequence of events interrupt program 1124 which calls the plant contact input subroutine 1150, to scan the plant wiring 1126 for contact inputs. Mode pushbuttons such as automatic turbine startup 1141, automatic dispatch system 1170 and automatic synchronizer 1871 activate the panel interrupt program 1156 which calls the panel program 1112 for classification and which in turn calls upon the logic program 1110 to compute the logic states involved. The logic program 1110 calls the control program 1020 to select the operating mode in that program.

Figure 26A:
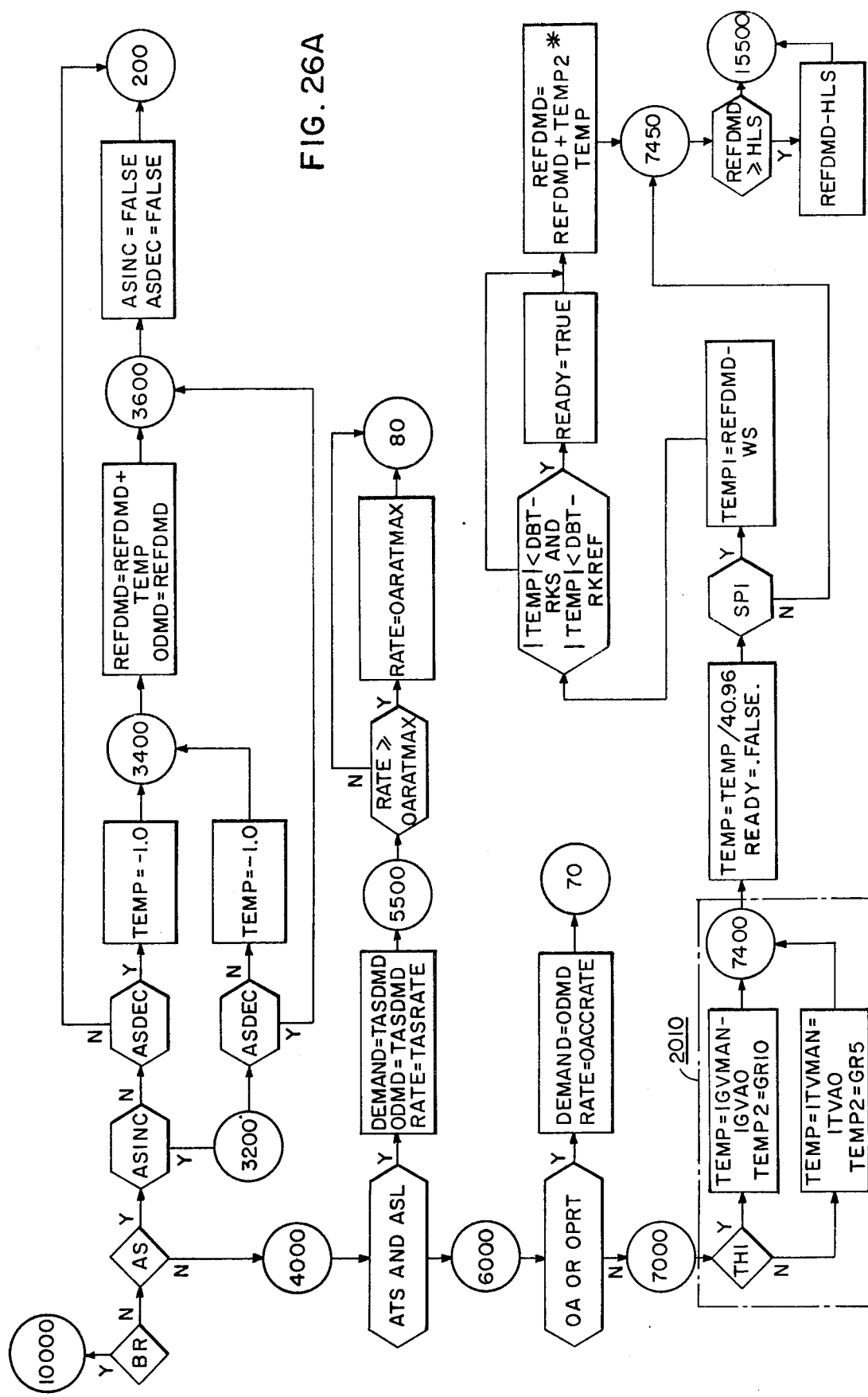
FIGS. 26A and 26B show a flow chart of a select operating mode function which is operable in accordance with the principles of the invention.
Figure 26B:
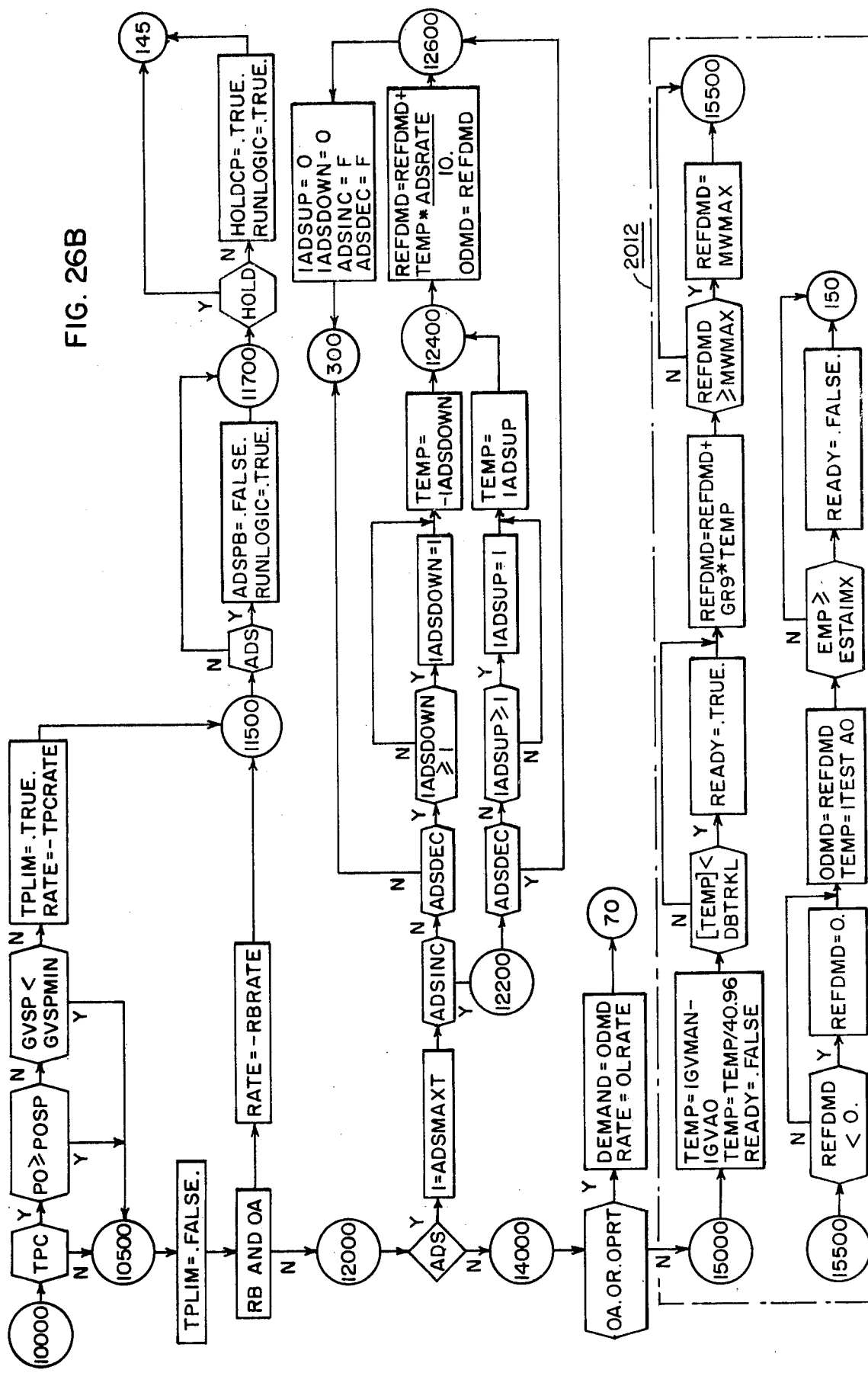

In FIGS. 26A and 26B a flow chart of the select operating mode logic is shown. As one example of mode selection referring to a path 2023, after a statement 7000, provisions are made for a bumpless transfer from an automatic or test mode to an operator mode. The bumpless transfer is accomplished by comparing the computer outputs and the operator mode output signals for the governor valve GV1–GV4 positions. The DEH system 1110 inhibits any transfer until the error between the transferring output and the output transferred is within a predetermined deadband (DBTRKS). Bumpless transfer is accomplished by the DEH control system 1100 by comparing output from one mode of control of the governor valves GV and the throttle valves TV and the same output from another output mode controlling the same parameters. The flow chart of FIGS. 26A and 26B shows mode selection for a complete operating system. In a hardwired or analog control system, the analog parameter output, to be transferred to must continuously track the parameter output to be transferred from. This tracking method is expensive and cumbersome since it has to be done continuously and requires complex hardware. However, in a digital system, such as the DEH control system 1100, the equating of the two parameter outputs need be performed only on transfer. Therefore, great economy of operation is achieved.

SPEED/LOAD REFERENCE FUNCTION

Figure 27:
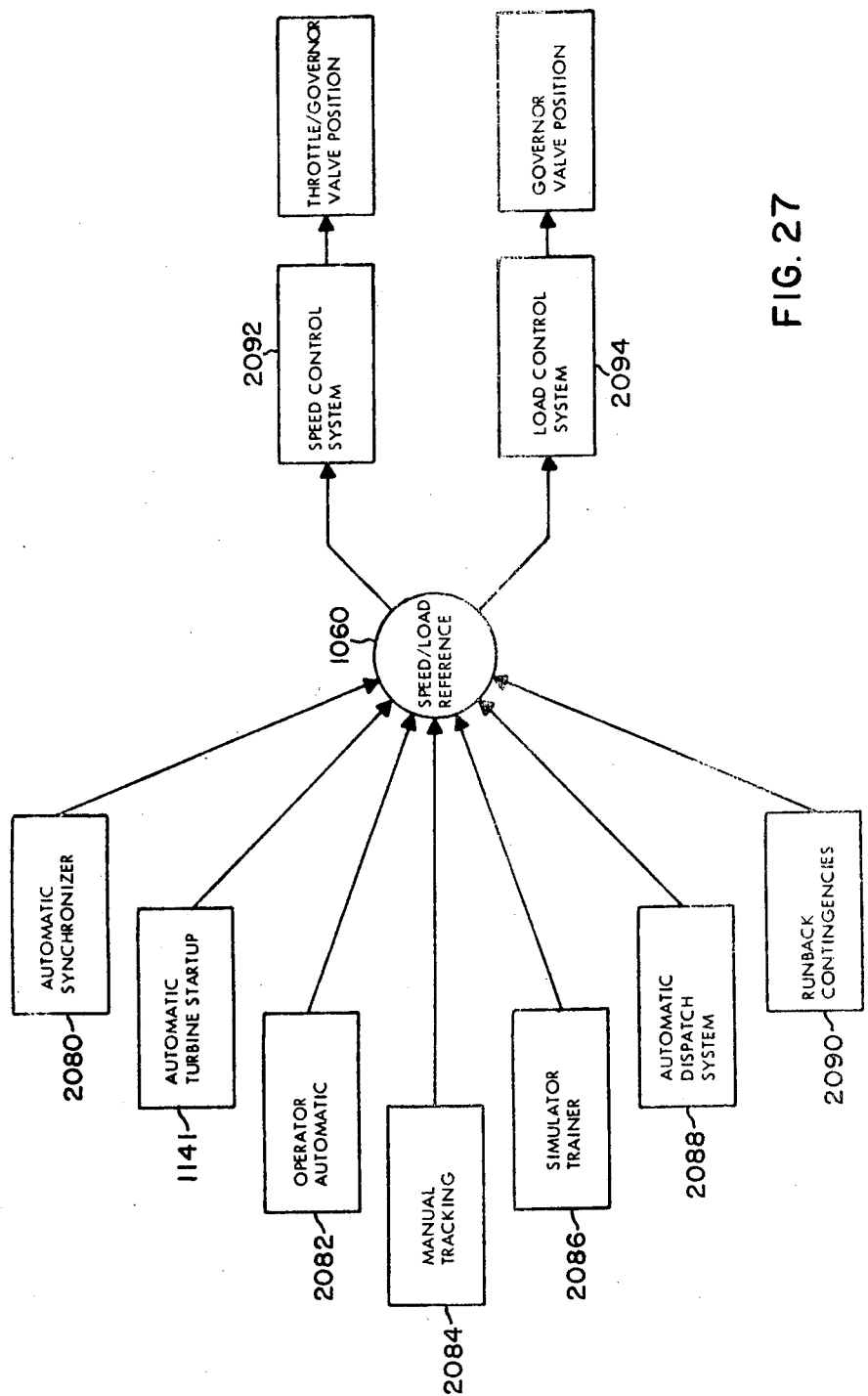
FIG. 27 shows a symbolic diagram of the use of a speed/load reference function which is operable in accordance with the principles of the invention.

In the DEH turbine controller, the speed/load reference is the central and most important variable in the entire control system. The reference serves as the junction or meeting place between the turbine speed or load demand, selected from any of the various operating modes discussed in the last section, and the Speed or Load Control System, which directs the reference through appropriate control system strategy to the turbine throttle and governor valves to supply the requested demand. FIG. 27 is a diagram which indicates the central importance of the reference in the DEH control system.

The speed/load reference function increments the internal turbine reference at the selected rate to meet the selected demand. This function is most useful when the turbine is on Operator Automatic, on the AUTOMATIC TURBINE STARTUP program, or in the Simulator/Trainer modes. This is because each of these control modes requests unique rates of change of the reference, while the remaining control modes, such as the Automatic Synchronizer and the Automatic Dispatch System, move the reference in pulses or short bursts which are carried out in one step. The Runback and Throttle Pressure contingency modes use some of the features of the reference function, but they bypass much of the subtle reference logic in their hurry to unload the turbine.

For these modes which request movement of the reference at a unique rate, the reference function must provide the controlled motion. Not only must the rate be ramped exactly, but the logic must be such that, at the correct time, the reference must be made exactly equal to the demand, with no overshoot or undershoot. In addition, the reference logic must be sensitive to the GO and HOLD states, and must start or stop movement instantly if requested to do so. Finally, the reference system must turn off the GO and HOLD lamps, if conditions dictate, by passing on to the LOGIC task the proper status information to accomplish this important visual indication feature.

The decision breaker function 1060, of FIG. 5, is identical to the speed/load reference function 1060, of FIG. 27. A software speed control subsystem 2092 of FIG. 27, corresponds to the compare function 1062, the speed reference 1066 and the proportional plus reset controller function 1068, of FIG. 5. The software load control subsystem 1094, of FIG. 27, corresponds to the rated speed reference 1074, the turbine speed 1076, the compare function 1078, the proportional controller 1080, the summing function 1972, the compare function 1082, the proportional plus reset controller function 1084, the multiplication function 1086, the compare function 1090, the impulse pressure transducer 1088 and the proportional plus reset controller 1092, of FIG. 5. The speed/load reference 1060 is controlled by, depending upon the mode, and automatic synchronizer 1080, the automatic turbine starter program 1141, and operator automatic mode 1082, a manual tracking mode 2084, a simulator/trainer 2086, an automatic dispatch system 2088, or a run-back contingency load 2090. Each of these modes increments the speed/load reference function 1060 at a selected rate to meet a selected demand.

LOGIC TASK

Governor Control Logic

Control of turbine steam flow with the governor valves is required during speed and load control. Normally governor control is initiated when the turbine has been accelerated to near synchronous speed, after which the unit is brought up to synchronous speed, synchronized and then loaded with the governor valves as the normal mode of operation.

The governor control logic detects turbine latch and unlatching conditions, transfer from throttle valve to governor valve control, and manual operation of the governor valves. When any of these conditions occur, the governor logic must align the DEH system to the appropriate governor control state.

The governor control flip-flop (GC) may be set by a number of conditions, the most common of which occurs on automatic control when the operator presses the transfer TV/GV pushbutton (TRPB). Assuming that the governor valves are at their maximum open position as indicated by GVMAX and that the automatic turbine startup mode (ATS) is not selected, then the governor flip-flop will be set. An alternate path for setting this flip-flop occurs if the automatic turbine startup program (ATS) requests transfer via the logical variable ATSTRPB. In addition, when the throttle valves reach about 90 percent position, a contact input (THI) is activated by the analog backup system, and this contact sets the GC flip-flop. This last case occurs when the turbine is a manual control. Finally, the governor control flip-flop is reset when the turbine latch contact input (ASL) is released.

Following the GC flip-flop, a decision is made to determine if the system has just switched to governor control by comparing GC with its last state (GCX). If transfer has just occurred, the turbine speed (WS) at this instant is saved as WSTRANS, the speed at throttle-/governor valve transfer. This value is used in the CONTROL task for a special valve position control logic decision. The last operation in the governor control program is to call the LCCO subroutine to update the GC lamp.

THROTTLE VALVE CONTROL LOGIC

Control of turbine steam flow with the throttle valves is required when the turbine is initially rolled and during speed control up to the point of transfer to governor valve control. After this the throttle valves are kept wide open during normal operation. The throttle control logic detects turbine latch and unlatching conditions, transfer from throttle to governor valve control, and manual operation of the throttle valves. When any of these conditions occur the throttle logic must then align the DEH system to the appropriate throttle control state.

The throttle control state (TC) is simply the logical inverse of the governor control state (GC) when the turbine is latched. However, the throttle control lamp flip-flop (TCLITE) may be set by either TC or by manual operation (TM) while the throttle valves are below 90 percent open as indicated by the contact input (THI) not being set. The TCLITE flip-flop is reset by the contact input (THI) indicating throttle valves wide open or by the turbine latch contact input (ASL) not set.

The throttle control logic also indicates that the transfer from throttle to governor valve state (TRTVGV) is underway when governor control (GC) exists but the throttle valves are not yet wide open. In addition, the transfer complete state (TRCOM) is set when the throttle valves are wide open on governor control as indicated by THI. Finally, the program sets various contact outputs to pass this information on to the plant and operating personnel by calling the LCCO subroutine.

PANEL TASK

The PANEL task is assigned priority level $C_{16}(12_{10})$ and is bid by the PANEL INTERRUPT program when a button is pressed.

FIG. 19 shows a block diagram of the major functions performed by the PANEL task. These include executing each of the button group functions discussed above, as well as additional decisions, checks, and bookkeeping necessary to properly perform the action requested by the operator.

BUTTON DECODE

The BUTTON DECODE program examines the button identification (IPB) provided by the PANEL INTERRUPT program, and transfers to the proper location in the PANEL task to carry out the action required by this button. The program also does some bookkeeping checks necessary to keep the panel lamps in the correct state. A total of 54 buttons can be decoded in the current version of the DEH PANEL task.

The identification of the last button (IPBX), which had been pressed and which has associated with it a visual display mode lamp, is stored in a temporary integer location (JJ) for later use in turning off the last lamp. Then the current button identification (IPB) is checked to determine if it represents the ENTER pushbutton; if so, a special logical variable ENTERPB is reset for later use should the ENTER button be pressed two or more consecutive times. This has been found to be a rather common operator error and is flashed as an invalid request. The program then simply executes a FORTRAN computed GO TO statement and transfers to the appropriate portion of the PANEL task.

CONTROL SYSTEM SWITCHING

There are six buttons on the Operator's Panel which may switch control states of the DEH system. A brief description of each follows:

1. TRANSFER TV/GV—This button initiates a transfer from throttle valve to governor valve control during wide-range speed operation. The pushbutton has a slit lens. When control is on the throttle valves, the upper half of the lens is backlighted. When the button is pressed, to transfer control, the entire lens is backlighted. At the completion of the transfer, only the bottom half of the lens remains on. Once the DEH system is on governor control, it stays in this mode until the turbine is tripped and relatched. At this time, it is again in throttle valve control.
2. IMPULSE PRESSURE FEEDBACK IN/OUT—This is a push-push button with split lens. It places the impulse pressure feedback loop in or out of service, with appropriate backlighting of the button lens.
3. MEGAWATT FEEDBACK IN/OUT—This is a push-push button with split lens. It places the megawatt feedback loop in or out of service, with appropriate backlighting of the button lens.
4. SPEED FEEDBACK IN/OUT—This split lens button places the speed feedback loop in service in the DEH system. Normally the speed loop is always in service; however, when the DEH CONTROL task detects a speed channel failure condition in which all speed input signals are unreliable, the speed feedback loop is disabled and the speed channel monitor lamps turned on. When the speed inputs become reliable, the monitor lamps are turned off, thus indicating to the operator that he may place the speed feedback loop back in service. As long as the speed signals are reliable, the operator cannot take the speed loop out of service.
5. THROTTLE PRESSURE CONTROL IN/OUT—This is a push-push button with split lens which places the throttle pressure controller in or out of service, with appropriate backlighting of the lens.
6. CONTROLLER RESET—This button restores the DEH system to an active operating state after the computer has been stopped due to a power failure or hardware/software maintenance.

The logical variable TRPB is set when the TRANSFER TV/GV button is pressed. The impulse pressure, megawatt, and throttle pressure logical states (IPIPB, MWIPB and TRCPB respectively) are set to the logical inverse of their previous state when the corresponding buttons are pressed. This is the mechanism which provides the push-push nature of these buttons. The logical variable SPIPB is set when the speed feedback button is pressed. Finally, each of these buttons initiate a bid for the LOGIC task by setting the RUNLOGIC variable prior to exit from the PANEL task.

The CONTROLLER RESET button is handled somewhat differently. The state CRESETPB is set by the STOP/INITIALIZE task, which does cleanup and initialization after a computer stop condition. Then CRESETPB is checked; if it is not set, the computer has been running, and thus the button pressed is ignored. If CRESETPB is set, this means the computer had been stopped; CRESETPB is reset and the lamp behind the button is turned off. In addition, the PANEL task effectively presses the speed feedback button by setting the logical state SPIPB. This is done so that the DEH system restarts after a power failure or other computer stop condition with the speed feedback loop in service. The LOGIC task is requested to run by setting the RUNLOGIC state. The REFERENCE display button is also effectively pressed so that the display windows always start out in the same mode after a stop condition on the computer.

DISPLAY/CHANGE DEH SYSTEM PARAMETERS

Eight buttons allow the operator to display or change various DEH system parameters. Six of these buttons are dedicated to the display or change of a single important parameter for each button. The remaining two buttons provide the ability to display or change a group of DEH system variables from each button. In addition, two special buttons (GO and HOLD) are intimately associated with one of the dedicated display/change buttons, and thus are also included in this discussion.

Before listing each of these buttons, a brief description of the display window mechanism is given. The DEH Operator B Panel contains two digital displays which are provided with five windows each. The left display, labeled REFERENCE, has two major functions. It either presents numerical information which currently exists in computer memory for the six dedicated buttons mentioned above, or it accepts address inputs from the keyboard for the two buttons assigned to display or change groups of DEH system variables. The right display, labeled DEMAND, also has two major functions. It either accepts keyboard inputs in preparation for changing any of the currently existing numerical information in computer memory for the six dedicated buttons mentioned above, or it presents currently existing information in computer memory for the two buttons assigned to display or change groups of DEH system variables.

Of the five windows in each digital display, the leftmost is reserved for mnemonic characters. These characters combine to form a short message identifying the numerical quantity in the remaining four windows. The following table lists the 11 available messages and an explanation of each. The four right windows in each display provide the numerical digits 0 through 9 and a decimal point where appropriate.

| MNEMONIC CHARACTER DEFINITION | |
|---|---|
| Message | Explanation |
| MW | Megawatt Symbol for Load Control |
| SPEED | Speed Symbol for Speed Control |
| % VALVE POSITION | Percent Valve Position for Valve Status |
| RPM/MIN | Acceleration Rate |
| MW/MIN | Load Rate |
| SYS PAR | General DEH System Parameter |

| -continued | |
|---|---|
| MNEMONIC CHARACTER DEFINITION | |
| Message | Explanation |
| IMP PRESS % | Impulse Pressure in Percent For Load Control |
| PRESS | General Pressure Variable |
| TEMP | General Temperature Variable |
| VALVE NO. | Valve Identification for Valve Status |
| | Algebraic Negative Quantity |

A brief description of the eight buttons associated with display/change as well as the GO and HOLD buttons, follows:

1. REFERENCE—This button initiates a display or change of the DEH reference and demand for speed or load operation. When the turbine is on operator automatic control, new demand values may be entered from the keyboard. However, when the turbine is in a remote operating mode such as automatic synchronizer, dispatch or ACCELERATION progam, the demand cannot be changed from the keyboard. Any attempt to do so is flashed as an invalid request.

2. ACCELERATION RATE—This button initiates a display or change of the acceleration rate used on wide-range speed operation. When the turbine is on operator automatic control, this value is entered by the operator, and may be changed from the keyboard. However, when the turbine is being accelerated by an AUTOMATIC STARTUP program, the displayed value is the rate selected by this program and cannot be changed from the keyboard. Any attempt to do so is flashed as an invalid request.

3. LOAD RATE—This button initiates a display or change of the load rate used on operator automatic control. This value may be displayed or changed at any time.

4. LOW LIMIT—Ths button is an optional feature which initiates a display or change of the low load limit used on all automatic load control modes. This value may be displayed or changed at any time.

5. HIGH LIMIT—This button is an optional feature which initiates a display or change of the high load limit used on all automatic load control modes. This value may be changed at any time.

Each of these buttons have high or low limits, whichever is appropriate, associated with them when changes are to be made in the values discussed above. Violation of these limits from a keyboard entry is flashed as an invalid request and the entry is ignored. More details of these limits are discussed in a later section where the KEYBOARD program is described.

6. VALVE POSITION LIMIT—This button initiates a display of the governor valve position limit and the quantity being limited. Change or adjustment of the valve position limit is accomplished by raise/lower buttons (described in a later section where the valve buttons are discussed). Any attempt to enter values from the keyboard in this display mode is flashed as an invalid request.

7. VALVE STATUS—This button initiates a display of the status (position) of the turbine throttle and governor valves. Thus, this button is associated with a group of DEH system variables. A description of the steps necessary to carry out this display function is given in later paragraphs (where the valve buttons are discussed).

8. TURBINE PROGRAM DISPLAY—This button initiates a display or change of any DEH system parameter not otherwise addressable with one of the unique buttons described above. These variables include pressures, temperatures, control system tuning constants, and calculated quantities in all parts of the DEH system. A dictionary is provided so that the address of such quantities may be entered from the keyboard. Further discussion of these points is given in later paragraphs where the keyboard is described.

9. GO—This button initiates a special DEH CONTROL program to adjust the turbine reference. The program ultimately positions the valves on operator automatic control. The reference then moves at the appropriate load or acceleration rate until the reference and demand are equal. The updated reference value is continually displayed in the REFERENCE windows so that the operator may observe it changing to meet the demand, which is displayed in the DEMAND windows.

10. HOLD—This button interrupts the reference adjustment process described above, and holds the reference at the value existing at the moment the HOLD button is pressed. In order to continue the adjustment process on the reference, the operator must press the GO button.

A brief description of the steps necessary to display or change any of the first six variables discussed above follows; description of cases 7 and 8 are withheld until a later section. When the operator wishes to display or change any of the DEH dedicated system parameters, he must execute a sequence of steps which result in the desired action. The steps are listed as follows:

1. The operator presses the appropriate button; the DEH programs display the current value of the parameter in the reference windows while the demand windows are cleared to allow for possible keyboard entry.
2. If the operator wishes only to observe the parameter value, then he does nothing else. The value remains in the reference windows until some new button is pressed.
3. If the operator wishes to change the parameter, he types in on the keyboard the new value which he desires. This is displayed in the DEMAND windows, but will not yet be entered into the DEH programs.
4. If the operator is satisfied with the new value as it appears in the demand windows, he may enter the new quantity into the DEH operating system by pressing the ENTER button. The ENTER button is described in more detail in a later section on the keyboard. p0 5. If for any reason the operator is not satisfied with the value as it appears in the demand windows, he may press the CANCEL button. The CANCEL button will be described in more detail in a later section on the keyboard. This removes the number from the DEMAND windows and allows the operator to begin a new sequence for the parameter.
6. Assuming that the operator is satisfied with the number and that he presses the ENTER button, the new value of the parameter appears in the REFERENCE window and the DEMAND window is cleared. This is an acknowledgment that the DEH programs have accepted the number and are using the new value from that point on.
7. If for any reason the numerical value entered into the DEH system violates preprogrammed conditions (such as high limits less than low limits), the entire operation is aborted and the INVALID REQUEST lamp is flashed.

The above description of data manipulation is modified somewhat when the operator wishes to display or change the turbine reference and demand. Both of these quantities are displayed when the reference button is pressed. During wide-range speed control, the left REFERENCE display contains the turbine speed reference value, while the right DEMAND display contains the turbine speed demand. During load control the REFERENCE display contains the turbine load reference while the demand display contains the turbine load demand.

Since the reference and demand control the turbine valves directly, it is essential that the operator have a unique handle on these quantities so that he may start or stop reference changes quickly and easily. This is accomplished by use of the GO and HOLD buttons in conjunction with the reference button. The GO and HOLD buttons control two reference states in the DEH system, which indicate whether the reference and demand are equal or unequal. When these quantities are equal, both the GO and HOLD backlights are off. When these quantities are unequal, either the GO or the HOLD lamp is on. If the GO light is turned on, the reference is changing to meet the demand value at the selected rate. Should the operator wish to stop the reference adjustment process, he simply presses the HOLD button. The HOLD button then backlights and holds the reference at its current value. When the operator wishes to start the reference moving again, he must press the GO button, which then backlights and enables the reference to adjust to the proper value.

The sequence of steps for displaying or changing the reference follows:

1. The operator presses the reference button. The DEH programs display the current value of reference in the left windows and the current value of demand in the right windows.
2. If the operator wishes to change the demand, he types the new value on the keyboard. This is displayed in the DEMAND windows, but is not yet entered into the DEH programs.
3. If the operator is satisfied with the new value, he presses the ENTER button. This places the new demand value in the DEH programs and turns the HOLD lamp, assuming that the new demand satisfies certain limit checks to be described shortly. If these conditions are not met, the INVALID REQUEST lamp is flashed, the new value is ignored, and the original value is returned to the DEMAND windows.
4. If the operator is not satisfied with the new value (set in Step 3), he simply presses the CANCEL button. The DEH programs then ignore this value and return the original value to the DEMAND windows.
5. If a new demand is finally entered and the HOLD lamp comes on, the operator may start the reference adjusting to this new demand by pressing the GO button. The HOLD lamp is turned off, the GO lamp is turned on, and the reference begins to move at the selected rate toward the demand.
6. At any time, the operator may inhibit the reference adjustment by pressing the HOLD button. He may then restart the reference adjustment by pressing the GO button.
7. When the reference finally equals the demand both the GO and HOLD lamps will be turned off.

Each of the eight display buttons set the integer pointer (IPBX) to its assigned value and the appropriate panel lamps are turned off and on. IPBX is then checked by the VISUAL DISPLAY task, which selects the numerical values from computer memory and displays then in the windows.

The TURBINE PROGRAM DISPLAY button also resets a few logical states in preparation for keyboard entries. These are discussed in later paragraphs on the keyboard description. The remote control modes AS, ADS and ATS for the Automatic Synchronizer, Dispatch System and TURBINE STARTUP program are checked, along with the manual control state (TM) if the maintenance test switch (OPRT) is not set. All of these modes exclude the possibility of the GO and HOLD buttons being active, so these buttons are ignored in these states and the PANEL program simply exits. However on operator automatic control, the HOLD button state (HOLDPB) is set, or the GO button state (GOPB) is set. In the latter case, HOLDPB is also reset. The LOGIC task is requested to run by setting the RUNLOGIC variable, and the program then exits.

OPERATING MODE SELECTION

There are five buttons which may be used to select the turbine operating mode. When any of these are pressed, they initiate major operating changes in the DEH Control System, assuming the proper conditions exist for the mode selected. A brief description of these buttons follows:

1. OPERATOR AUTOMATIC (OPER AUTO)—This button places the turbine in automatic control with the operator providing all demand, rate, and set point information from the keyboard. If the turbine had been previously in manual control, the OPER AUTO lamp must be flashing to indicate that the DEH system is ready to accept automatic control; otherwise pressing the OPER AUTO button is ignored. If the turbine had been in one of the remote control modes listed below, then pressing the OPER AUTO button rejects the remote and returns automatic control to the operator.
2. AUXILIARY SYNCHRONIZER (AUTO SYNC)—This button allows automatic synchronizing equipment to synchronize the turbine generator with the power system by indexing the speed demand and reference with raise/lower pulses, in the form of contact inputs.
3. AUTOMATIC DISPATCHING SYSTEM (ADS)—This button allows automatic dispatching equipment to operate the turbine generator by setting the load demand and reference. A number of dispatching options are available, including raise/lower pulses, raise/lower pulse-width modulation, and analog input values to set the reference.
4. AUTOMATIC TURBINE STARTUP (TURBINE AUTO START)—This button allows a special computer program to automatically start up and accelerate the turbine during wide-range speed control. The program may reside in the DEH computer or it may exist in another computer in the plant or at a remote location.
5. COMPUTER DATA LINK (COMP DATA LINK)—This optional button allows another computer, either in the plant or at a remote location, to provide all demand, rate, and set point information to the DEH system.

The OPER AUTO button resets the remote mode button states (ASPB, ADSPB and AUTOSTAR) for Automatic Synchronizer, the Automatic Dispatch System, and the AUTOMATIC TURBINE STARTUP program, respectively. Since the operator automatic state (OA) is merely the logical inverse of the turbine manual state (TM), the PANEL task cannot actually set OA, but can only request the LOGIC task to run, by setting the RUNLOGIC variable. The LOGIC program then determines whether or not operator automatic is accepted by the manual backup system.

The remote buttons set their corresponding pushbutton states after which RUNLOGIC is set. As in the case of operator automatic, the LOGIC task then determines if the requested mode will be accepted.

The data link button is handled somewhat differently; this is a push-push button whose state (DLINK) is given the logical inverse of its previous value at statement 14. The new state is then interrogated in order to determine whether to turn the button backlight on or off, after which the program exits.

MANUAL BUTTONS

Six buttons on the Operator's Panel are associated with manual operation of the turbine. Even though the DEH PANEL program does not interface directly with these buttons, a brief description of their funcion is given for completeness. In general, these buttons allow the operator to control the position of the turbine throttle and governor valves directly from the panel.

1. TURBINE MANUAL—This button places the turbine under manual control of the operator, with the transition from automatic being achieved essentially bumplessly.
2. TV LOWER—This button lowers, or decreases, the throttle valves at a fixed rate as long as the button is held down.
3. TV RAISE—This button raises, or increases, the throttle valves at a fixed rate as long as the button is held down.
4. GV LOWER—This button lowers, or decreases, the governor valves at a fixed rate as long as the button is held down.
5. GV RAISE—This button raises, or increases, the governor valves at a fixed rate as long as the button is held down.
6. FAST ACTION—This button opens or closes the throttle and governor valves, at a fast rate, in manual control. The FAST ACTION button must be held down at the same time as any of the TV or GV RAISE/LOWER buttons described above to achieve the fast action effect.

KEYBOARD ACTIVITY

There are fourteen buttons associated with keyboard activity on the DEH Operator's Panel. Of this total, eleven are numerical keys; these include the integers 0 through 9 and a decimal point. Three additional buttons are available for use with the keyboard to aid in data display or change. A brief description of these buttons follows:

1. NUMERICAL BUTTONS 0 THROUGH 9—When the operator keys in numbers of these buttons, the corresponding values are displayed in the reference or demand windows, whichever are appropriate, for the function being performed. The values move from right to left in the windows as new keys are pressed, and both leading and trailing zeros are always displayed. If more than four numerical keys are pressed, the leftmost value in the windows is lost as the new value is entered in the right-most window, and the remaining values shift left one position.

2. DECIMAL POINT BUTTON—When the decimal point key is pressed, the PANEL program retains this information but does not yet display it. When the next numerical key is pressed, both the value and the decimal point appear in the right-most window. The decimal point is positioned in the lower left-hand corner of the window position. Should additional numerical keys be pressed, the decimal point moves one position to the left with the number with which it was originally entered. Should the decimal point be shifted out of the left-most window it is lost, and a new point may be entered.

3. ENTER—When this button is pressed, the PANEL program enters the value residing in the reference or demand windows, whichever is appropriate, into core memory and performs the correct action requested by the keyboard activity. This action may consist of visual display, parameter change, or intermediate steps in a sequence of operations as described in preceding sections.

4. CANCEL—When this button is pressed, the PANEL program clears both the reference and demand windows, deletes any intermediate values in computer memory, and aborts the entire sequence of operations which was canceled. The operator may then begin a new sequence of steps.

5. CHANGE—This button indicates a sequence of operations necessary to alter numerical values residing in the DEH system memory. The steps necessary to change parameters are described earlier.

The decimal point key and keys 0–9 are serviced to check the validity of the requested entry and to set the entry if it is valid. Among other checks, a check is made on the integer IPBX, which represents the visual display and change button which has been previously pressed. If this value equals 2, thus indicating the acceleration rate button has been pressed, and the Automatic Turbine Startup mode (ATS) is in control, all keyboard buttons are invalid. During the ATS mode the acceleration rate is controlled by the startup program, and thus may be visually displayed but cannot be changed from the keyboard.

Should the ATS state be satisfied, the pointer IPBX is checked to determine if it is equal to 6; if so, the keyboard entry is flashed as invalid because this represents the valve position limit display mode, which cannot use the keyboard. If this situation is all right, the valve test button state (VTESTPB) is checked; should VTESTPB be set and the value being tested NVTEST is non-zero, the keyboard entry is invalid. This is because NVTEST indicates that some valve has already been selected for test, thus implying that no further keyboard activity is necessary.

Finally, some special tests are made if IPBX equals 1; this means the reference display mode has been selected. If this is the case, all remote control modes such as Automatic Synchronizer, (AS), Automatic Dispatch System (ADS), and Automatic Turbine Startup (ATS), imply that the keyboard cannot be used during reference display. Thus these result in the INVALID REQUEST lamp being flashed. In addition, should the turbine be on manual control (TM) or unlatched (NOT ASL), and not in the maintenance test mode (OPRT), then keyboard activity is also invalid during reference display. All of these cases are invalid for keyboard entry because the turbine demand and reference are set by the remote mode or the manual tracking system. The only time that the operator may use the keyboard in the reference display mode is during operator automatic control or during the maintenance test condition in which the DEH system is being used as a simulator and trainer.

Should all of these tests be passed properly, the logical state KEYENTRY is set and the numerical value in location KEY is checked. This is the keyboard button which has just been pressed, and must lie between 0 and 9 inclusive; otherwise, the entry is flashed as invalid. For a valid value of KEY, the program then places the new number in its proper position in the integer array (IW). This array has a place for each of the four window positions of the visual display and, as keyboard buttons are pressed, the entries move down one position in IW and the latest key is entered in the top position. The pointer ID maintains the proper position for each new key. Thus, if ID equals 0, this means there are no entries in the array IW. The value KEY is thus placed in the first position of IW. However, if ID is not zero, then a FORTRAN DO loop is executed to move the entries in IW down one position prior to entering the new value of key in the first position at statement 414. Then the value of the pointer ID is checked again; if it is less than 3, it is incremented by 1. If it is equal to 3, it retains that value. This is the mechanism used to accept more than four keyboard values with only the last four key entries being retained.

CONTROL TASK

Valve Contingency Function

In situations where the throttle and governor valves are asked to move very fast, such as the transfer from throttle to governor valve control or when load is changed at a high rate, the VALVE CONTINGENCY program flashes the valve status lamps for a few seconds. This is a normal situation which simply indicates that the valve servo actuator cannot move quite as fast as the DEH system has called for. The lamps flicker briefly and then go out when the LVDT signals catch up to the computer output.

The valve contingency function has a second feature which is executed during automatic control to alert the operator to situations during which the analog backup system 1016 is not tracking the DEH controller valve analog outputs. Under normal conditions, the backup system continuously tracks the computer outputs to assume control bumplessly at any time. However, in certain situations, when the automatic system makes fast valve movements, such as during throttle/governor transfer or large load changes at a high rate, the manual backup tracking system lags for a short interval of time. The valve contingency function indicates this condition by flashing the MANUAL NOT TRACKING monitor lamp on the Operator A Panel. The tracking deadband is a keyboard entered constant for the throttle and governor valves individually; these are normally set at about 1 percent. While the MANUAL NOT TRACKING lamp is flashing, the operator must not transfer to manual control; otherwise, he may sustain a significant bump in the operating conditions any may even place the turbine in an unsafe operating state. In the preferred embodiment, the tracking deadband or discrepancy is a keyboard entered constant individually selectable for each throttle valve TV1, TV2, TV3, TV4 and each governor valve GV1 through GV8. The discrepancy values or deadbands are normally set at about 1%.

The valve contingency function interfaces with the remaining portions of the DEH Control System primarily through the appropriate analog inputs and keyboard entered constants discussed above. Otherwise the function is more or less self-contained.

In the VALVE CONTINGENCY program, all contingency states are reset and the manual control contact input (TM) is interrogated. If the turbine is on manual, nothing else is done in the contingency program. However, if the turbine is on automatic control, a FORTRAN DO loop is executed to evaluate the throttle and governor valve LVDT inputs with respect to the computer outputs. The throttle inputs are stored in the array ITVSS while the governor inputs are in array IGVSS. The throttle contingency deadband is at TVDB and the governor contingency deadband is at GVDB. If either contingency exists, the appropriate contingency state is set for flashing; otherwise no further action is taken.

A similar test is made for the manual not tracking situation. The throttle and governor valve analog outputs (ITVAO and IGVAO) are checked against the manual backup system outputs (ITVMAN and IGVMAN), with deadbands TVMANDB and GVMANDB respectively. If a discrepancy exits, the manual not tracking state is set for flashing; otherwise no action is taken and the program proceeds to the next section.

THROTTLE VALVE CONTROL FUNCTION

Figure 28:
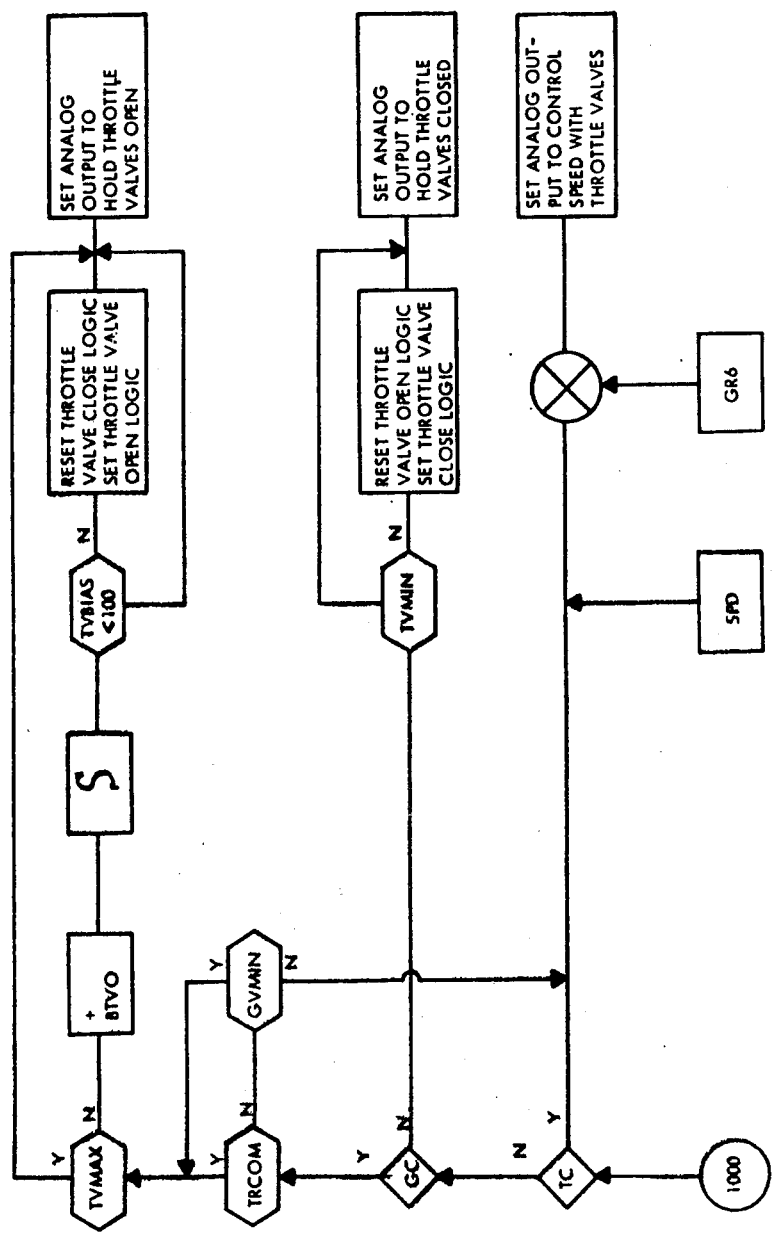
FIG. 28 shows a block diagram of the throttle valve control function which is operable in accordance with the principles of the invention.

The throttle control state (TC) is interrogated (FIG. 28); if it is set, this means the throttle valves are in positive control, and the program computes the throttle valve analog output from the speed controller value (SPD) and the keyboard entered ranging constant (GR6). However, if the throttle control state (TC) is not set, then the governor control state (GC) is checked. If it is not set, this means that the turbine is unlatched and that the throttle valves should be at their minimum position of completely closed. The program then computes the throttle valve analog output of zero.

If the governor control state (GC) is set, it is then necessary to determine if the throttle/governor transfer is complete by checking the TRCOM state. If TRCOM is not set, this means the transfer is still in progress; an additional check is made to determine if the governor valves have closed as indicated by GVMIN. If GVMIN is not set, then the throttle valves are still in positive control and the program computes the throttle valve analog output as required by the speed controller value (SPD) and the ranging gain (GR6).

Eventually the state GVMIN will be set to indicate that the governor valves are now in positive control. Then the throttle valve maximum position state (TVMAX) is questioned. If it is not set, then the throttle valve bias integrator (TVBIAS) is incremented by the bias constant (BTVO) and the throttle valve analog output set accordingly. In a short time the throttle valves are wide open; after this all logical states will be set to indicate this fact. Succeeding passes through the THROTTLE VALVE CONTROL program will then hold the throttle valve analog outputs wide open until the turbine is unlatched and tripped for some reason.

GOVERNOR VALVE CONTROL FUNCTION

The governor valve position, as set by the governor valve control function, is compared to (and high limited by) the valve position limit (VPOSL) at all times. This gives the operator the ability to override the control system at any time that he considers it necessary, and allows him to control the position of the governor valves from VALVE POSITION LIMIT RAISE and LOWER pushbuttons on the Operator's Panel. If the governor valves are limited by the valve position limit (VPOSL), the lamp behind the VALVE POSITION LIMIT DISPLAY pushbutton flashes, thus alerting the operator to the condition.

Various logical numerical checks are necessary to determine which of the five situations the turbine is currently in, on a second-by-second real time basis. Further, the actual governor valve analog output computation is made for each of these five situations, along with the valve position limit checking feature and additional bookkeeping computations necessary for coordination of the various DEH programs.

Figure 29:
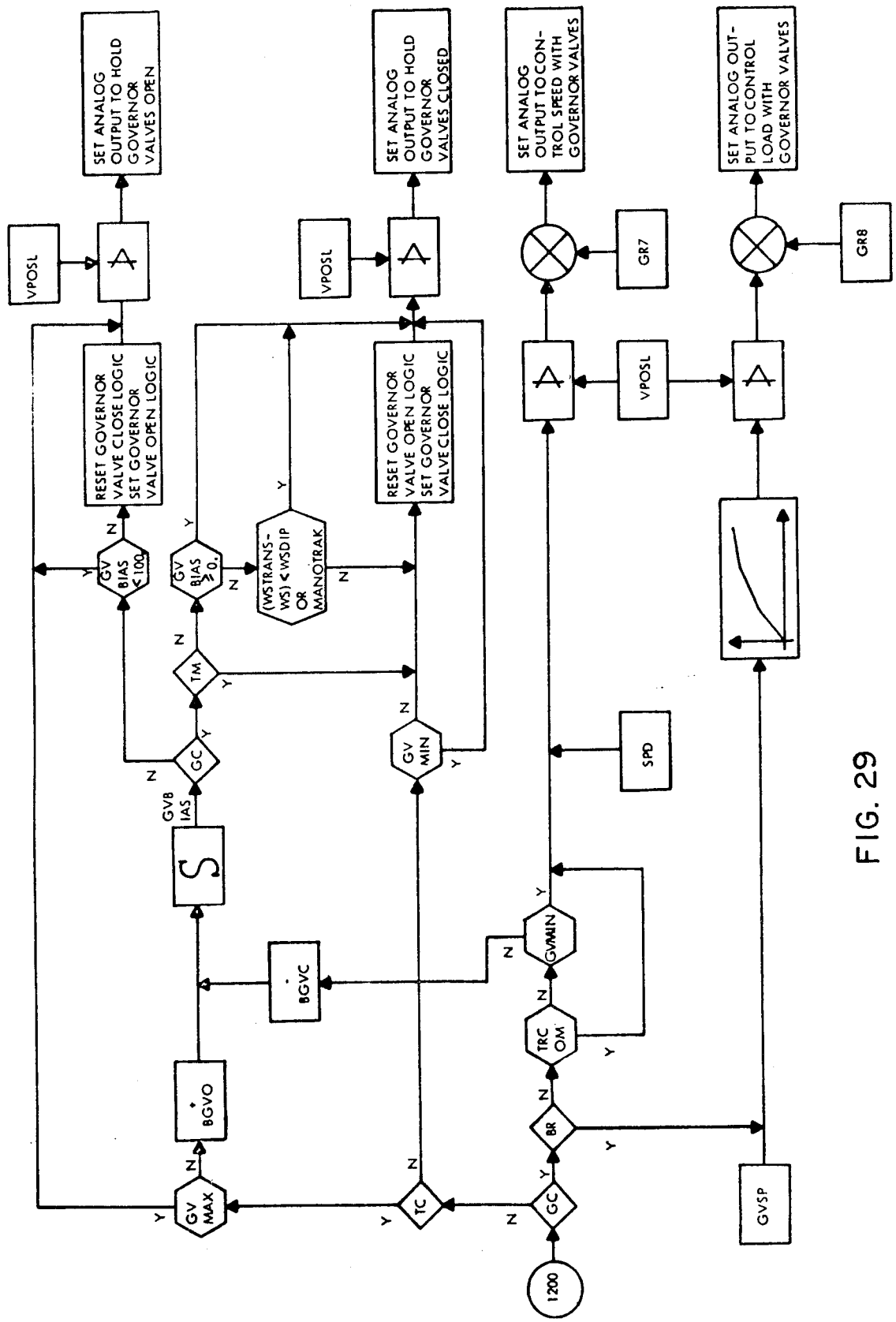
FIG. 29 shows a mixed block diagram of a governor control function program which is operable in accordance with the principles of the invention.
Figure 30:
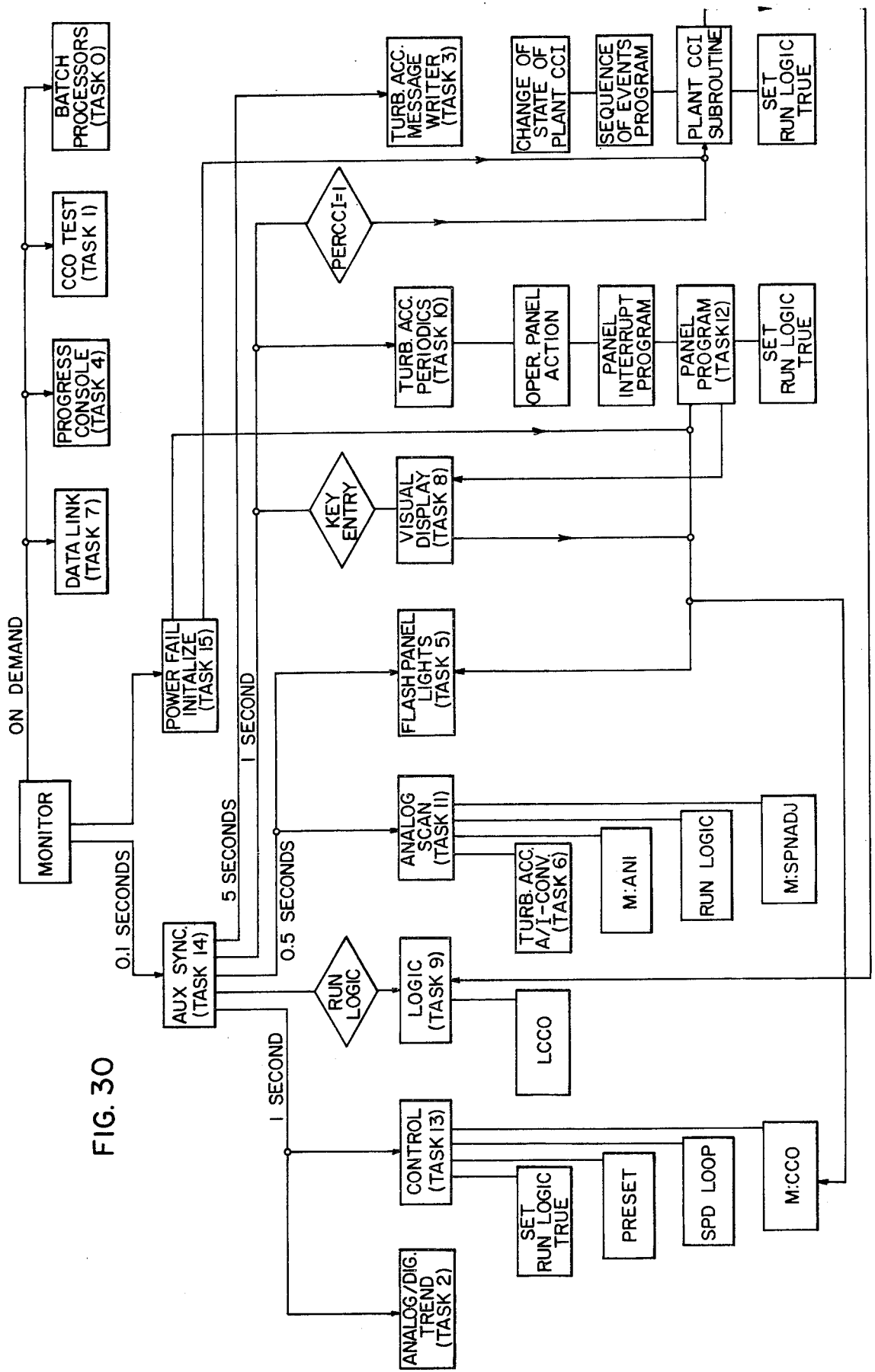
FIG. 30 shows a block diagram of the Digital Electro Hydraulic System which is operable in accordance with the principles of the invention.

Considering the flow chart of FIG. 29 at statement 1200, the valve position limit state (VPLIM) is reset at each pass through the governor valve control program. Then the governor control state (GC) is interrogated; if it is not set, the throttle control state (TC) is checked. If throttle control (TC) is not set, this means the turbine is unlatched and the governor valve minimum state (GVMIN) is checked. If GVMIN is not set, then at statement 1270 all governor valve open states are reset and all governor valve close states, including GVMIN, are set. The program then transfers to statement 1320 for analog output computation and valve position limit checking to hold the governor valves closed. Succeeding passes through the program will find the GVMIN state set and transfer directly to statement 1320.

If the turbine is latched, then the throttle control state (TC) is set. The governor valve control function finds itself at statement 1210, where the governor valve maximum state (GVMAX) is interrogated. If it is not set, then the governor valve bias integrator (GVBIAS) is incremented by the governor valve open-bias constant (BGVO), which is keyboard entered constant usually set at 10 percent to open the governor valves incrementally when the turbine is latched. The program then transfers to statement 1240 where the governor control state (GC) is again checked, since this point in the program may be reached from alternate paths. For the present situation, GC will not be set, thus leading to a check on whether the governor valve bias integrator (GVBIAS) has reached 100 percent and therefore have positioned the governor valves wide open. Assuming that GVBIAS has incremented up to 100 percent, all governor valve close states are reset and all governor valve open states are set, including GVMAX. The program then transfers to statement 1320 for analog output computation and valve position limit checking to hold the governor valves wide open. Succeeding passes through the program find the GVMAX state set at statement 1210 and transfer directly to statement 1320.

Each of the cases discussed above apply when the governor control state (GC) is not set. Once the throttle/governor transfer is initiated, however, this sets the governor control state (GC), in which case the GOVERNOR VALVE CONTROL program arrives at statement 1220. The state of the breaker (BR) is checked; if BR is set, this means the DEH system is on load control and the program transfers to statement 1340 for load computation of the governor valve analog outputs and valve position limit checking.

However, if the breaker (BR) is open and the DEH system still in speed control, the check of BR at statement 1220 finds it not set. Then the throttle/governor transfer complete state (TRCOM) is checked; assuming it has not yet been set, the governor valve closed state (GVMIN) is checked. Normally this will not be set at this point in time, thus requiring the governor valve bias integrator (GVBIAS) to be decremented by the governor valve close-bias constant (BGVC), which is a keyboard entered quantity normally set at 100 percent to instantly close the governor valves when the transfer from throttle to governor control is initiated.

The program then passes on to statement 1240 where the governor control state (GC) is checked again; since GC is set for the present discussion, then at statement 1260 the manual contact input (TM) is interrogated. If the turbine is in manual control at this time, the program transfers to statement 1270 for appropriate bookkeeping which will be described shortly. If the turbine is in automatic control, then the test at statement 1260 on the state of TM finds it not set and an additional test is made on whether the governor valve bias integrator (GVBIAS) has reached zero to indicate the governor valves are closed. If it has not, then the program cycles through this area until the GVBIAS value is zero. Normally this will take only a few passes since the closing bias constant (BGVC) will be quite large to achieve a fast, smooth throttle/governor valve transfer.

Once GVBIAS is zero, the GOVERNOR VALVE CONTROL program searches to determine if the turbine speed (WS) has dropped below the speed at transfer WSTRANS by an amount WSDIP, which is a keyboard entered constant usually set at 10 rpm. When this has occurred, and assuming that the analog backup system has followed the computer governor valve analog output as indicated by the manual not tracking state (MANOTRAK) the GOVERNOR VALVE CONTROL program transfers to statement 1270. All governor valve open states are reset and all governor valve close states, including GVMIN, are set and the program passes on to statement 1320 for computation of the governor valve analog output and valve position limit checking to hold the governor valves closed.

The setting of GVMIN at statement 1270 leads to execution of the LOGIC task, which then uses this information to generate the throttle/governor valve transfer complete state (TRCOM). Succeeding passes through the GOVERNOR VALVE CONTROL program at statement 1220 find TRCOM set and immediately transfer to statement 1380 for computation of the governor valve analog output and valve position limit checking to control turbine speed. The portion of the program at statement 1320 is that necessary to hold the governor valves at the value residing in the governor valve bias integrator (GVBIAS).

The computations necessary to position the governor valves on load control determine where the load control governor valve set point (GVSP) lies with respect to a nonlinear curve which characterizes the governor valve stroke mechanism. The result of this search positions GVSP along the abscissa of the curve, after which the actual valve position (GVPOS) is computed from analytical solution of points along the curve.

The computed governor valve position (GVPOS) is compared with the current valve position limit (VPOSL). If GVPOS is below VPOSL, no action is taken, if GVPOS is greater than VPOSL, then the valve position limiting state VPLIM is set, RUNLOGIC is set and the actual governor valve position GVPOS is reset to the value residing in VPOSL. The LOGIC and FLASH task perform their assigned functions of aligning the DEH system to these conditions and flashing the VALVE POSITION LIMIT DISPLAY lamp, respectively.

In the computations necessary to position the governor valves on speed control, the speed controller percent output (SPD), suitably ratioed to account for differences between the speed ranging gain (GR7) and the maximum ranging factor of 20.47, is checked against the current valve position limit (VPOSL). If the ratioed speed controller output is below VPOSL, no special action is taken; if VPOSL is violated, then the valve position limiting states (VPLIM and RUNLOGIC) are set to trigger the appropriate responses from the LOGIC and FLASH tasks. In addition the speed controller output (SPD) and the speed integrator (RESSPD) are reset to values consistent with VPOSL.

A FORTRAN DO loop is executed to make final checks on both the throttle and governor valve analog outputs. They are low-limit-checked to guarantee that they do not go below zero and high-limit-checked to guarantee that they do not go above the maximum analog output voltage pattern. Then, the analog output handler is called to output the computed throttle and governor valve patterns. Finally, the CONTROL task exits to the Monitor for the next bid 1 sec later.

NONLINEAR CHARACTERIZATION FUNCTION

The nonlinear characterization function provides an important feature for accommodating the nonlinear nature of process equipment. This function produces an output related in a nonlinear fashion to the input.

The form of the curve comprising the characterization function varies somewhat with the application and with the mechanism available for incorporating this feature in the control system. In some analog systems, the curve may have two or at most three segments to accomplish its function. In some highly sophisticated computer systems, the curve may have as many as eight or ten segments. The DEH Control System provides a nonlinear characterization function having five straight-line segments composed of six points describing the intersections of these segments. The slope of any segment may be positive, zero or negative, while the points defining the intersections of various segments may have any positive value. For the DEH application requirements, it is only necessary to work with curves in the first quadrant.

The nonlinear characterization function in the DEH system is used to describe the governor valve position-versus-stroke relationship on load control. Accurate representation of this curve allows operation of the DEH system in automatic control (with the megawatt and impulse pressure feedback loops out of service) to be effectively linearized. Megawatt load demand can be achieved quite closely on automatic control without the feedback loops, which may be out of service due to faults with the transducers, or due to other problems. Of course, with the loops in service, operation then is exactly aligned between load demand and actual megawatt load. The axis of ordinates POS and the axis of abscissa SP consist of six points each. These are all keyboard entered quantities which may be tuned or adjusted in the maintenance test mode of operation.

The program isolates the segment of the SP axis within which the input value (GVSP) lies. Having found this, the program then evaluates the output value (GVPOS) using the slope intercept form of a straight-line from analytical geometry considerations. The ratio of the difference between corresponding values of POS and SP yields the slope of that section. This slope is multiplied by the exact position within the I-th section, which is given by the difference between the current value of the input (GVSP) and the left end point (SP(I-1)). The resultant product is added to the intercept (POS(I-1)) for this section to yield the required governor valve position (GVPOS).

ANALOG BACKUP SYSTEM

Throttle Valve Control (Applicable Only to Units with Steam Chest Inlet Configurations)

Throttle valves are used on wide-range speed control from turning gear to approximately 90 percent of rated speed. From this point to full rated speed, governor valves are used for control.

When the DEH Control System is in the Operator Automatic mode of operation, the control signal from the computer analog output card (TVAAZ1) is permitted to control the throttle valves, through the Servo-/Linear Variable Differential Transformer (S/LVDT) Cards. The Analog Backup System tracks the computer output.

To accomplish this tracking, the analog comparator compares the TVAAZ1 signal to the output of digital-to-analog (D/A) converter (TVMAZ1). If TVAAZ1 exceeds TVMAZ1, the comparator generates a raise signal. This signal causes the up/down counter to count up at a preset rate and increase its digital output. The digital-to-analog (D/A) converter output (TVMAZ1) increases until it equals TVAAZ1. Thus the Analog Backup System continuously tracks signal TVAAZ1, when the DEH Control System is in the Operator Automatic mode.

When the DEH Control System is in the Turbine Manual mode of operation, the analog output (TVMAZ2) controls the throttle valves through the S/LVDT Cards; the computer output (TVAAZ2) is blocked. The auto/manual logic circuitry blocks the analog comparator output and allows the TV RAISE and TV LOWER pushbuttons on the Operator B Panel to control the up/down counter. Pressing the TV RAISE button causes the up/down counter to count up at a slow rate. If the FAST ACTION pushbutton is pressed at the same time however, a faster rate is selected. The up/down counter output is converted to an analog output and used to control the throttle valves (TVMAZ2). With the DEH Control System in the Turbine Manual mode, the digital portion tracks the analog output with a computer software program.

In summary, when the system is in the Operator Automatic mode, the Analog Backup System tracks the computer output. When the system goes to the Turbine Manual mode, the analog system output equals the computer output and the transfer is made without moving the throttle valves (bumpless transfer). While the system is in Turbine Manual, the TV RAISE and TV LOWER pushbuttons control the throttle valve position and the digital portion tracks the analog system output. If the system is put back in the Operator Automatic mode, the transfer is made without a bump.

GOVERNOR VALVE CONTROL

Governor valves are used for speed and load control. If there are separate valve actuators for each valve, the DEH Control System may be in either single valve or sequential valve operation.

There are two types of inputs to the S/LVDT Cards. One type is the sequential valve inputs (GV1AZ1, GV2AZ1); these signals are generated independently of the Analog Backup System. The second type of input (GV*AZ1) is the single valve input; this input is generated either by the computer (GVAAZ2) or by the analog system (GVMAZ2).

When the system is in single valve operation (or when sequential valve operation is not supplied), the sequential valve inputs to the S/LVDT Cards are zero. The GV*AZ1 signal controls the governor valves. Except for the fact that the analog output is biased so that positive and negative values can be obtained, the governor valve control circuits are the same as the throttle valve control circuits previously discussed.

The Analog Backup System tracks the computer output (GVAAZ1) when the control system is in the Operator Automatic mode. The analog system is controlled by the GV RAISE and GV LOWER pushbuttons when the control system is in the Turbine Manual mode and the computer tracks the analog output. The control signal (GV*AZ1) goes to all S/LVDT Cards; all valves move the same amount at the same time.

When the control system is in sequential valve operation (and in the Operator Automatic mode), the sequential inputs (GV1AZ1, GV2AZ1) are controlled by the computer. The computer also sets the single valve input (GV*AZ1) to zero. The computer then uses the sequential inputs to individually control the governor valves.

If the control system transfers to the Turbine Manual mode while in sequential valve operation, the computer keeps the sequential valve input signals (GV1AZ1, GV2AZ1) constant. Bumpless transfer occurs since the governor valves do not move. When the transfer is complete, the operator can position the valves with the GV RAISE and GV LOWER pushbuttons. Pressing the GV RAISE pushbutton increases the output of the D/A converter (GVMAZ) and thus increases the single valve input signal (GV*AZ1). GV*AZ1 is summed with the sequential input signals (GV1AZ1 and GV2AZ1); this increases the output of the S/LVDT Cards, and opens all the valves by the same amount.

If the GV LOWER pushbutton is pressed, the single valve input signal (GV*AZ1) is decreased. This signal is summed with the sequential input signals, causes a decrease in S/LVDT Card output, and closes all the valves by the same amount. The up/down counter counts below its mid range and causes the D/A converter output (GVMAZ1) to go negative. This feature allows the valves to be closed, even though the sequential valve input remains constant.

The digital system continuously tracks the single valve input (GV*AZ1) with a computer software program. When transfer to Operator Automatic is initiated (by pressing the OPER AUTO pushbutton), transfer occurs without changing the valve position (bumpless transfer).

In summary, for units with individual servos, the governor valves can operate in either the single valve or sequential valve mode. In either case, the Analog Backup System tracks the computer generated single valve output signal when in Operator Automatic mode, and positions the valves when in Turbine Manual mode.

APPENDIX IX

Fortran Programs for the Manual Backup Function, etc. of the DEH and ATS Systems

```
C*********************************************************************
C
C                 VALVE CONTINGENCY/MANUAL NOT TRACKING PROGRAM
C
C*********************************************************************
C
46      VSTATCON=.FALSE.
        TVCONT=.FALSE.
        GVCONT=.FALSE.
        MANOTRAK=.FALSE.
        IF(TM) GO TO 50
        DO 48 I=1,2
C
C                   CHECK         E VA E CP INGENCY
C
        TEMP=ITVAO-ITVSS(I)
        IF(ABS(TEMP) .LT. TVDB) GO TO 47
        VSTATCON=.TRUE.
        TVCONT=.TRUE.
C
C                   CHECK G E  VA E CP INGENCY
C
47      TEMP=IGVAO-IGVSS(I)

IF(ABS(TEMP) .LT. GVDB) GO TO 48
        VSTATCON=.TRUE.
        GVCONT=.TRUE.
48      CONTINUE
C
C                   CHECK  A A      ACKI G
C
        TEMP=ITVAO-ITVMAN
        IF(ABS(TEMP) .GE. TVMANDB) GO TO 49
        TEMP=IGVAO-IGVMAN
        IF(ABS(TEMP) .LT. GVMANDB) GO TO 50
49      MANOTRAK=.TRUE.
```

```
01971 C*********************************************************************
01981 C
01991 C                VALVE CONTINGENCY/MANUAL NOT TRACKING PROGRAM
02001 C
02011 C*********************************************************************
02021 C
      0102   EFFD  E8 7 FD         SST    *H:CCO ,B
      0103   000C                  ADL    N1
      0104   0023                  ADL    IPAT
      0105   0011                  ADL    N27
      0106   0004                  ADL    MASK
02031 46     VSTATCON=.FALSE.
02041        TVCONT=.FALSE.
02051        GVCONT=.FALSE.
02061        MANOTRAK=.FALSE.

02071        IF(TM) GO TO 50
      0045+B 0000
      0107   2C45  28 4 45         LDA    =X'0000' ,B
      0108   1200  10 2 00         LDC    $+X'0000'
      0109   AE05  A8 6 05         STA    VSTATCON,C
      010A   AE06  A8 6 06         STA    TVCONT,C
      010B   AE07  A8 6 07         STA    GVCONT,C
      010C   AE03  A8 6 03         STA    MANOTRAK,C
      010D   12F1  10 2 F1         LDC    $+X'FFF1'
      010E   2E13  28 6 13         LDA    TM,C
      010F   5200  50 2 00         JMP    *$+X'0000'
02081        DO 48 I=1,2
02091 C
```

```
03921 C                    MANUAL - TRACK LOAD CONTROL
03931 C
     038D    7573   70 5 73           JMP    *)70 ,B
03941 15000 TEMP=IGVMAN-IGVAO
03951       TEMP=TEMP/40.96
03961       READY=.FALSE.
03971       IF(ABS(TEMP) .LT. DBTRKL) READY=.TRUE.
     038E    1200   10 2 00           LDC    S+X'0000'
     038F    2E14   28 6 14           LDA    IGVMAN,C
     0390    4E15   48 6 15           SUB    IGVAO ,C
     0391    EDEE   E8 5 EE           SST    *C01$,B
     0392    AC30   A8 4 30           STA    TEMP,B
     0393    A42F   A0 4 2F           STE    TEMP,B
     0394    EDED   E8 5 ED           SST    *D11$,B
     0395    003B                     ADL    =X'46A3'
     0396    AC30   A8 4 30           STA    TEMP,B
     0397    A42F   A0 4 2F           STE    TEMP,B
     0398    2C45   28 4 45           LDA    =X'0000' ,B
     0399    1200   10 2 00           LDC    S+X'0000'
     039A    AE04   A8 6 04           STA    READY ,C
     039B    EF00   E8 7 00           SST    *ABS ,B
     039C    002F                     ADL    TEMP
     039D    EDEB   E8 5 EB           SST    *S11$,B
     039E    808F                     ADL    DBTRKL
     039F    B200   B0 2 00           PJP    S+X'0000'
     03A0    2C4B   28 4 4B           LDA    =X'FFFF' ,B
     03A1    1208   10 2 08           LDC    S+X'0008'
     03A2    AE04   A8 6 04           STA    READY ,C
03981       REFDMD=REFDMD+GR9*TEMP
03991       IF(REFDMD .GE. MWMAX) REFDMD=MWMAX
     03A3    12D4   10 2 D4           LDC    S+X'FFD4'
     03A4    2E63   28 6 63           LDA    GR9 ,C
     03A5    2662   20 6 62           LDE    GR9 ,C
     03A6    EDEC   E8 5 EC           SST    *M11$,B
     03A7    002F                     ADL    TEMP
     03A8    EDEA   E8 5 EA           SST    *A11$,B
     03A9    807D                     ADL    REFDMD
     03AA    12CA   10 2 CA           LDC    S+X'FFCA'
     03AB    AE19   A8 6 19           STA    REFDMD,C
     03AC    A618   A0 6 18           STE    REFDMD,C
     03AD    EDEB   E8 5 EB           SST    *S11$,B
     03AE    8090                     ADL    MWMAX
     03AF    BA00   B8 2 00           NJP    S+X'0000'
     03B0    12C7   10 2 C7           LDC    S+X'FFC7'
     03B1    2E83   28 6 83           LDA    MWMAX ,C
     03B2    2682   20 6 82           LDE    MWMAX ,C
     03B3    12C1   10 2 C1           LDC    S+X'FFC1'
     03B4    AE19   A8 6 19           STA    REFDMD,C
     03B5    A618   A0 6 18           STE    REFDMD,C
04001 15500 IF(REFDMD .LT. 0.) REFDMD=0.
     03B6    12BE   10 2 BE  )15500   LDC    S+X'FFBE'
     03B7    2E19   28 6 19           LDA    REFDMD,C
     03B8    2618   20 6 18           LDE    REFDMD,C
     03B9    B200   B0 2 00           PJP    S+X'0000'
     03BA    2C27   28 4 27           LDA    =X'0000' ,B
     03BB    2426   20 4 26           LDE    =X'0000' ,B
     03BC    12B8   10 2 B8           LDC    S+X'FFB8'
     03BD    AE19   A8 6 19           STA    REFDMD,C
     03BE    A618   A0 6 18           STE    REFDMD,C
04011       ODMD=REFDMD
04021       TEMP=ITESTAO
04031       IF(TEMP .GE. TESTAIMX) READY=.FALSE.
     03BF    12B5   10 2 B5           LDC    S+X'FFB5'
     03C0    2E19   28 6 19           LDA    REFDMD,C
     03C1    2618   20 6 18           LDE    REFDMD,C
     03C2    AE01   A8 6 01           STA    ODMD,C
     03C3    A600   A0 6 00           STE    ODMD,C
     03C4    1236   10 2 36           LDC    S+X'0036'
     03C5    2E26   28 6 26           LDA    ITESTAO ,C
     03C6    EDEE   E8 5 EE           SST    *C01$,B
     03C7    AC30   A8 4 30           STA    TEMP,B
     03C8    A42F   A0 4 2F           STE    TEMP,B
     03C9    EDEB   E8 5 EB           SST    *S11$,B
     03CA    8091                     ADL    TESTAIMX
```

```
         03CB    BA00   B8 2 00              NJP    $+X'0000'
         03CC    2C45   28 4 45              LDA    =X'0000',B
         03CD    122C   10 2 2C              LDC    $+X'002C'
         03CE    AE04   A8 6 04              STA    READY ,C
0404:              GO TO 300
0405: C
0406: C*******************************************
0407: C
C                  VALVE STATUS DISPLAY
C
800      IF(.NOT. VTESTPB) GO TO 850
         IF(NVTEST .EQ. 0) GO TO 830
         IWINDOW=NVTEST
         I=N5
         GO TO 620
830      J=INDEX2+N4
         GO TO 860
850      J=INDEX2
860      TEMP=ITVGVSS(J)
         TEMP=TEMP/40.96
         IK(N5)=N3
C
C                  LOCATE DECIMAL POINT
C
900      IF(TEMP .GE. 0.) GO TO 910
         TEMP=-TEMP
         IK(N5)=N10
910      IF(TEMP .GE. 9999.) TEMP=9999.
         DO 930 I=N1,N4
         IF(TEMP .LT. XCHK(I)) GO TO 940
930      CONTINUE
940      INDEX3=5-I
         IWINDOW=XCHK(INDEX3+1)*TEMP+.001
950      I=N2
960      N=N4
                                     VALVE STATUS DISPLAY
0194: C
         0144    7572   70 5 72              JMP    *)900,B
0195: 800       IF(.NOT. VTESTPB) GO TO 850

0145    1200   10 2 00      )800    LDC    $+X'0000'
         0146    2E12   28 6 12              LDA    VTESTPB ,C
         0147    5452   50 4 52              EOR    =X'FFFF' ,B
         0148    F200   F0 2 00              ZJP    $+X'0000'
         0149    7575   70 5 75              JMP    *)850,B
0196:              IF(NVTEST .EQ. 0) GO TO 830
         014A    12BD   10 2 BD              LDC    $+X'FFBD'
         014B    2E03   28 6 03              LDA    NVTEST,C
         014C    F201   F0 2 01              ZJP    $+X'0001'
         014D    7200   70 2 00              JMP    $+X'0000'
         014E    7576   70 5 76              JMP    *)830,B
0197:              IWINDOW=NVTEST
0198:              I=N5
0199:              GO TO 620
         014F    12B8   10 2 B8              LDC    $+X'FFB8'
         0150    2E03   28 6 03              LDA    NVTEST,C
         0151    AE06   A8 6 06              STA    IWINDOW ,C
         0152    2C49   28 4 49              LDA    N5,B
         0153    AC5C   A8 4 5C              STA    I ,B
         0154    7562   70 5 62              JMP    *)620,B
0200: 830       J=INDEX2+N4
0201:              GO TO 860
         0155    12B2   10 2 B2              LDC    $+X'FFB2'
         0156    2E05   28 6 05              LDA    INDEX2,C
         0157    440F   40 4 0F              ADD    N4,B
         0158    AC73   A8 4 73              STA    J ,B
         0159    7577   70 5 77              JMP    *)860,B
0202: 850       J=INDEX2
         015A    12AD   10 2 AD      )850    LDC    $+X'FFAD'
         015B    2E05   28 6 05              LDA    INDEX2,C
         015C    AC73   A8 4 73              STA    J ,B
```

```
02031 860      TEMP=ITVGVSS(J)
02041          TEMP=TEMP/40.96
02051          IW(N5)=N3
00311 C
00321 C                RESTORE SPEED CHANNEL SYSTEM
00331 C
00341 S5       LDA         =8913
        0000   0000                           DAT     X'0000'
        0001   0AFF  08 2 FF                  LDB     S+X'FFFF'
        0005+B 22D1           )5
        0002   2CO5  28 4 05                  LDA     =X'22D1' ,B
00351 S         IOA         32
        0003   8820  88 0 20                  IOA     X'0020'
00361 C
00371 C                RESET ALL CCO'S AND A/O'S
00381 C
00391          DO 20 I=1,32

0007+B 0001
        0004   2C07  28 4 07                  LDA     =X'0001' ,B
        0005   AC06  A8 4 06                  STA     I ,B
00401          CALL M:CCO(N1,N0,I,MASK)
        0006   EF00  E8 7 00                  SST     *M:CCO ,B
        0007   0002                           ADL     N1
        0008   0001                           ADL     N0
        0009   0006                           ADL     I
        000A   0004                           ADL     MASK
00411 20      CONTINUE
```

We claim:

1. A steam turbine system comprising a plurality of turbine sections, a predetermined arrangement of throttle and governor valves, said throttle and governor valves disposed to control the flow of steam from a steam generating system to the turbine, a control system having a speed/load control for generating desired valve position signals, means for generating respective signals representative of the actual valve positions, means for comparing each actual valve position signal to the corresponding desired valve position, and means for generating a contingency output if any comparison difference exceeds a predetermined value.

2. A turbine system as set forth in claim 1 wherein said control system includes an automatic speed/load control for generating desired valve position signals and a backup speed/load control for generating desired valve position signals, means are provided for selectively applying the automatic or backup desired position signals to position said valves, and said comparison and contingency generating means function during automatic control.

3. A turbine system as set forth in claim 2 wherein said automatic control includes a digital computer, an operator panel having selection circuit means is coupled to said computer, said computer includes said comparison and contingency generating means and means for sequentially controlling its programmed operation, and means including said operator panel circuit means are provided for varying the comparison difference value at which said contingency generating means generates contingency outputs.

4. A turbine system as set forth in claim 3 wherein a comparison difference value is registered in said computer for each valve, and said varying means is operative to register selectable comparison difference values for each valve.

5. A turbine system as set forth in claim 2 wherein said automatic control includes a digital computer which generates the desired valve position signals in the form of valve position setpoint signals and includes means for sequentially controlling its programmed operation, said control system further includes an electrohydraulic positioning control for each valve, and said electrohydraulic controls responding to the valve position setpoint signals and the actual valve position signals to position said valves.

6. A steam turbine system comprising a plurality of turbine sections, a predetermined arrangement of throttle and governor valves, said throttle and governor valves disposed to control the flow of steam from a steam generating system to the turbine, a control system having an automatic speed/load control for generating desired valve position signals and a backup speed/load control for generating desired valve position signals, means for selectively applying the automatic or backup desired position signals to position said valves, means for responding to said automatic control to cause said backup control to track its desired valve position signals to the corresponding desired valve position signals from said automatic control, means for comparing the corresponding backup and automatic desired valve position signals, and means for generating a contingency output if any comparison difference exceeds a predetermined value.

7. A turbine system as set forth in claim 6 wherein said automatic control includes a digital computer, an operator panel having selection circuit means is coupled to said computer, said computer includes said comparison and contingency generating means and means for sequentially controlling its programmed operation, and means including said operator panel circuit means are provided for varying the comparison difference value at which said contingency generating means generates contingency outputs.

8. A turbine system as set forth in claim 6 wherein means are provided for generating respective signals representative of the actual valve positions, means are provided for comparing each actual valve position signal to the corresponding desired valve position, and means are provided for generating a contingency output if any valve position comparison difference exceeds a predetermined value.

9. A turbine system as set forth in claim 8 wherein said automatic control includes a digital computer, an operator panel having selection circuit means is coupled to said computer, said computer includes said comparison and contingency generating means and means for sequentially controlling its programmed operation, and means including said operator panel circuit means are provided for varying the comparison difference value at which said contingency generating means generates contingency outputs.

10. A control system for a steam turbine having a predetermined arrangement of throttle and governor valves, said throttle and governor valves disposed to control the flow of steam from a steam generating system to the turbine, said control system comprising a speed/load control for generating desired valve position signals, means for generating respective signals representative of the actual valve positions, means for comparing each actual valve position signal to the corresponding desired valve position, and means for generating a contingency output if any comparison difference exceeds a predetermined value.

11. A turbine control system as set forth in claim 10 wherein an automatic speed/load control is provided for generating desired valve position signals and a backup speed/load control is provided for generating desired valve position signals, means are provided for selectively applying the automatic or backup desired position signals to position said valves, and said comparison and contingency generating means function during automatic control.

12. A turbine control system as set forth in claim 11 wherein said automatic control includes a digital computer, an operator panel having selection circuit means is coupled to said computer, said computer includes said comparison and contingency generating means and means for sequentially controlling its programmed operation, and means including said operator panel circuit means are provided for varying the comparison difference value at which said contingency generating means generates contingency outputs.

13. A turbine control system as set forth in claim 12 wherein a comparison difference value is registered in said computer for each valve, and said varying means is operative to register selectable comparison difference values for each valve.

14. A control system for a steam turbine having a predetermined arrangement of throttle and governor valves, said throttle and governor valves disposed to control the flow of steam from a steam generating system to the turbine, said control system comprising an automatic speed/load control for generating desired valve position signals and a backup speed/load control for generating desired valve position signals, means for selectively applying the automatic or backup desired position signals to position said valves, means for responding to said automatic control to cause said backup control to track its desired valve position signals to the corresponding desired valve position signals from said automatic control, means for comparing the corresponding backup and automatic desired valve position signals, and means for generating a contingency output if any comparison difference exceeds a predetermined value.

15. A turbine control system as set forth in claim 14 wherein said automatic control includes a digital computer which generates the desired valve position signals in the form of valve position setpoint signals and includes means for sequentially controlling its programmed operation, said control system further includes an electrohydraulic positioning control for each valve, and said electrohydraulic controls responding to the valve position setpoint signals and the actual valve position signals to position said valves.

16. A turbine control system as set forth in claim 14 wherein said automatic control includes a digital computer, an operator panel having selection circuit means is coupled to said computer, said computer includes said comparison and contingency generating means and means for sequentially controlling its programmed operation, and means including said operator panel circuit means are provided for varying the comparison difference value at which said contingency generating means generates contingency outputs.

17. A turbine control system as set forth in claim 16 wherein said operator panel includes a display means and means are provided for coupling the contingency outputs to said display means.

18. A turbine control system as set forth in claim 14 wherein means are provided for generating respective signals representative of the actual valve positions, means are provided for comparing each actual valve position signal to the corresponding desired valve position, and means are provided for generating a contingency output if any valve position comparison difference exceeds a predetermined value.

19. A turbine control system as set forth in claim 18 wherein said automatic control includes a digital computer, an operator panel having selection circuit means is coupled to said computer, said computer includes said comparison and contingency generating means and means for sequentially controlling its programmed operation, and means including said operator panel circuit means are provided for varying the comparison difference value at which said contingency generating means generates contingency outputs.

* * * * *